(12) United States Patent
Fernandez

(10) Patent No.: US 10,953,381 B1
(45) Date of Patent: Mar. 23, 2021

(54) CHEMICAL REACTOR WITH HIGH SPEED ROTARY MIXING, FOR CATALYTIC THERMAL CONVERSION OF ORGANIC MATERIALS INTO DIESEL AND OTHER LIQUID FUELS, AND APPLICATIONS THEREOF

(71) Applicant: TGE IP LLC, Miami Beach, FL (US)

(72) Inventor: Marcelo Fernandez, San Pedro Garza Garcia (MX)

(73) Assignee: TGE IP LLC, Miami Beach, FL (US)

( * ) Notice: Subject to any disclaimer, the term of this patent is extended or adjusted under 35 U.S.C. 154(b) by 0 days.

(21) Appl. No.: 16/996,628

(22) Filed: Aug. 18, 2020

Related U.S. Application Data

(60) Provisional application No. 62/994,099, filed on Mar. 24, 2020.

(51) Int. Cl.
*B01J 19/18* (2006.01)
*B01J 19/00* (2006.01)
(Continued)

(52) U.S. Cl.
CPC ....... *B01J 19/1812* (2013.01); *B01J 19/0066* (2013.01); *B01J 19/0073* (2013.01);
(Continued)

(58) Field of Classification Search
CPC .............. B01J 19/1812; B01J 19/0073; B01J 19/0066; C10L 1/08; C10L 2270/026;
(Continued)

(56) References Cited

U.S. PATENT DOCUMENTS

| 4,073,338 | A | * | 2/1978 | Fujikake | ................. F28D 11/02 165/86 |
| 5,605,551 | A | | 2/1997 | Scott et al. | |

(Continued)

FOREIGN PATENT DOCUMENTS

| DE | 19941497 A1 | 3/2001 |
| DE | 10049377 A1 | 4/2002 |

(Continued)

OTHER PUBLICATIONS

International Search Report and Written Opinion (International Application No. PCT/DE2017/000165); dated Feb. 8, 2018; 8 pages; Includes English Translation.

*Primary Examiner* — Huy Tram Nguyen
(74) *Attorney, Agent, or Firm* — Howard & Howard Attorneys PLLC

(57) ABSTRACT

Chemical reactor with high speed rotary mixing, system thereof, and method thereof, for catalytic thermal conversion of organic (hydrocarbon-containing) materials (coal, plastics, rubber, plant matter, wood shavings, biomass, organic wastes) into diesel and other liquid fuels (automobile or/and jet engine fuels). Relevant to non-conventional commercial scale production of liquid fuels, and to commercial scale processing and disposing of organic waste materials. Chemical reactor includes: integrated combination of a reactor stationary assembly (RSA), having only stationary components remaining stationary during chemical reactor operation, and a reactor rotary mixing assembly (RRMA), having only rotatable components rotating during chemical reactor operation. May include anti-abrasion shield for shielding inner surface of reactor central housing from abrasion during chemical reactor operation. Rotor may include a reinforcement disc. Rotor blades or/and reinforcement disc may include rotor-based performance and process control struc- (Continued)

tural features (openings, or/and protrusions, or/and depressions), for additionally controlling performance of the rotor.

42 Claims, 29 Drawing Sheets

(51) Int. Cl.
 *C10L 1/04* (2006.01)
 *C10L 1/08* (2006.01)
 *C10G 1/04* (2006.01)
(52) U.S. Cl.
 CPC .................. *C10G 1/04* (2013.01); *C10L 1/08* (2013.01); *C10G 2300/1003* (2013.01); *C10G 2300/1014* (2013.01); *C10G 2400/04* (2013.01); *C10L 2200/0469* (2013.01); *C10L 2270/026* (2013.01)
(58) Field of Classification Search
 CPC ............. C10L 2200/0469; C10G 1/04; C10G 2300/1003; C10G 2400/04; C10G 2300/1014
 USPC .......................................................... 422/224
 See application file for complete search history.

(56) References Cited

U.S. PATENT DOCUMENTS

| | | | |
|---|---|---|---|
| 5,608,136 A | 3/1997 | Maezawa et al. | |
| 7,473,348 B2 | 1/2009 | Koch | |
| 2007/0131585 A1 | 6/2007 | Koch | |
| 2008/0116116 A1 | 5/2008 | Koch | |
| 2014/0047761 A1* | 2/2014 | Mandle | B01J 19/088 44/308 |
| 2014/0322008 A1* | 10/2014 | Molter | F01D 5/18 416/1 |
| 2015/0292510 A1* | 10/2015 | Guenther | C10G 15/08 417/379 |
| 2017/0187256 A1* | 6/2017 | Zhang | H02K 15/03 |
| 2019/0247823 A1* | 8/2019 | Naef | B01J 19/20 |

FOREIGN PATENT DOCUMENTS

| | | |
|---|---|---|
| DE | 10138518 A1 | 2/2003 |
| DE | 10356245 A1 | 7/2005 |
| DE | 102005056735 B3 | 8/2006 |
| DE | 102006054506 A1 | 9/2007 |
| GB | 2473500 B | 5/2012 |
| WO | 2014/087238 A2 | 6/2014 |
| WO | 2018/138194 A1 | 8/2018 |

\* cited by examiner

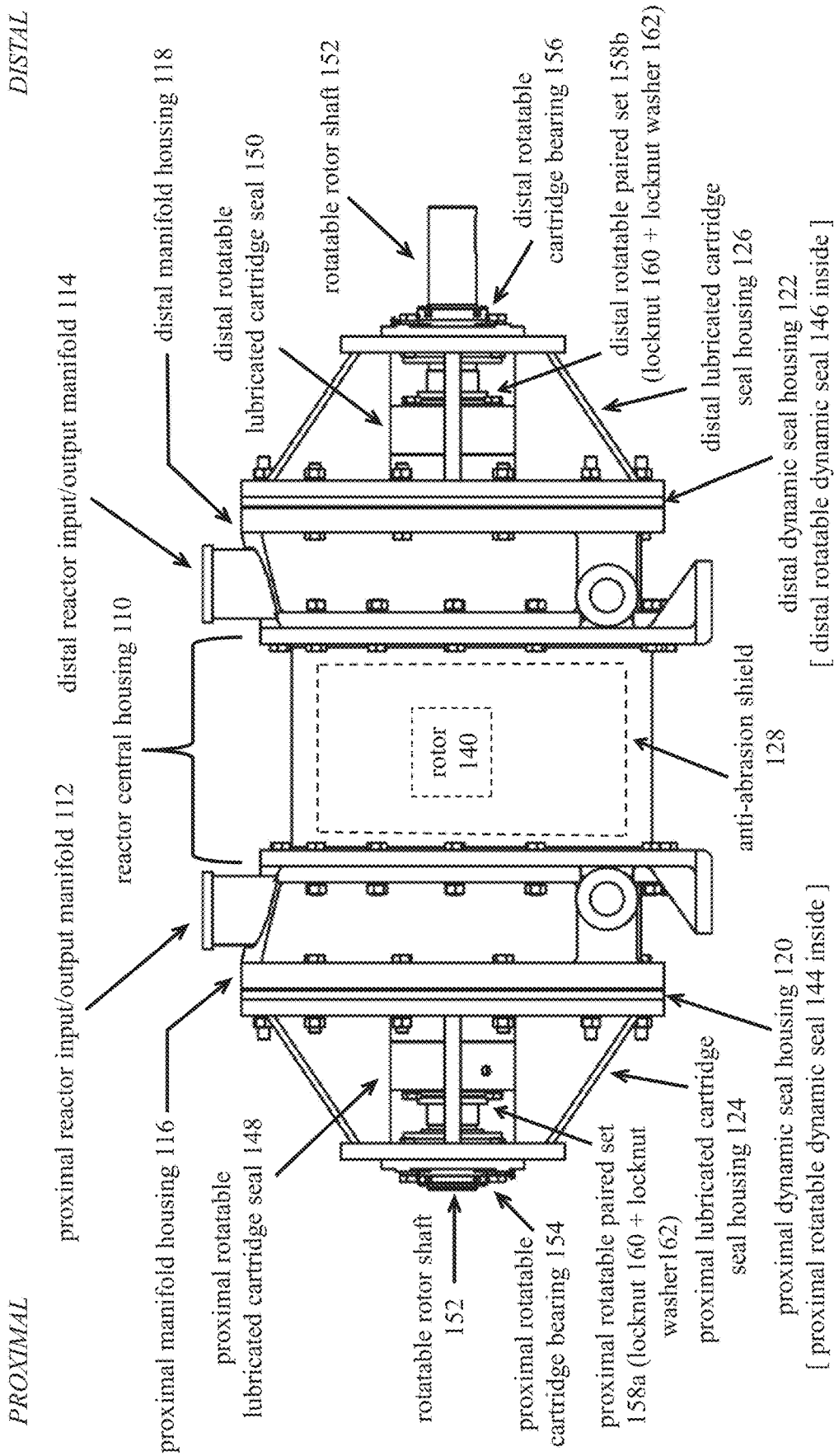
FIG. 1 (side view) chemical reactor 100

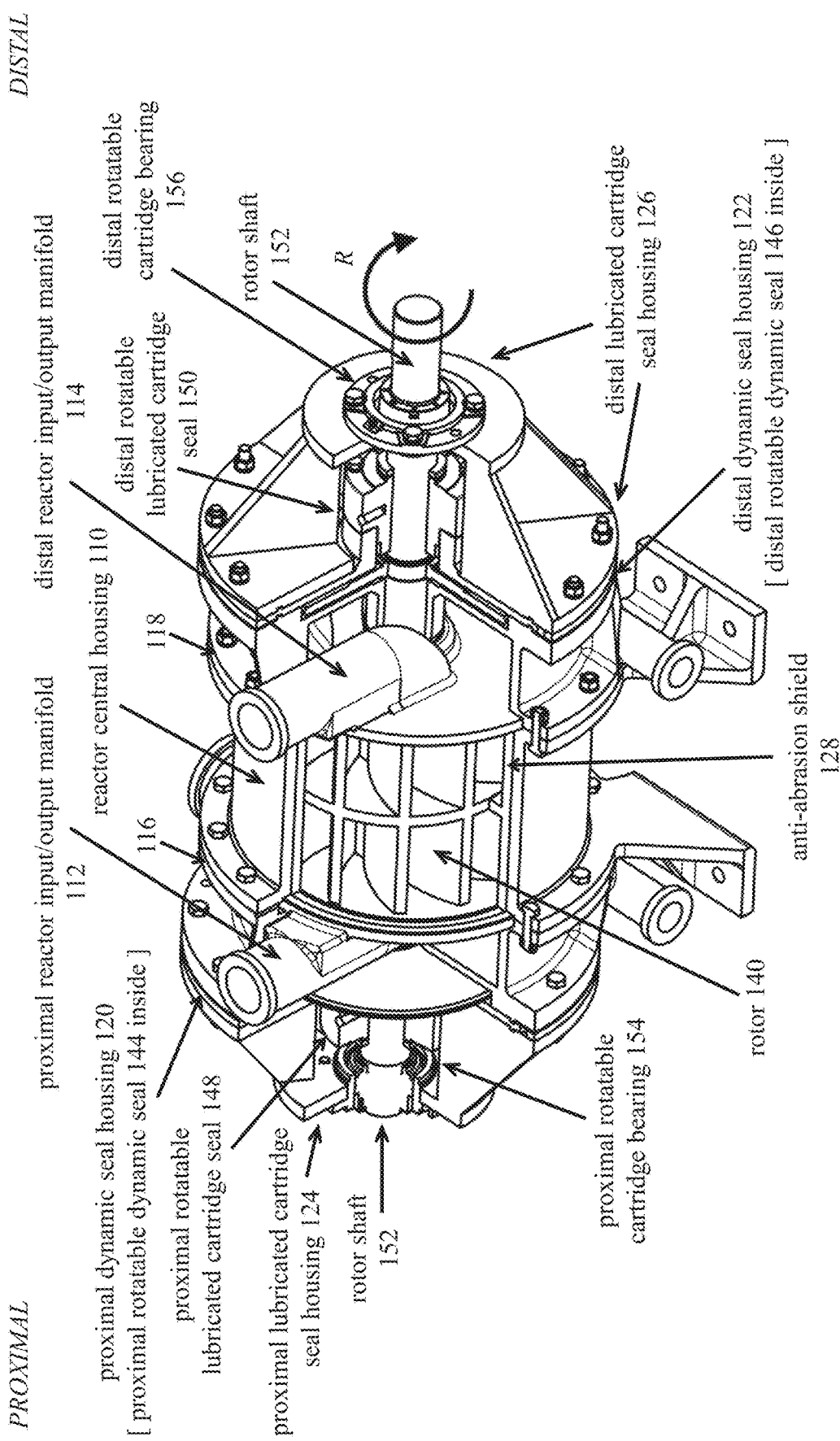
FIG. 2A (perspective view)

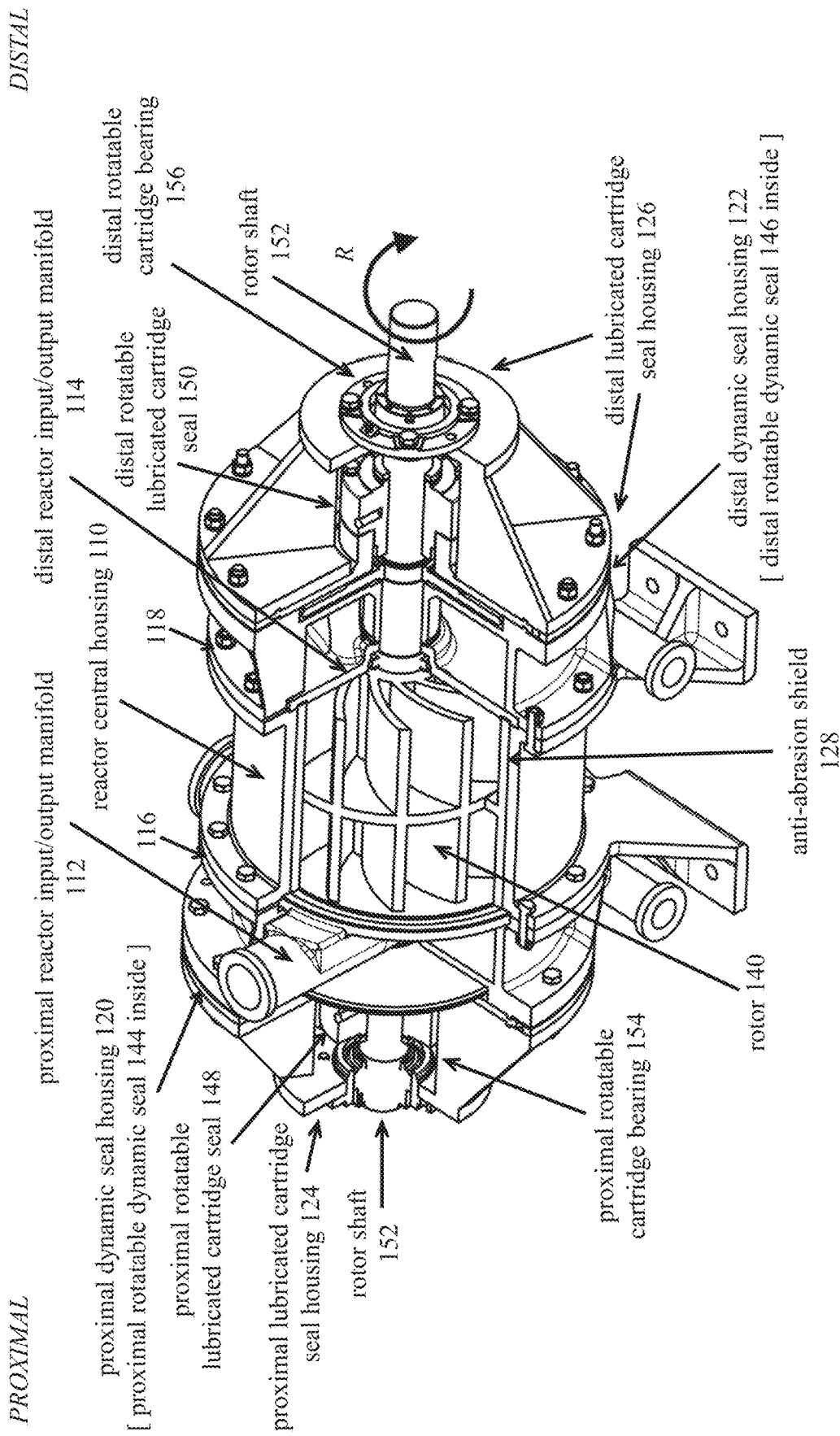
FIG. 2B (perspective view)

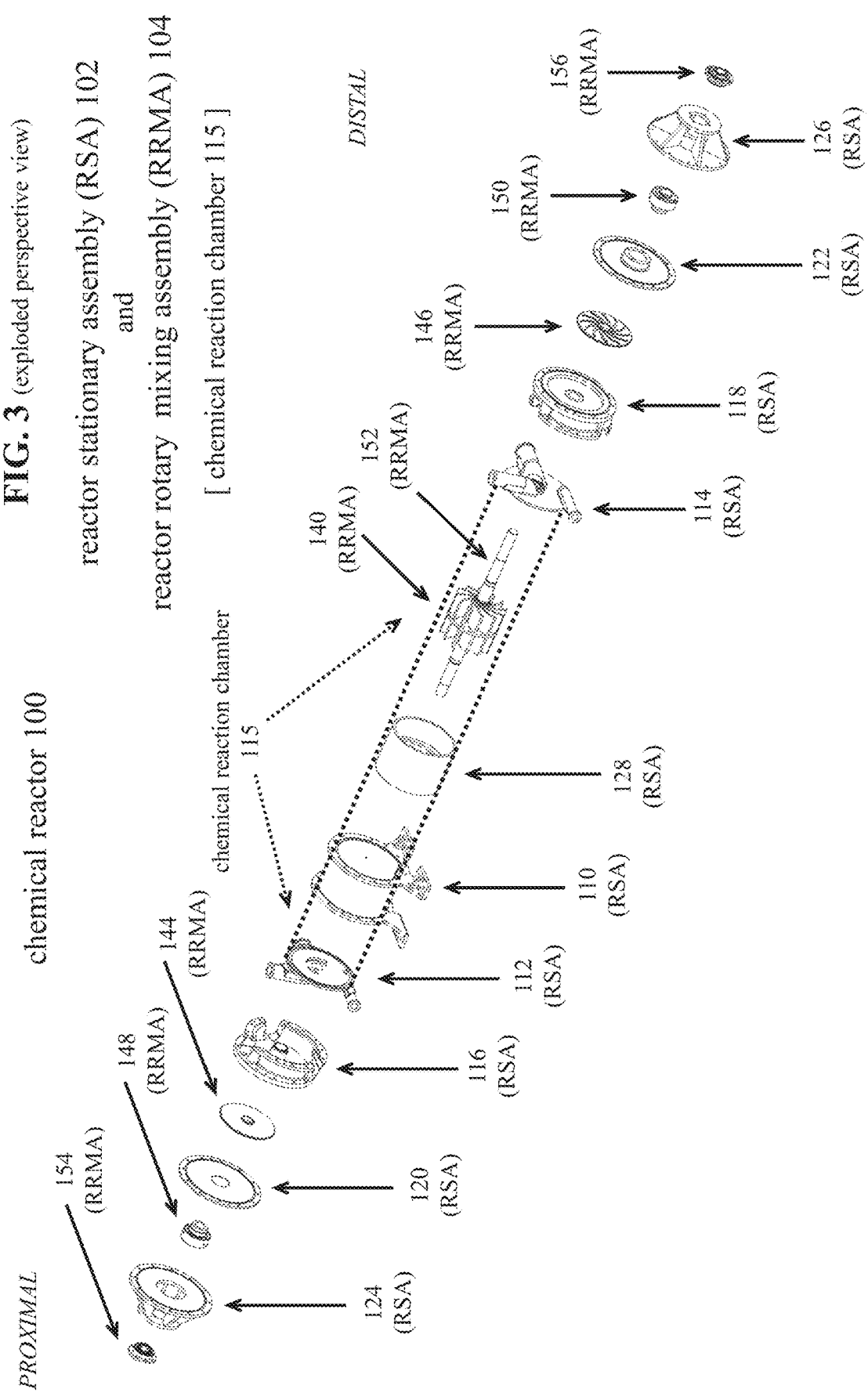

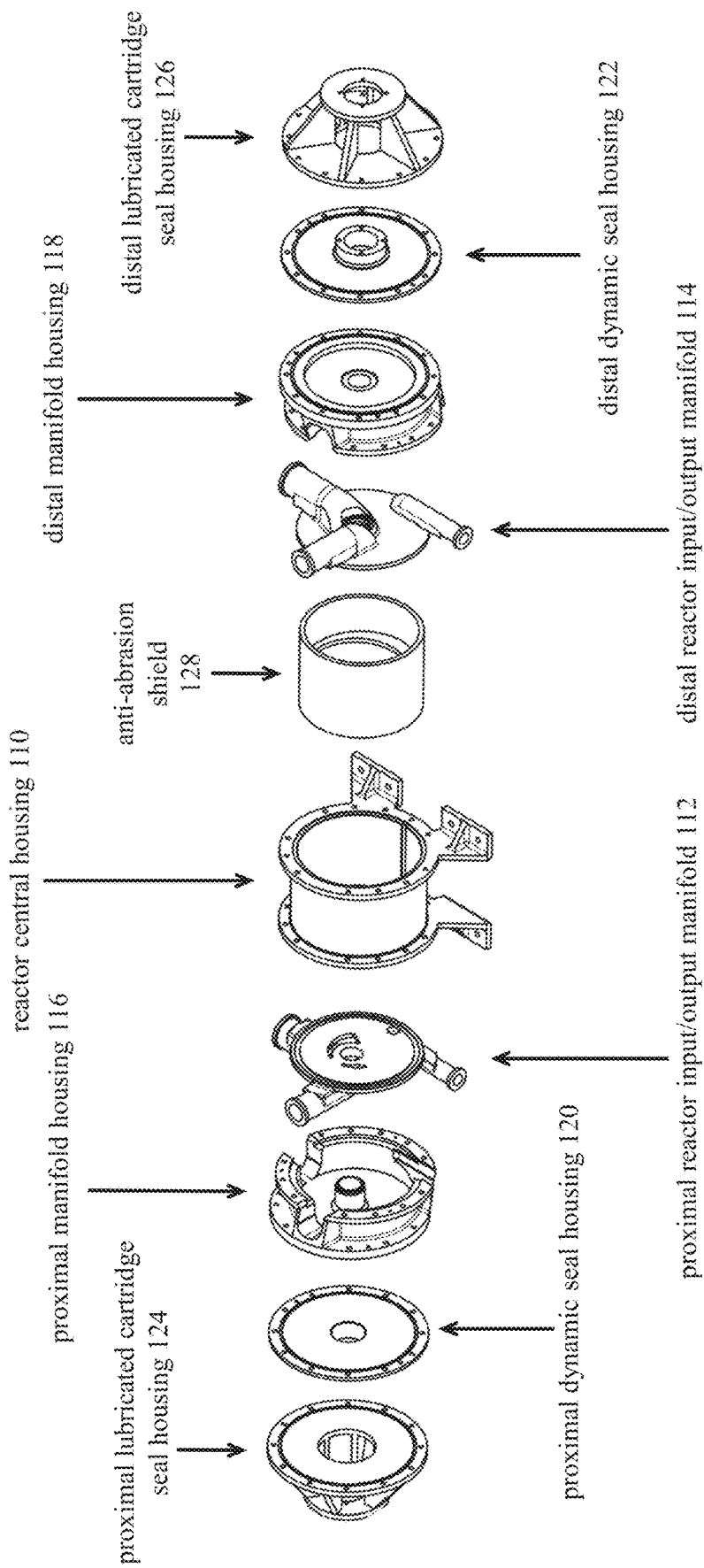
FIG. 4 (exploded perspective view) reactor stationary assembly (RSA) 102

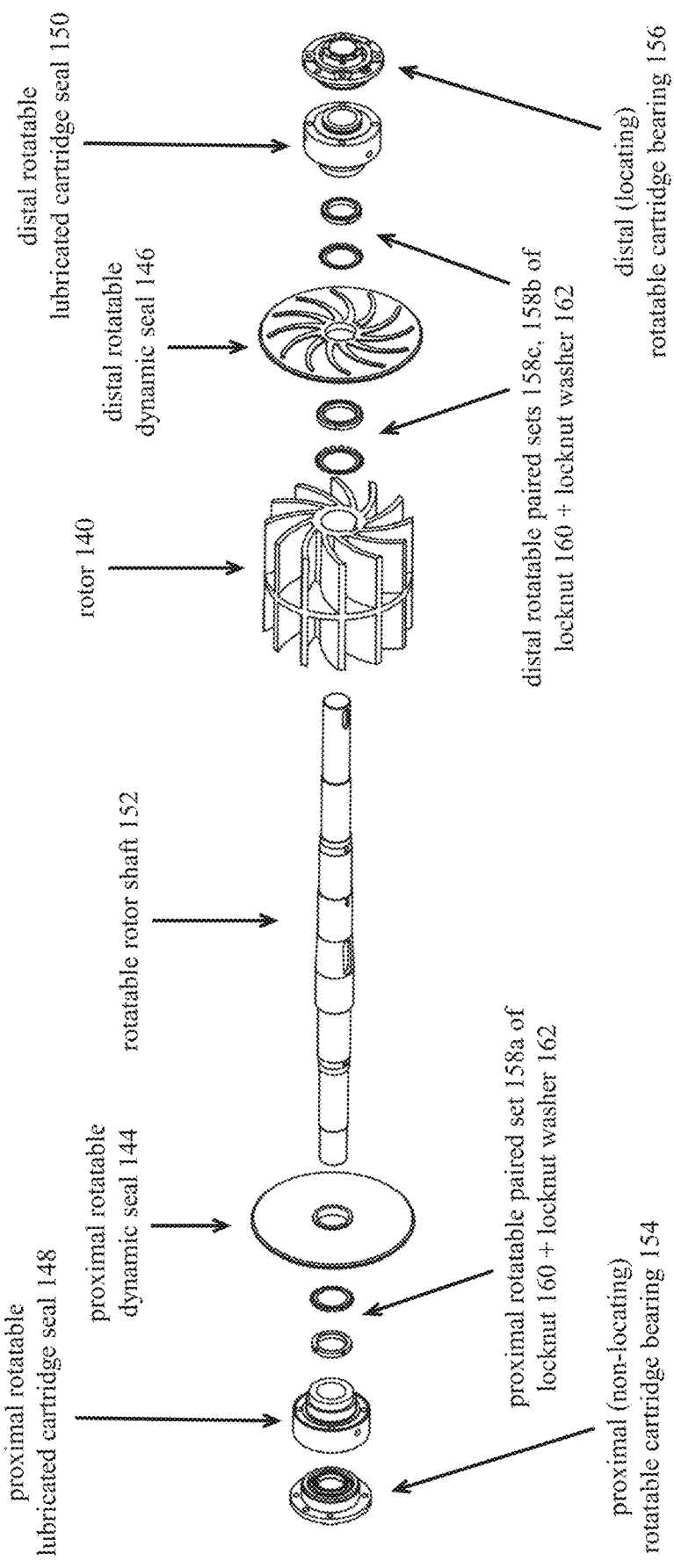
FIG. 5 (exploded perspective view) reactor rotary mixing assembly (RRMA) 104

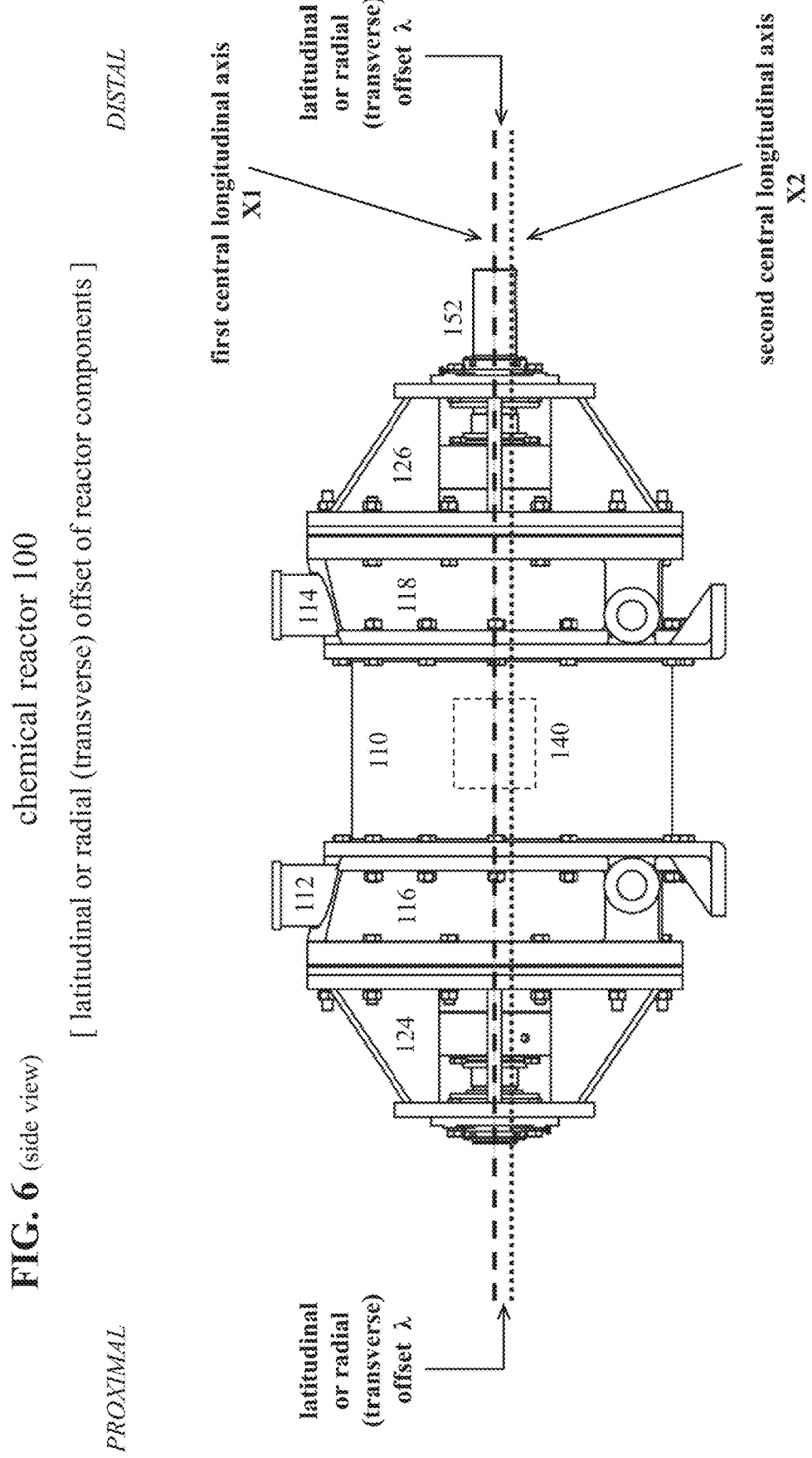
FIG. 6 (side view)
chemical reactor 100
[ latitudinal or radial (transverse) offset of reactor components ]

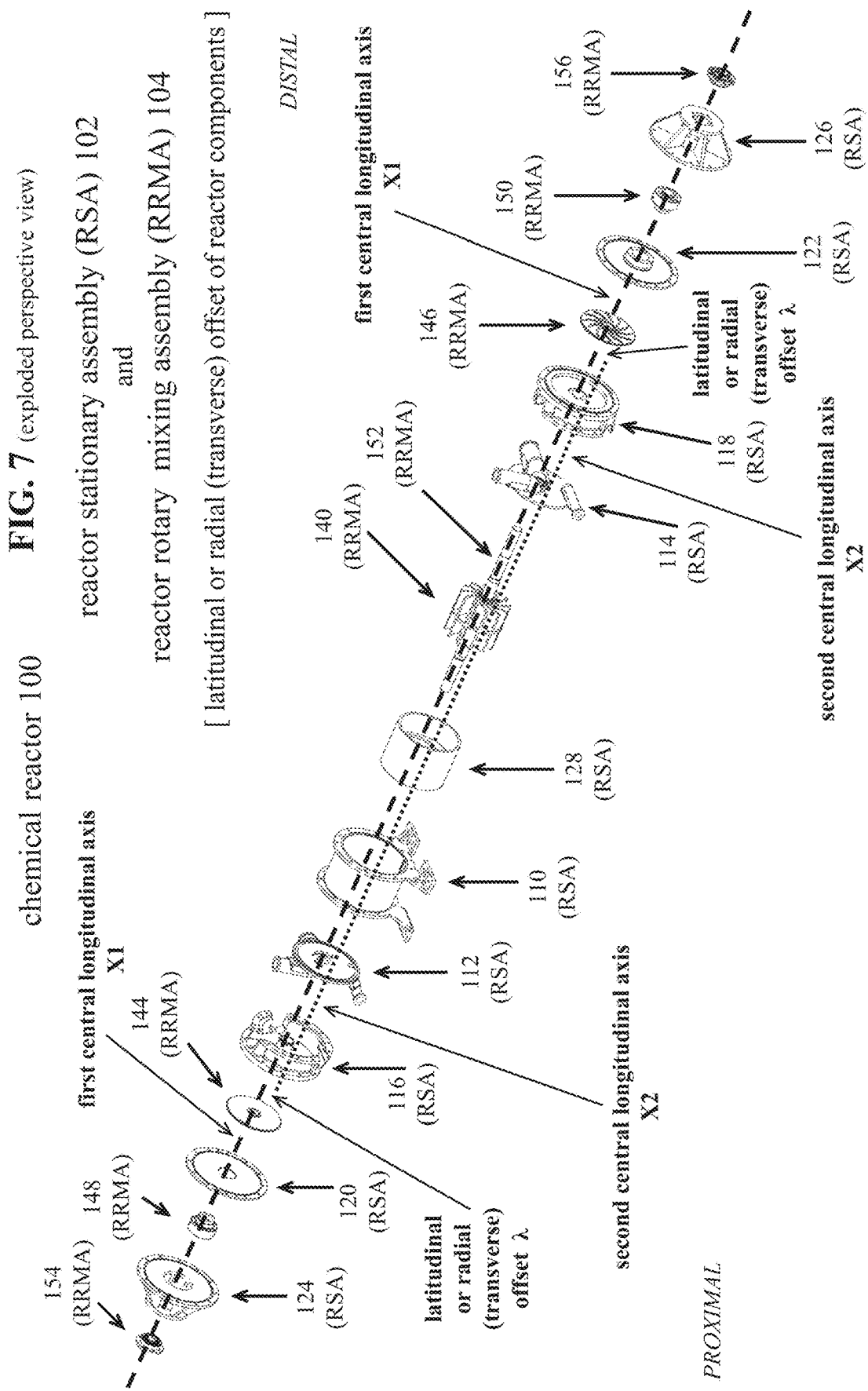

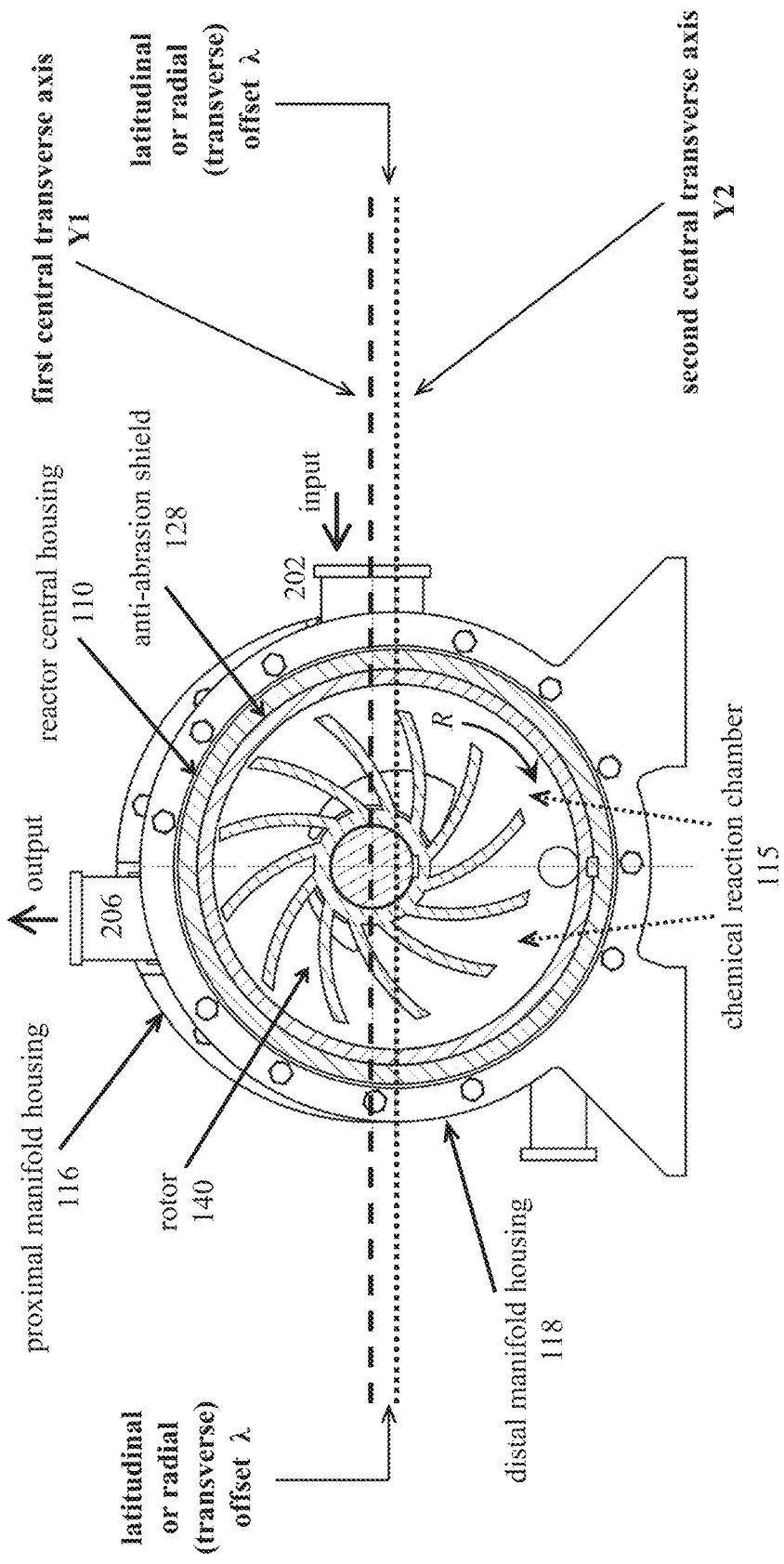

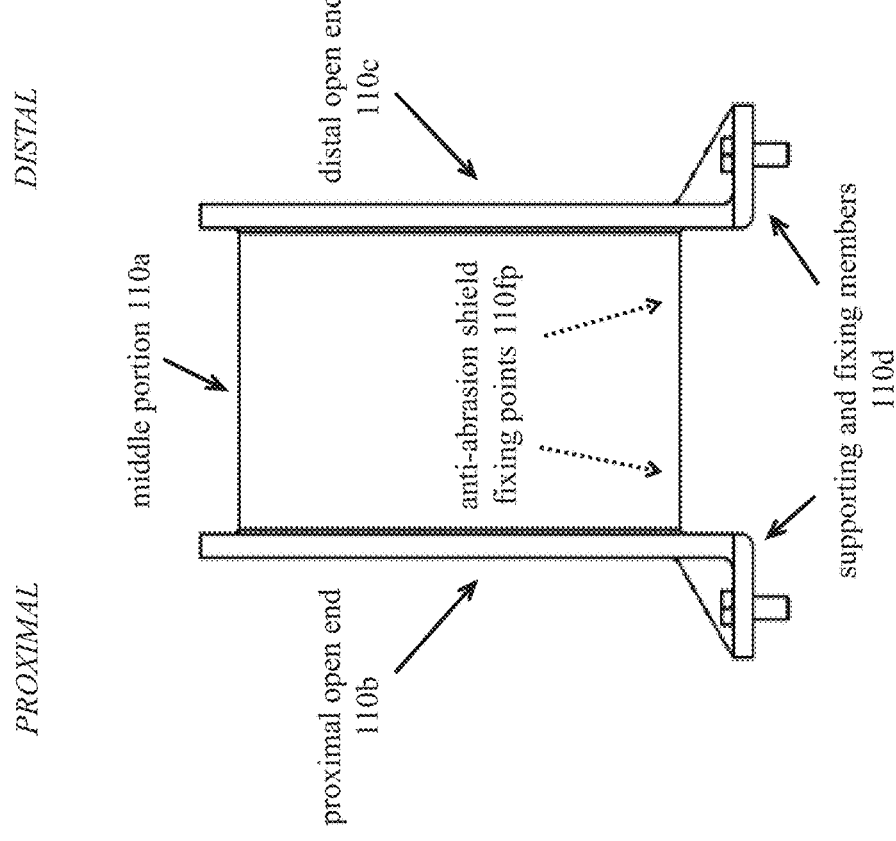
FIG. 9B (side view)
reactor central housing 110
(of the RSA 102)
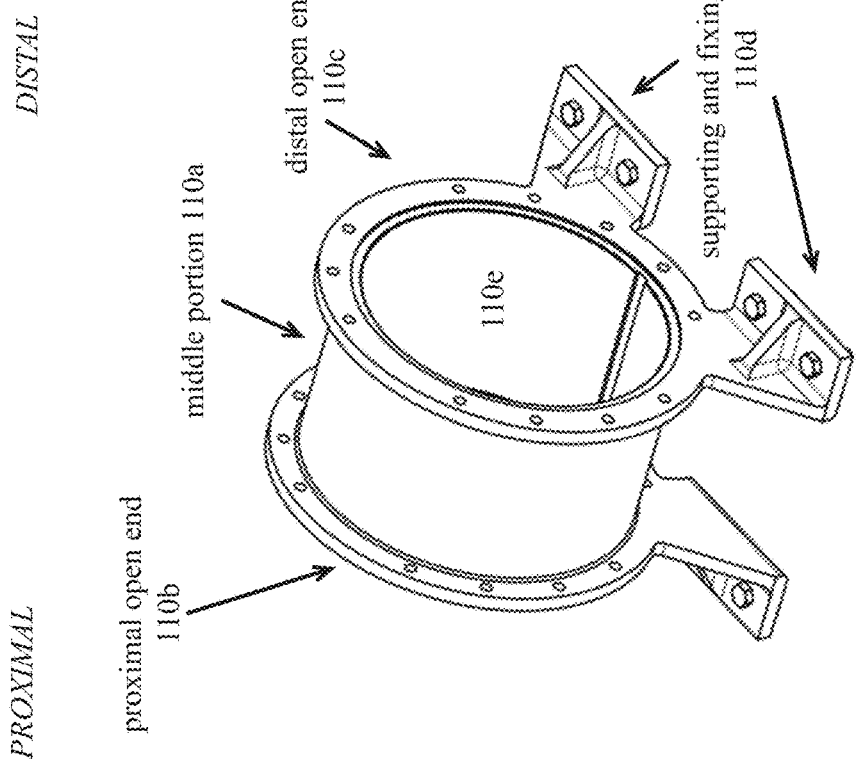
FIG. 9A (perspective view)
reactor central housing 110
(of the RSA 102)

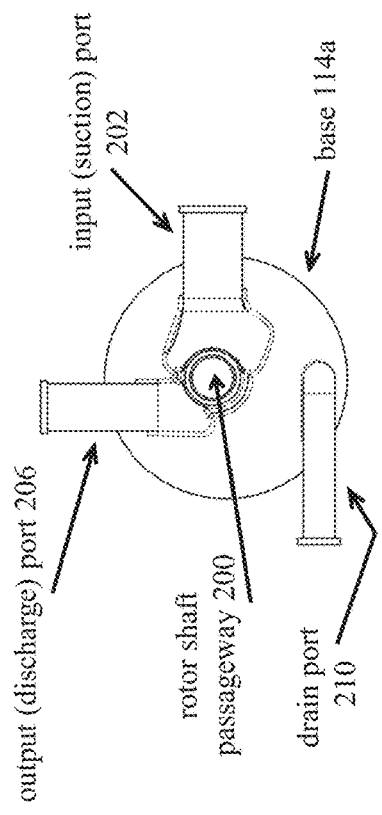
FIG. 10B (distal front view)
distal reactor input/output manifold 114 (of the RSA 102)
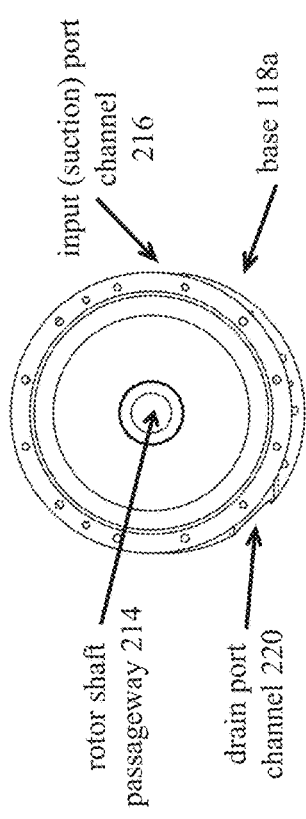
FIG. 11B (distal front view)
distal manifold housing 118 (of the RSA 102)
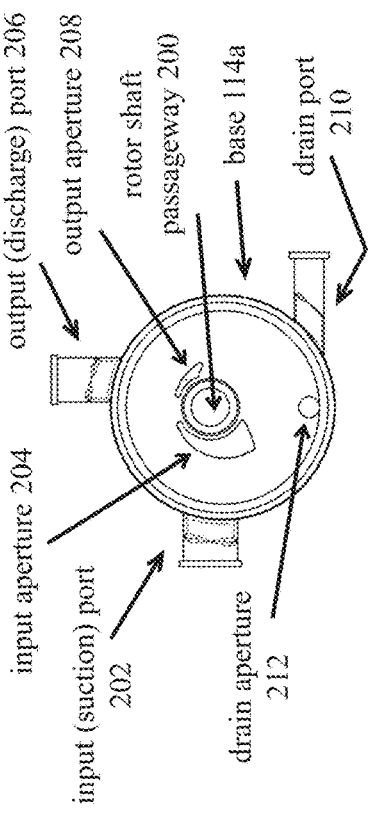
FIG. 10A (proximal front view)
distal reactor input/output manifold 114 (of the RSA 102)
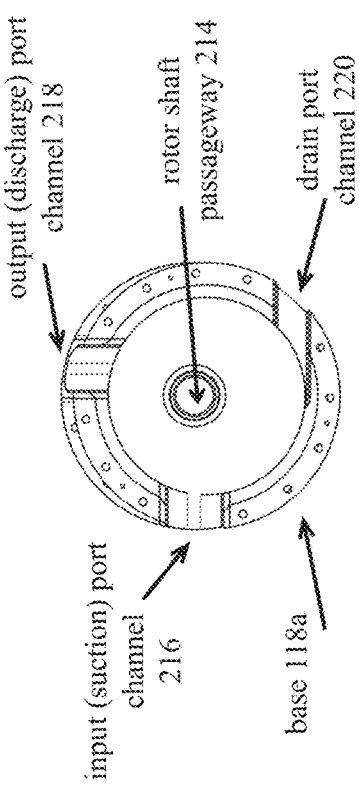
FIG. 11A (proximal front view)
distal manifold housing 118 (of the RSA 102)

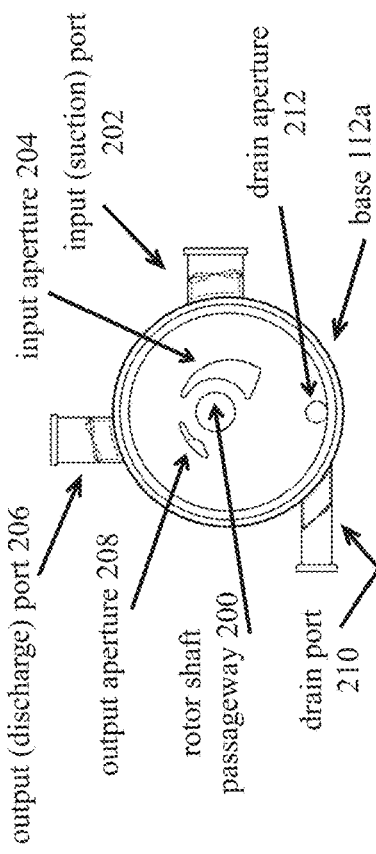
FIG. 12B (distal front view)
proximal reactor input/output manifold 112 (of the RSA 102)
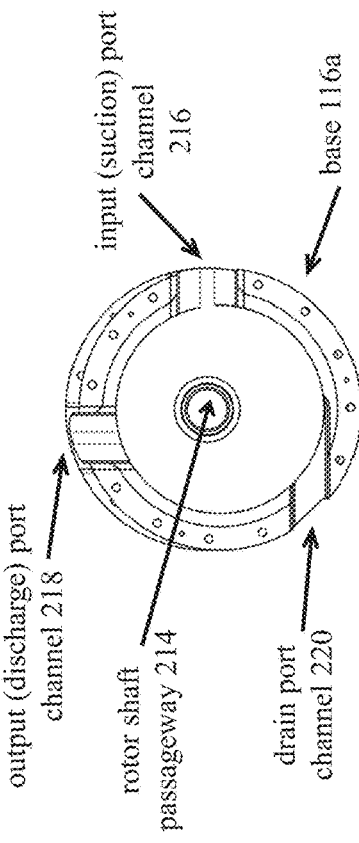
FIG. 13B (distal front view)
proximal manifold housing 116 (of the RSA 102)
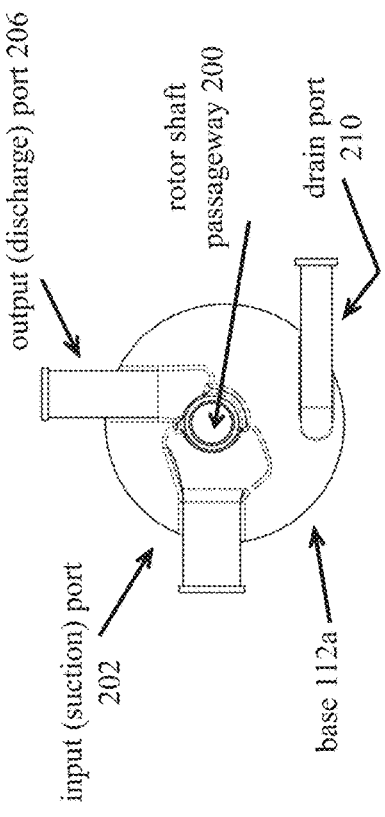
FIG. 12A (proximal front view)
proximal reactor input/output manifold 112 (of the RSA 102)
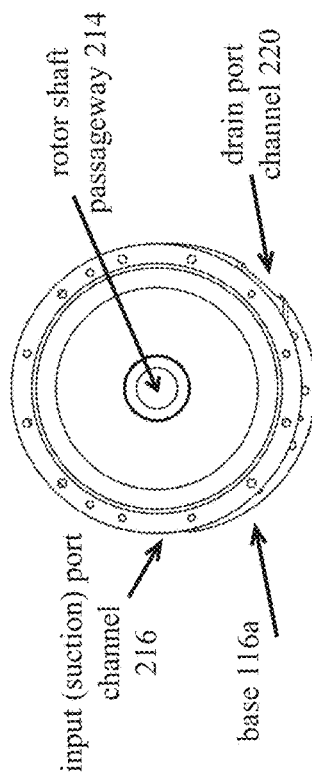
FIG. 13A (proximal front view)
proximal manifold housing 116 (of the RSA 102)

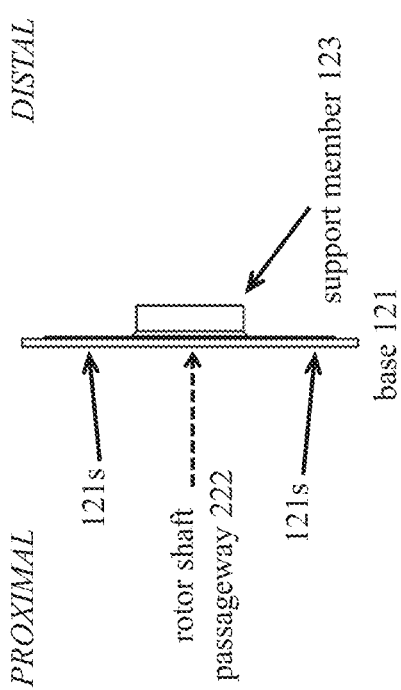
FIG. 14B (side view)
distal dynamic seal housing 122
(of the RSA 102)
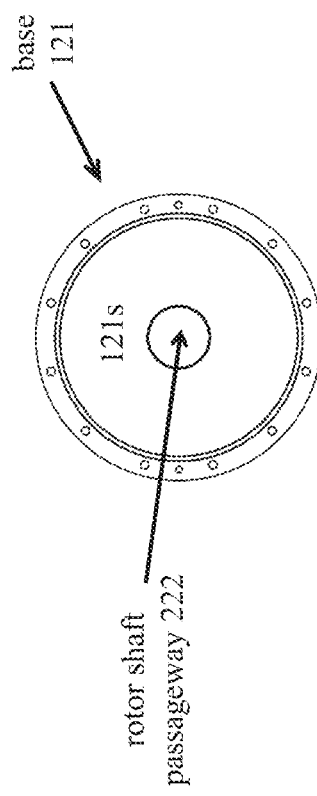
FIG. 14D (distal front view / proximal front view)
proximal / distal dynamic seal housing 120 / 122
(of the RSA 102)
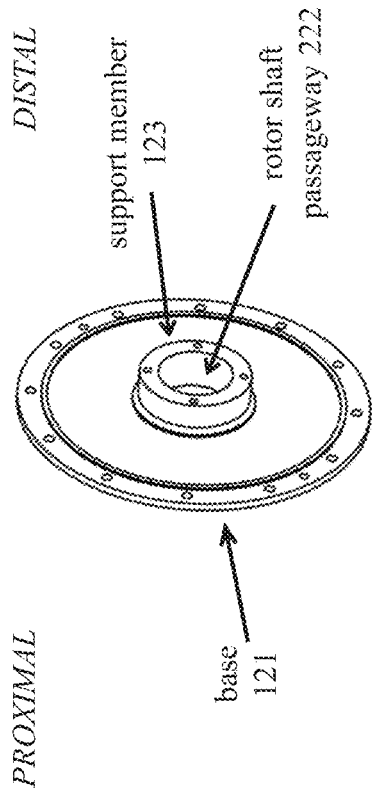
FIG. 14A (perspective view)
distal dynamic seal housing 122
(of the RSA 102)
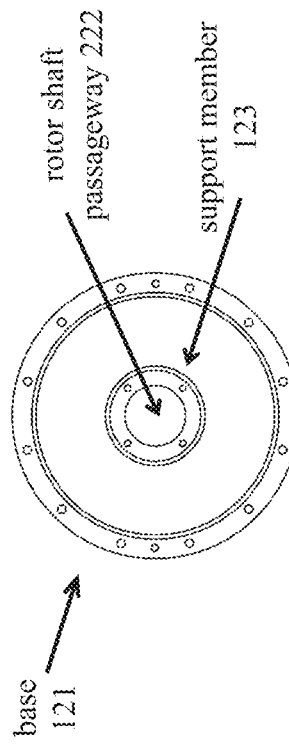
FIG. 14C (proximal front view / distal front view)
proximal / distal dynamic seal housing 120 / 122
(of the RSA 102)

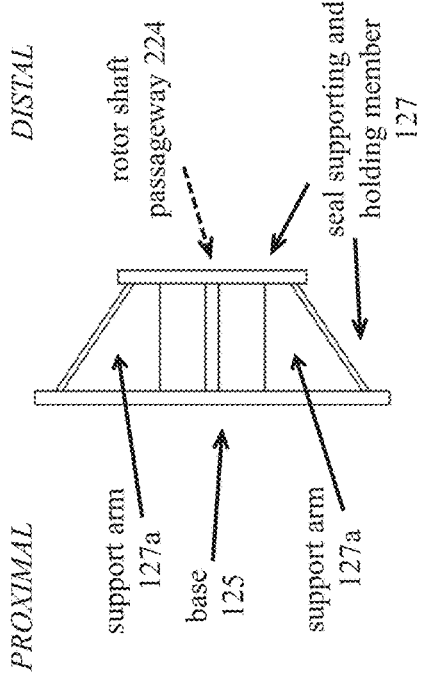

FIG. 15B (side view)
distal lubricated cartridge seal housing 126
(of the RSA 102)

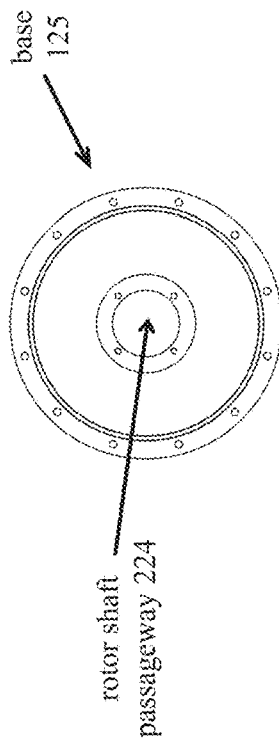

FIG. 15D (distal front view / proximal front view)
proximal / distal lubricated cartridge seal housing 124 / 126
(of the RSA 102)

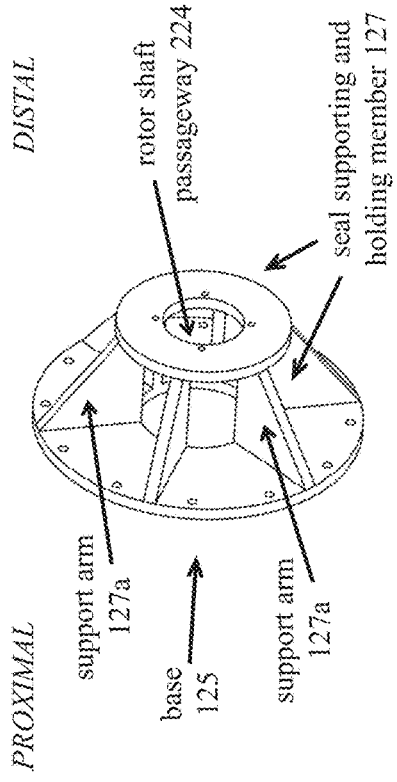

FIG. 15A (perspective view)
distal lubricated cartridge seal housing 126
(of the RSA 102)

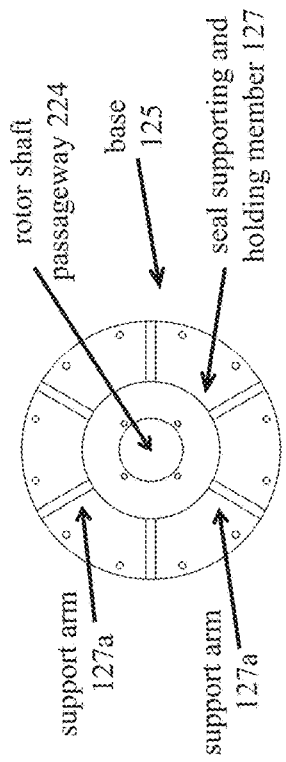

FIG. 15C (proximal front view / distal front view)
proximal / distal lubricated cartridge seal housing 124 / 126
(of the RSA 102)

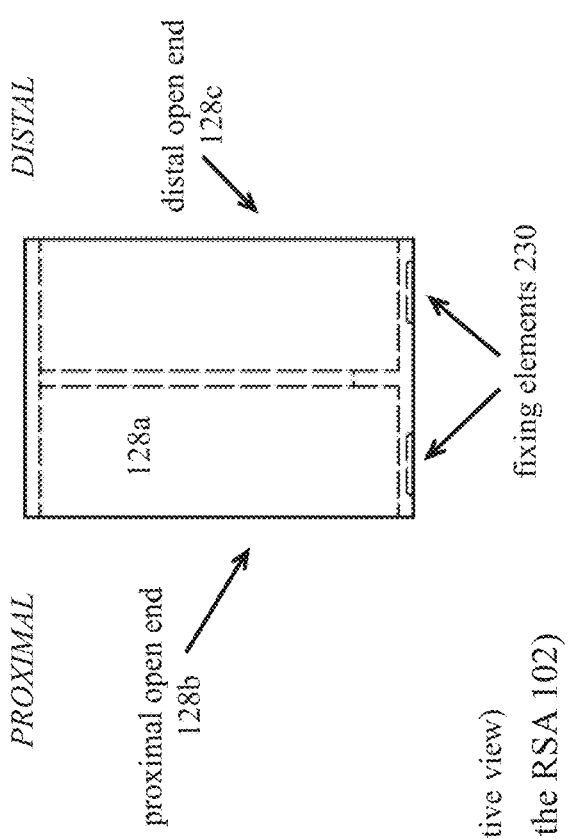
FIG. 16A (tilted front view)
anti-abrasion shield 128 (of the RSA 102)
FIG. 16B (side view)
anti-abrasion shield 128 (of the RSA 102)
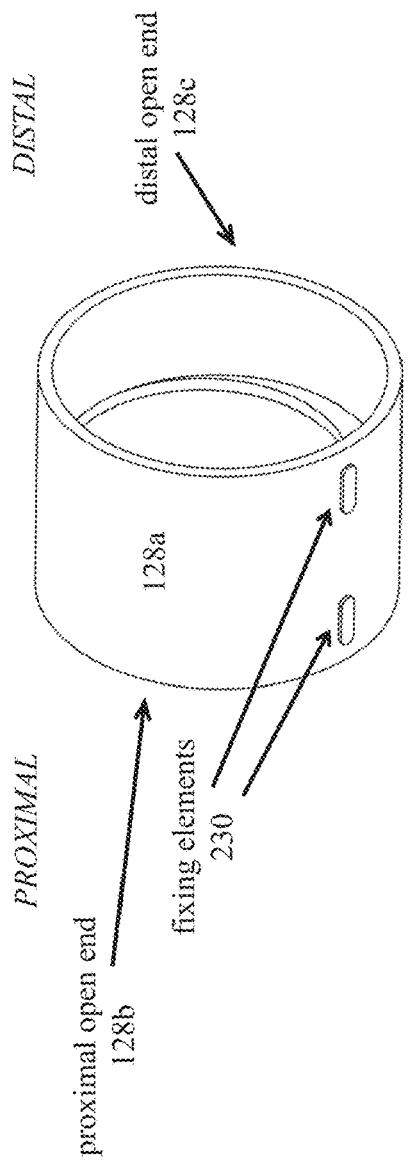
FIG. 16C (perspective view)
anti-abrasion shield 128 (of the RSA 102)

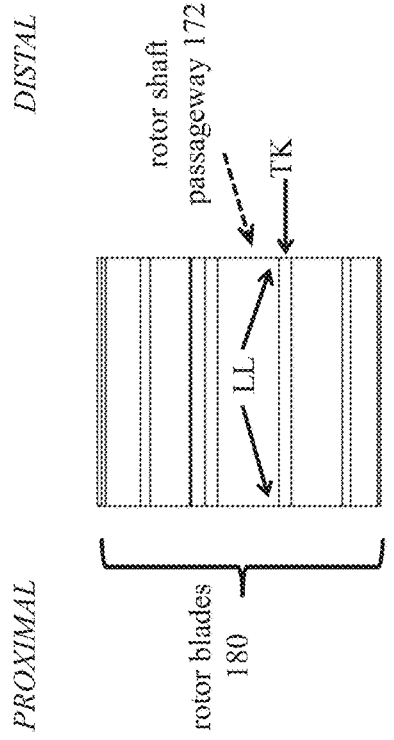
FIG. 17B (side view)
rotor 140 (of the RRMA 104)
[ *without* reinforcement disc 190 ]
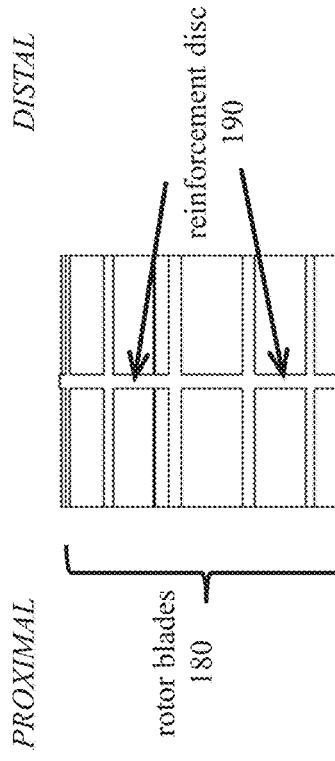
FIG. 18B (side view)
rotor 140 (of the RRMA 104)
[ *with* reinforcement disc 190 ]
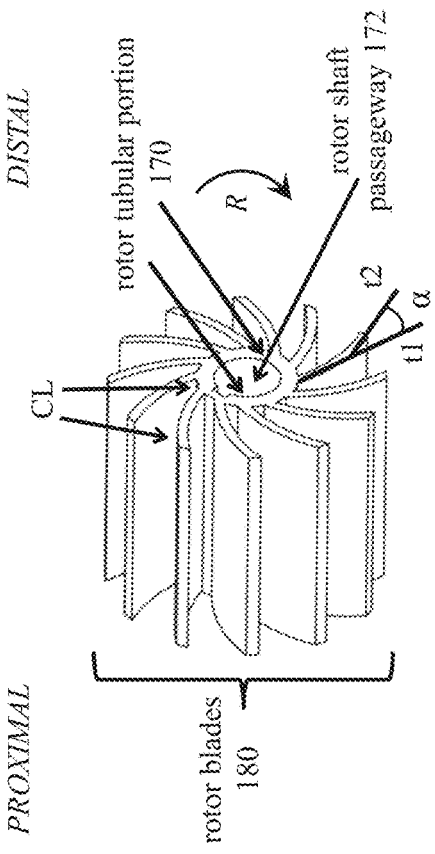
FIG. 17A (perspective view)
rotor 140 (of the RRMA 104)
[ *without* reinforcement disc 190 ]
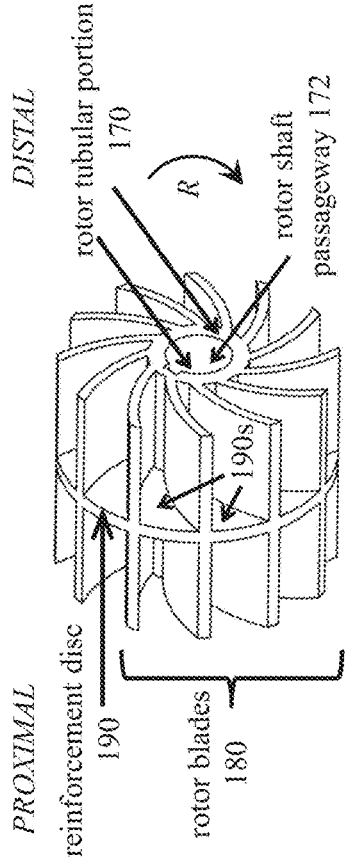
FIG. 18A (perspective view)
rotor 140 (of the RRMA 104)
[ *with* reinforcement disc 190 ]

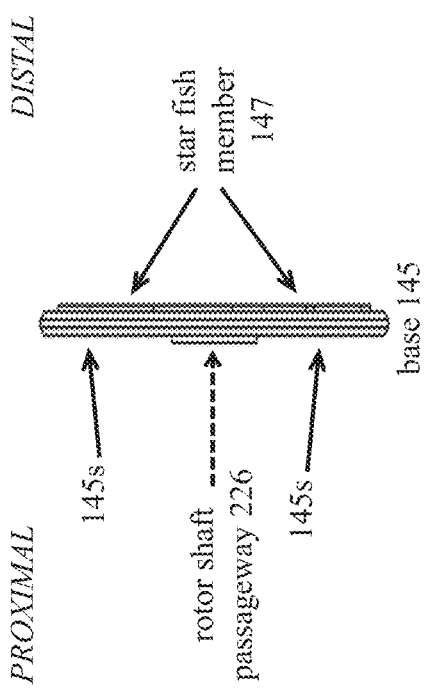
FIG. 19B (side view)
distal rotatable dynamic seal 146
(of the RRMA 104)
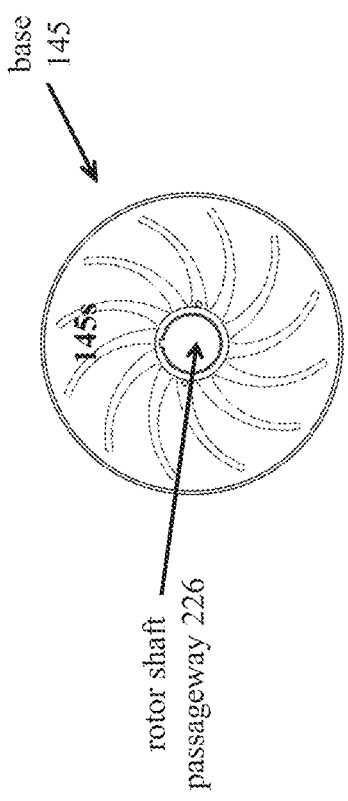
FIG. 19D (distal front view / proximal front view)
proximal / distal rotatable dynamic seal 144 / 146
(of the RRMA 104)
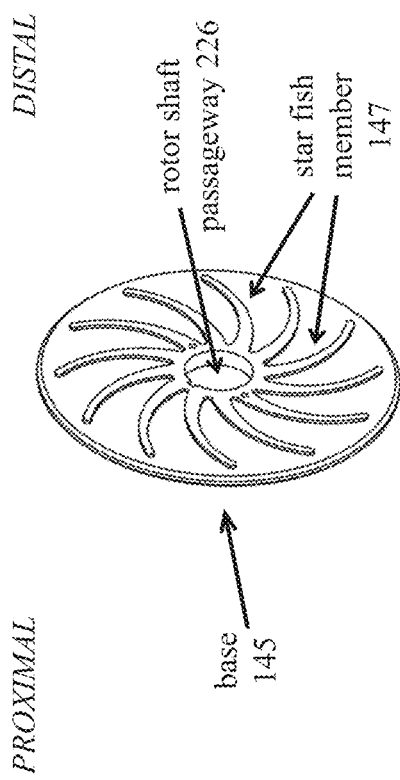
FIG. 19A (perspective view)
distal rotatable dynamic seal 146
(of the RRMA 104)
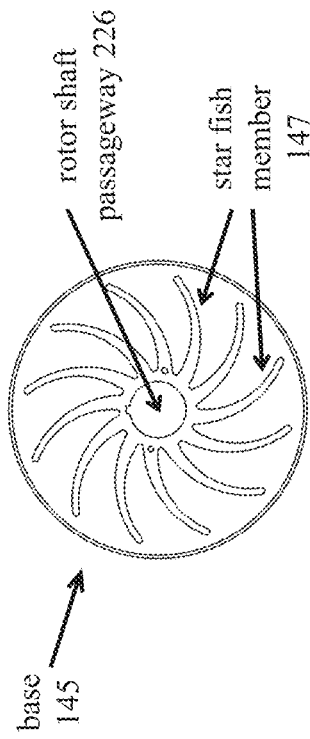
FIG. 19C (proximal front view / distal front view)
proximal / distal rotatable dynamic seal 144 / 146
(of the RRMA 104)

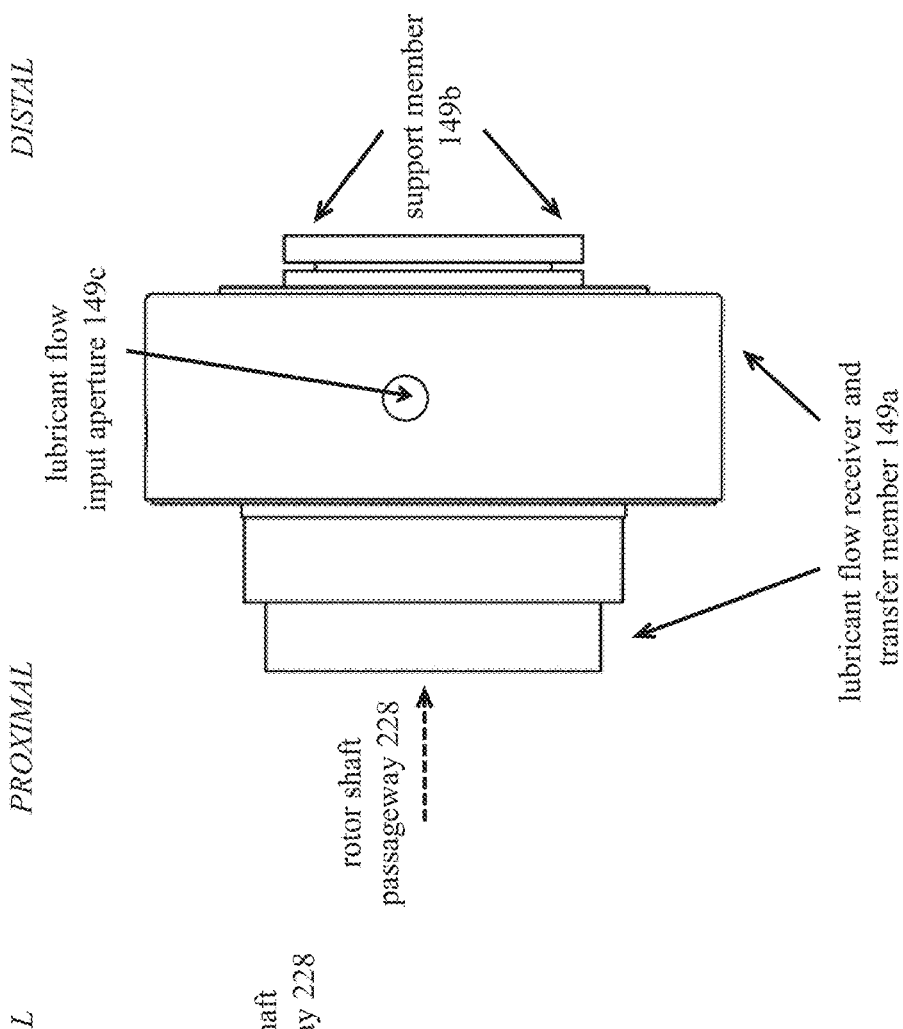
FIG. 20B (side view)
distal rotatable lubricated cartridge seal 150
(of the RRMA 104)
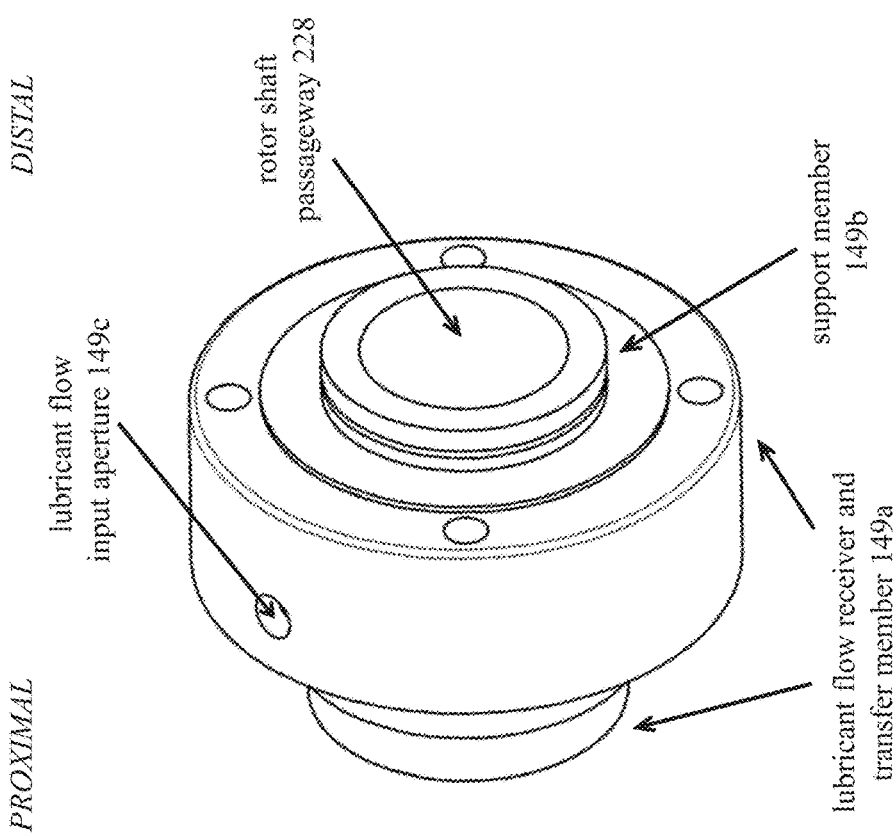
FIG. 20A (perspective view)
distal rotatable lubricated cartridge seal 150
(of the RRMA 104)

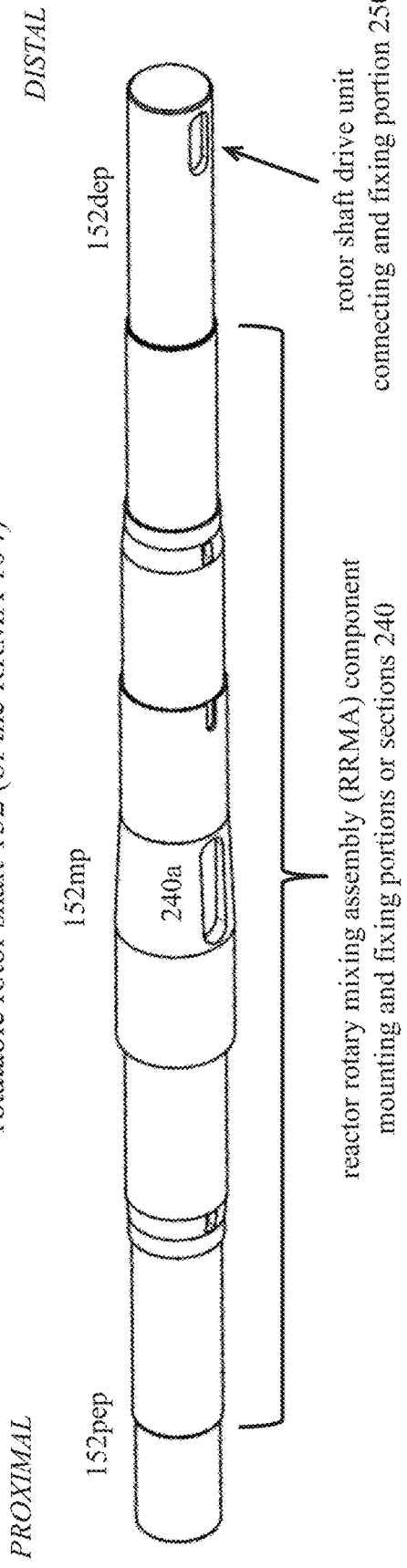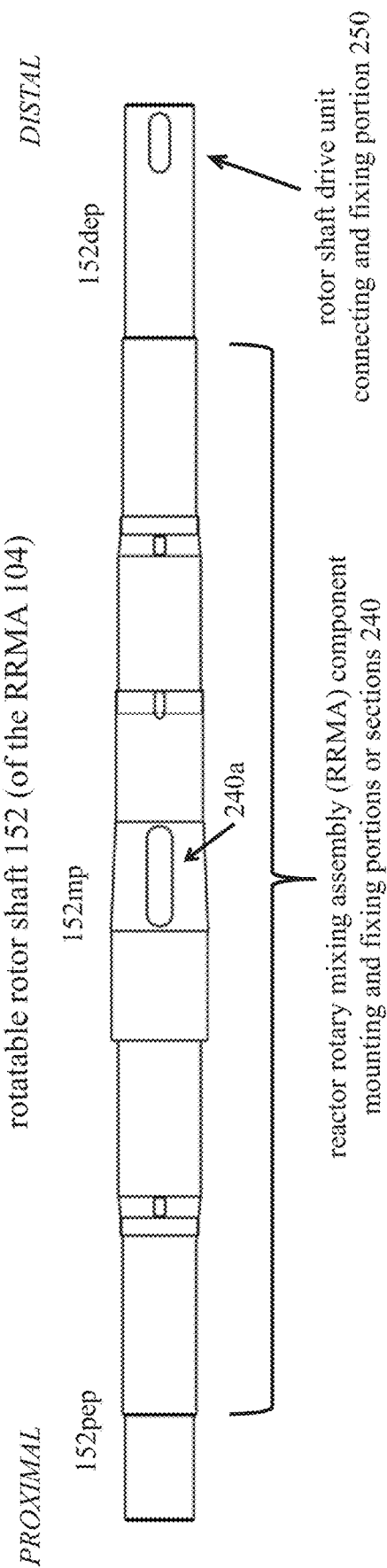

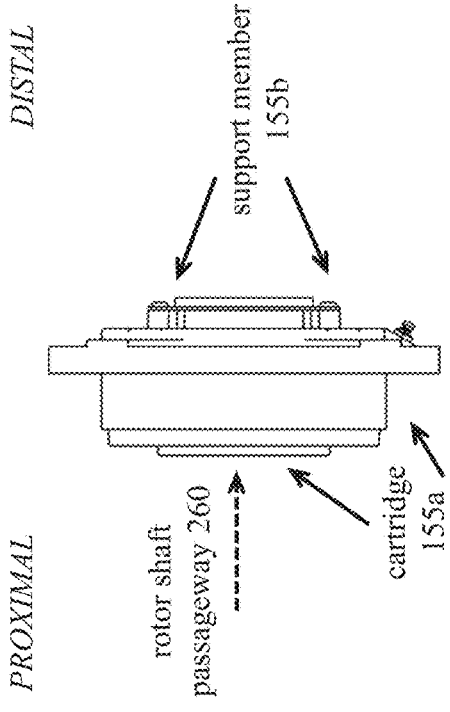
FIG. 22A (perspective view)
distal rotatable cartridge bearing 156
(of the RRMA 104)
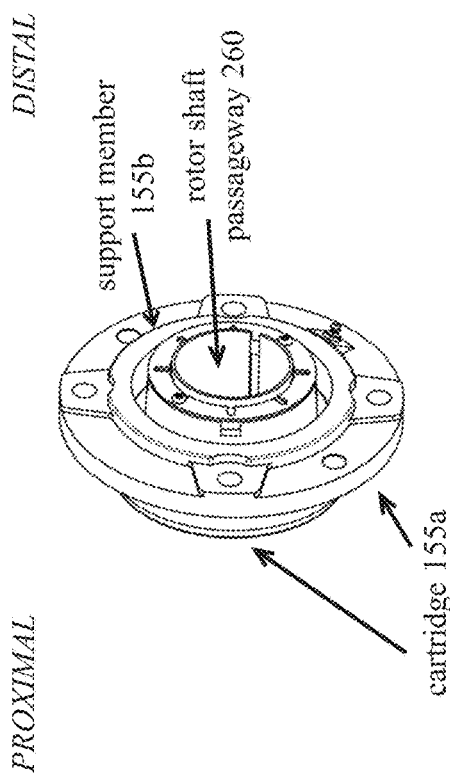
FIG. 22B (side view)
distal rotatable cartridge bearing 156
(of the RRMA 104)
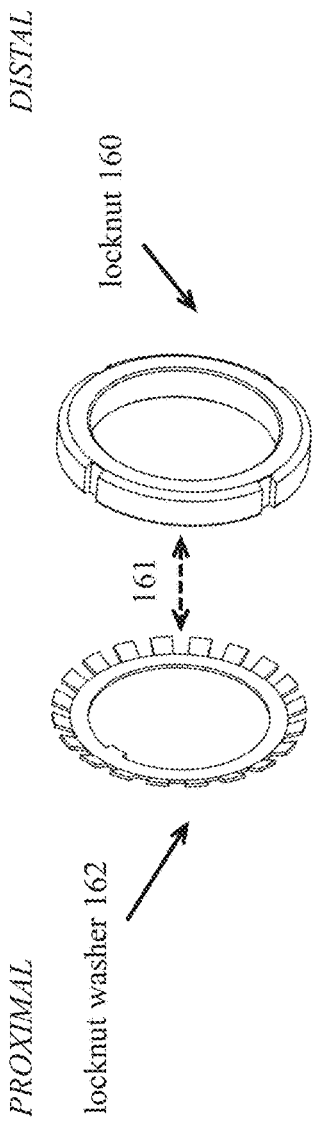
FIG. 23 (perspective view)
distal rotatable paired set 158b of a locknut 160 and a locknut washer 162
(of the RRMA 104)

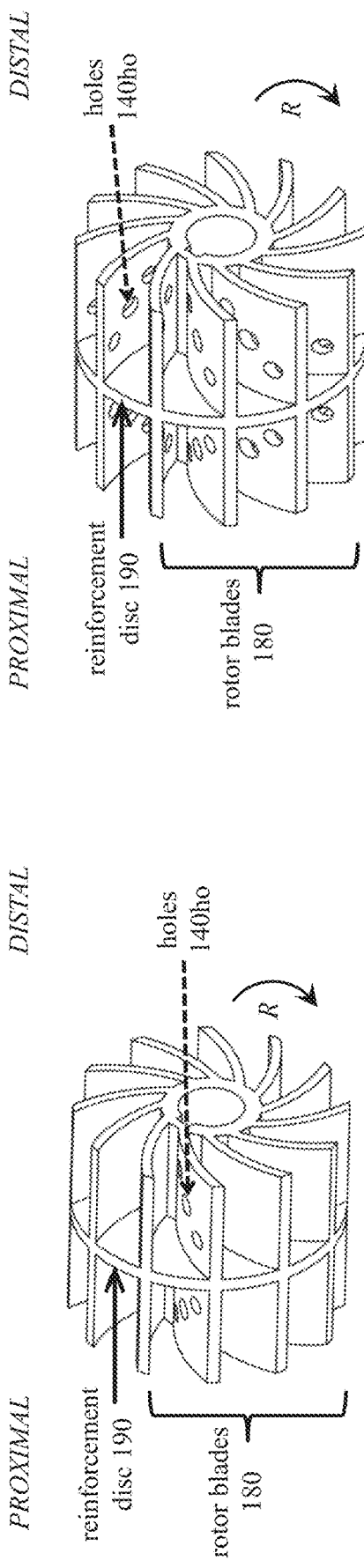
FIG. 24A (perspective view)
rotor 140 [ hole openings - in *one* blade ]
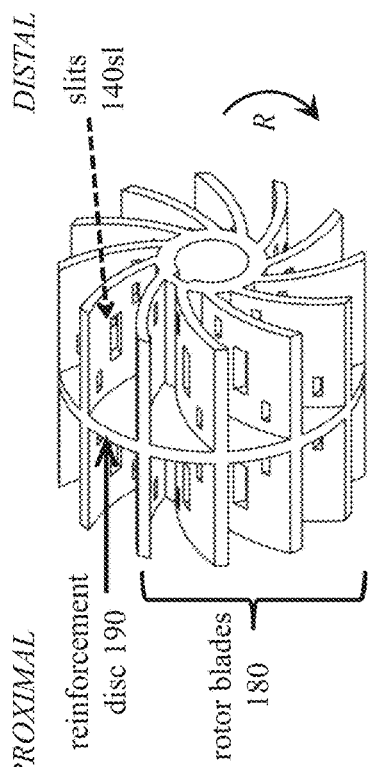
FIG. 24B (perspective view)
rotor 140 [ hole openings - in *all* blades ]
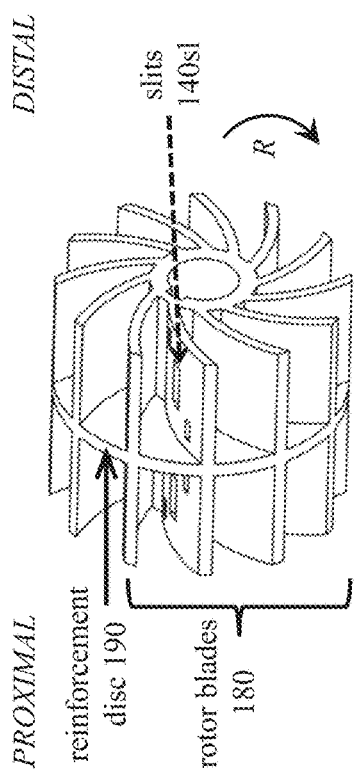
FIG. 25A (perspective view)
rotor 140 [ slit openings - in *one* blade ]
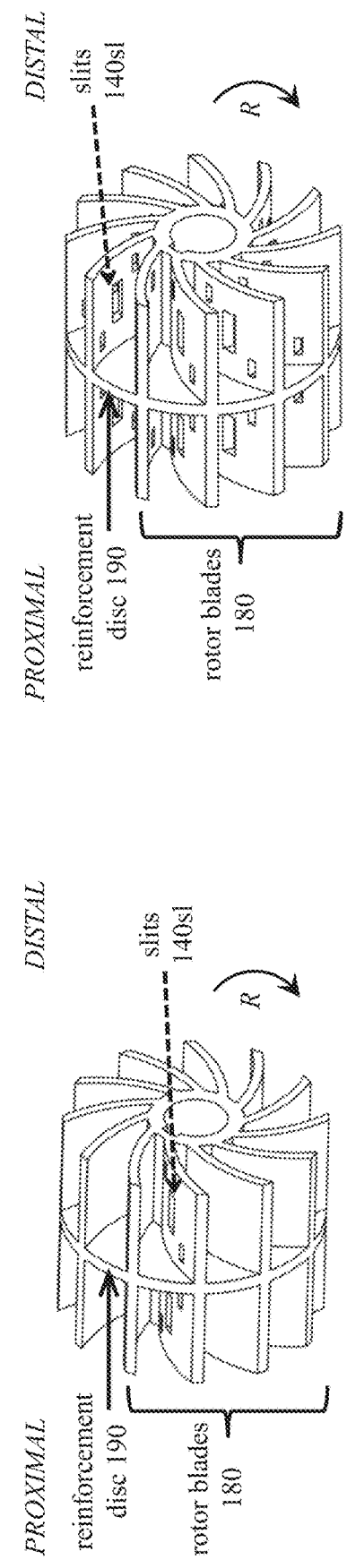
FIG. 25B (perspective view)
rotor 140 [ slit openings - in *all* blades ]

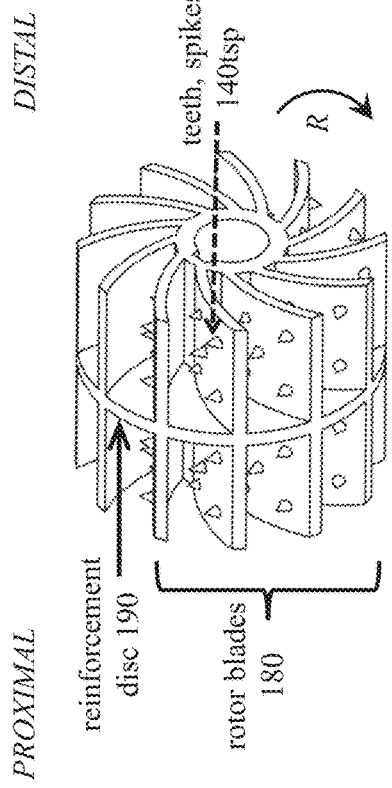
FIG. 26A (perspective view)
rotor 140 [ *teeth or spike protrusions on convex side of one blade* ]
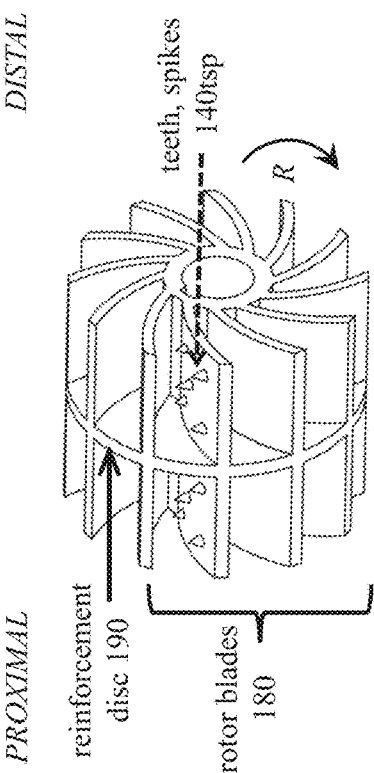
FIG. 26B (perspective view)
rotor 140 [ *teeth or spike protrusions on convex side of all blades* ]
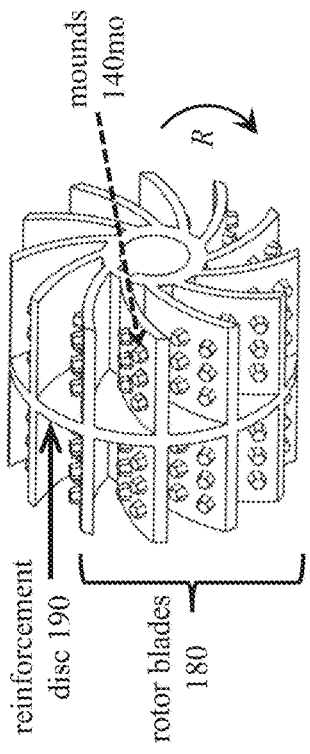
FIG. 27A (perspective view)
rotor 140 [ *mound protrusions on convex side of one blade* ]
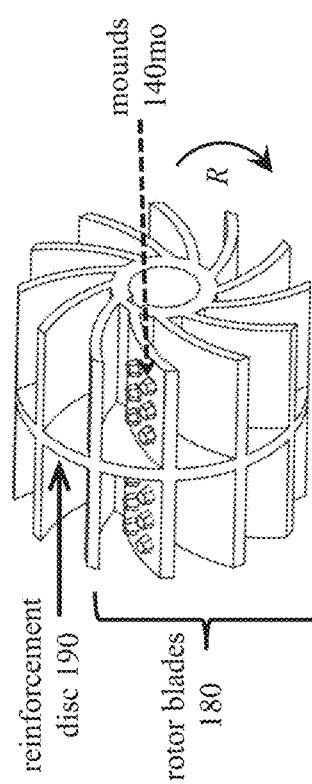
FIG. 27B (perspective view)
rotor 140 [ *mound protrusions on convex side of all blades* ]

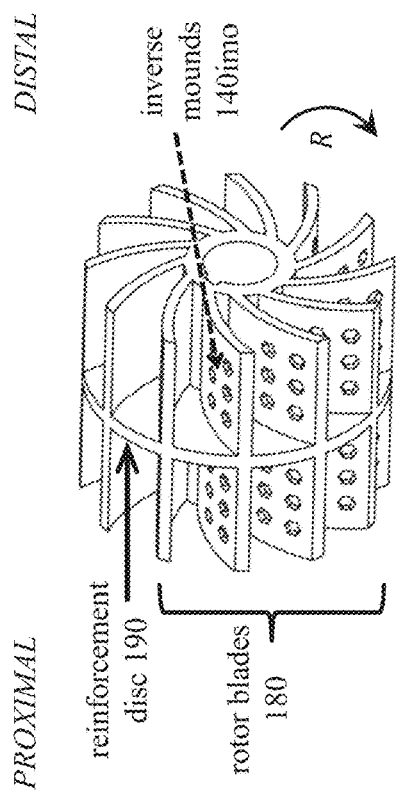
FIG. 28A (perspective view)
rotor 140 [ *depressions* in convex side of *one blade* ]
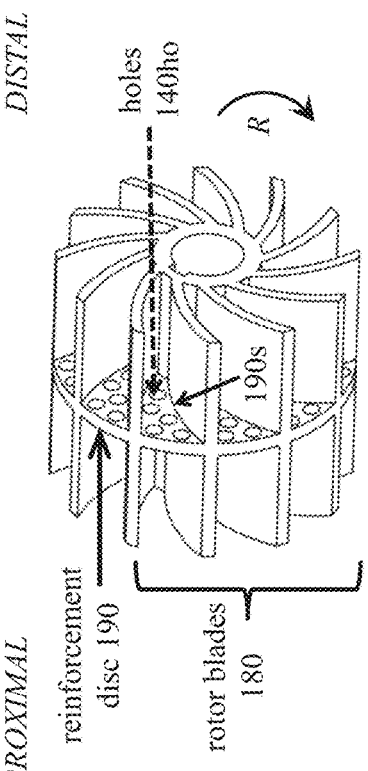
FIG. 28B (perspective view)
rotor 140 [ *depressions* in convex side of *all blades* ]
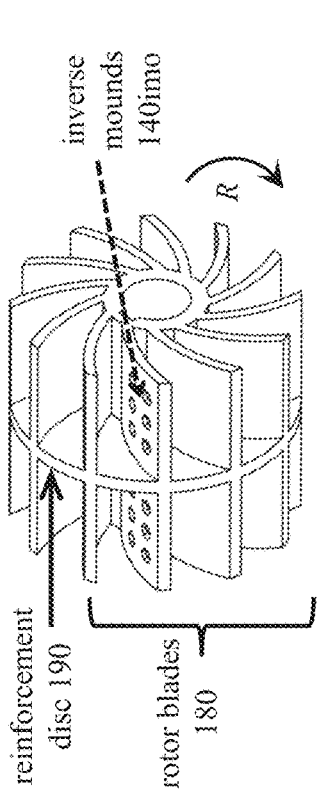
FIG. 29A (perspective view)
rotor 140 [ *hole openings* - in *one sector* of the reinforcement disc ]
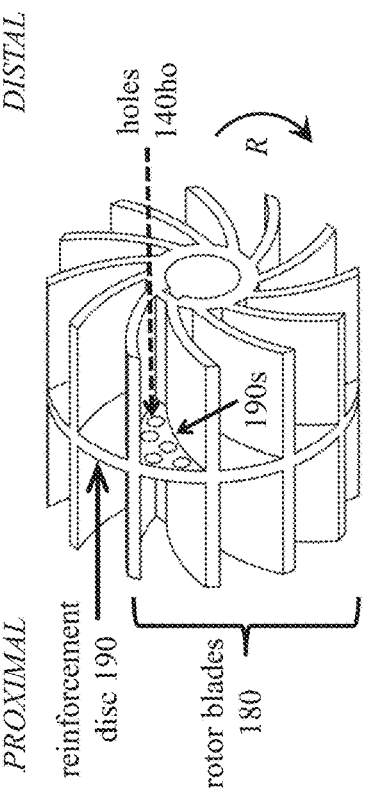
FIG. 29B (perspective view)
rotor 140 [ *hole openings* - in *all sectors* of the reinforcement disc ]

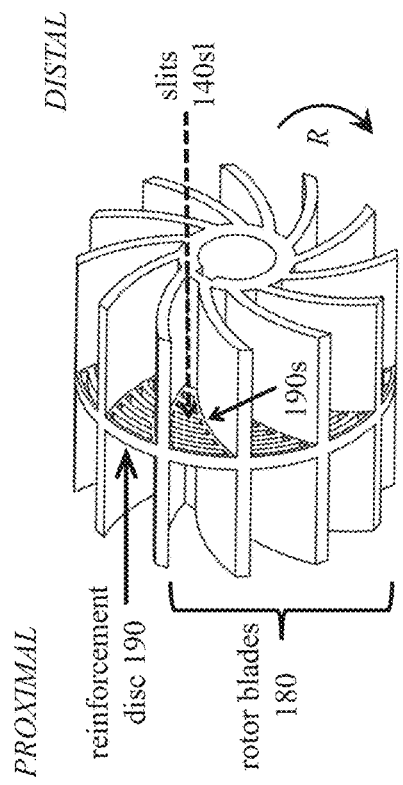

FIG. 30A (perspective view)
rotor 140 [ *slit openings in one sector of reinforcement disc* ]

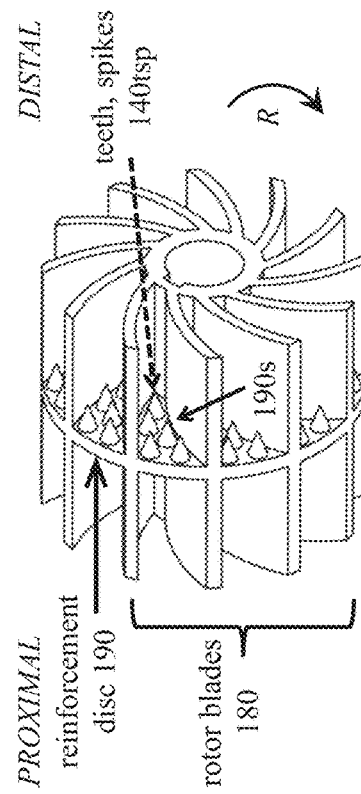

FIG. 30B (perspective view)
rotor 140 [ *slit openings in all sectors of reinforcement disc* ]

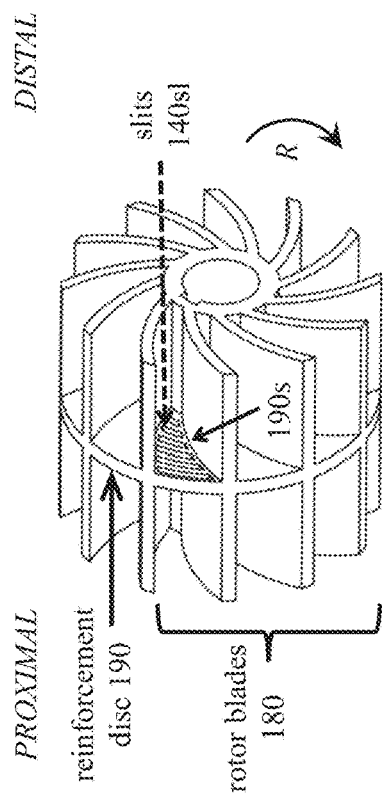

FIG. 31A (perspective view)
rotor 140 [ *teeth or spike protrusions on one distal side sector of reinforcement disc* ]

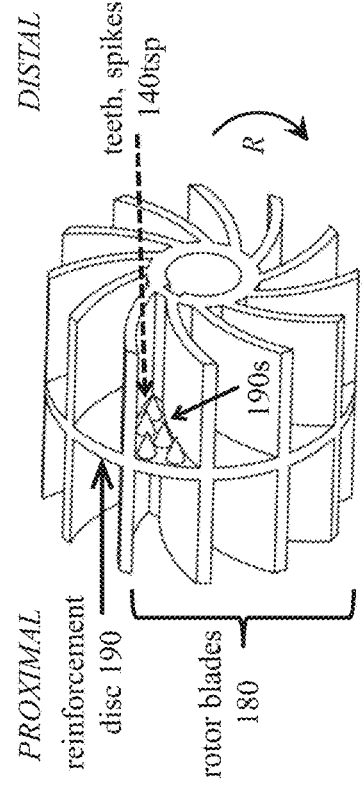

FIG. 31B (perspective view)
rotor 140 [ *teeth or spike protrusions on all distal side sectors of reinforcement disc* ]

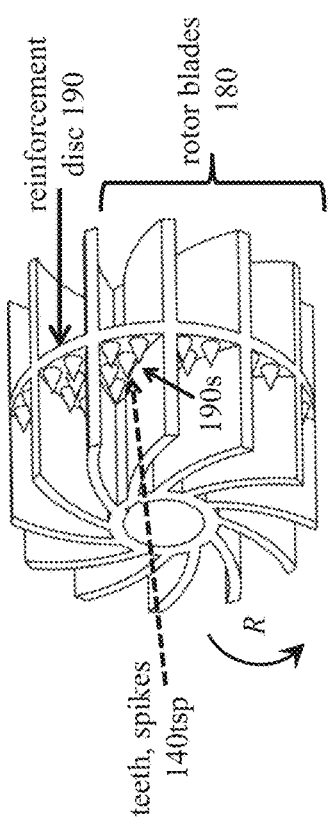

FIG. 32B (perspective view)
rotor 140 [ *teeth or spike protrusions on all proximal side sectors of reinforcement disc* ]

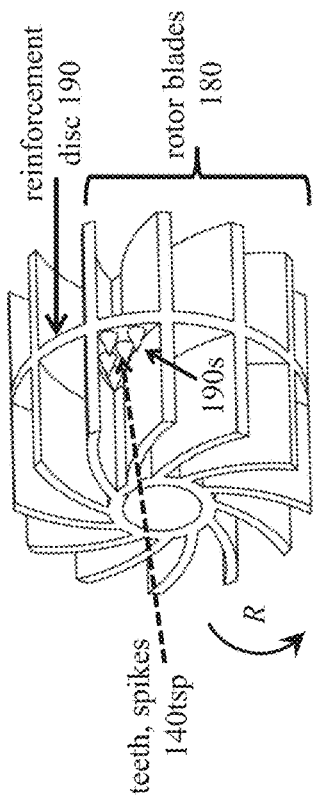

FIG. 32A (perspective view)
rotor 140 [ *teeth or spike protrusions on one proximal side sector of reinforcement disc* ]

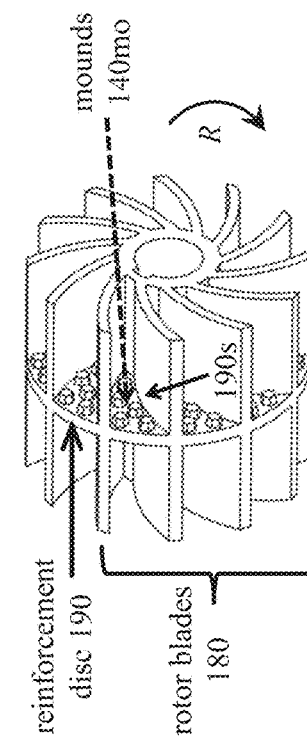

FIG. 33B (perspective view)
rotor 140 [ *mound protrusions on all distal side sectors of reinforcement disc* ]

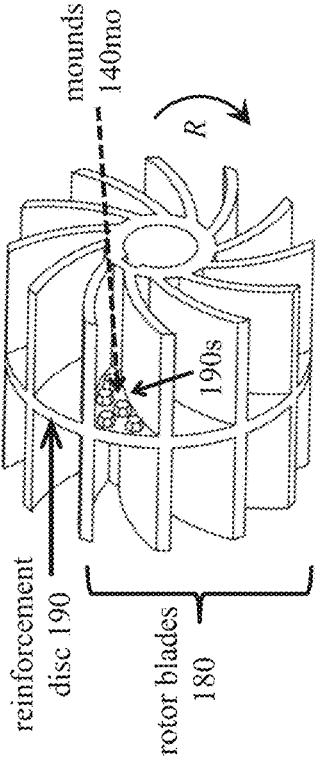

FIG. 33A (perspective view)
rotor 140 [ *mound protrusions on one distal side sector of reinforcement disc* ]

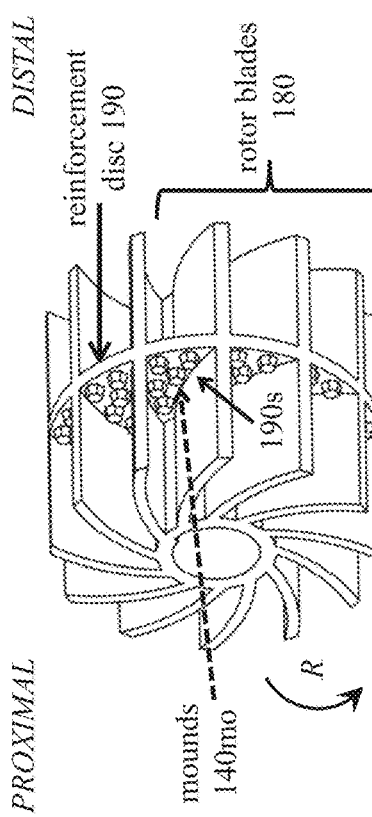

FIG. 34A (perspective view)
rotor 140 [ *mound protrusions*
on *one* proximal side sector of reinforcement disc ]

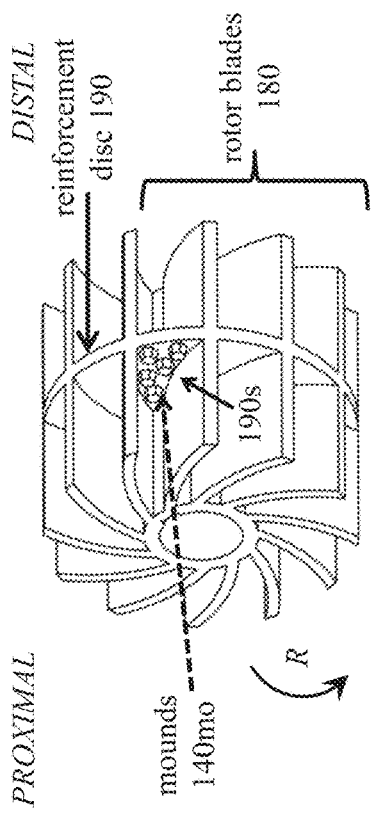

FIG. 34B (perspective view)
rotor 140 [ *mound protrusions*
on *all* proximal side sectors of reinforcement disc ]

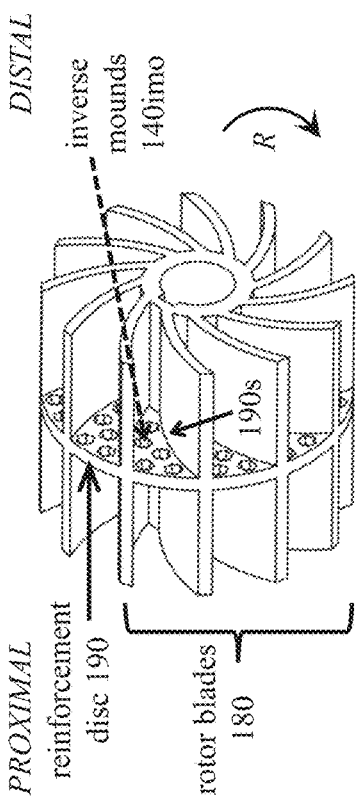

FIG. 35A (perspective view)
rotor 140 [ *depressions*
in *one* distal side sector of reinforcement disc ]

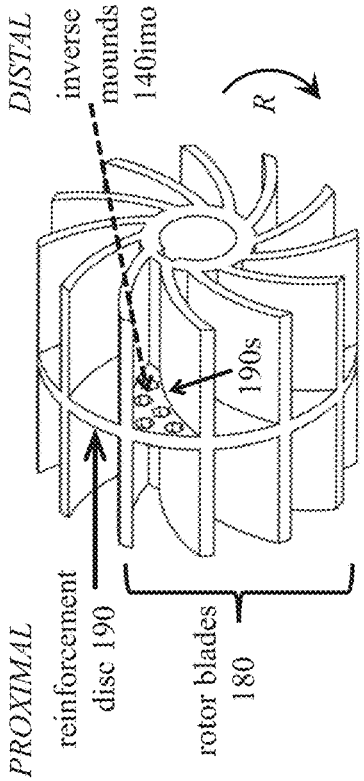

FIG. 35B (perspective view)
rotor 140 [ *depressions*
in *all* distal side sectors of reinforcement disc ]

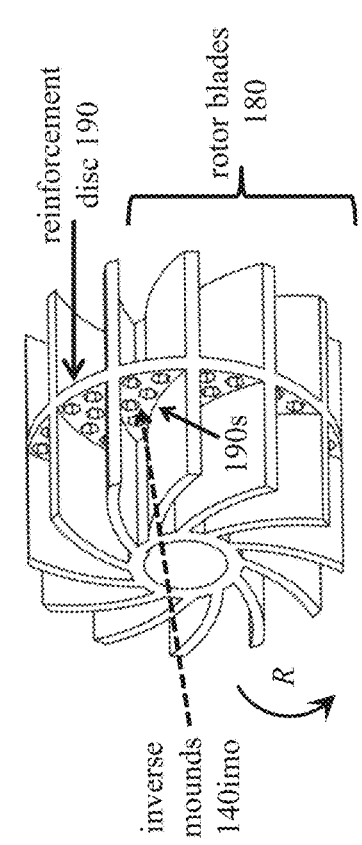
FIG. 36A (perspective view)
rotor 140 [ *depressions*
in *one* proximal side sector of reinforcement disc ]
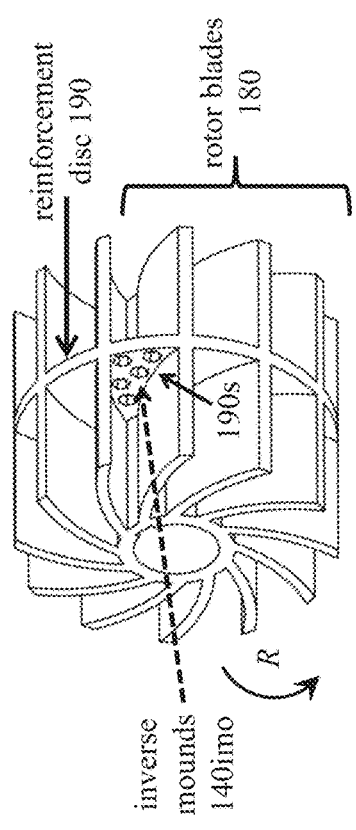
FIG. 36B (perspective view)
rotor 140 [ *depressions*
in *all* proximal side sectors of reinforcement disc ]

chemical reactor 100
[ connected to a rotor shaft drive unit ]

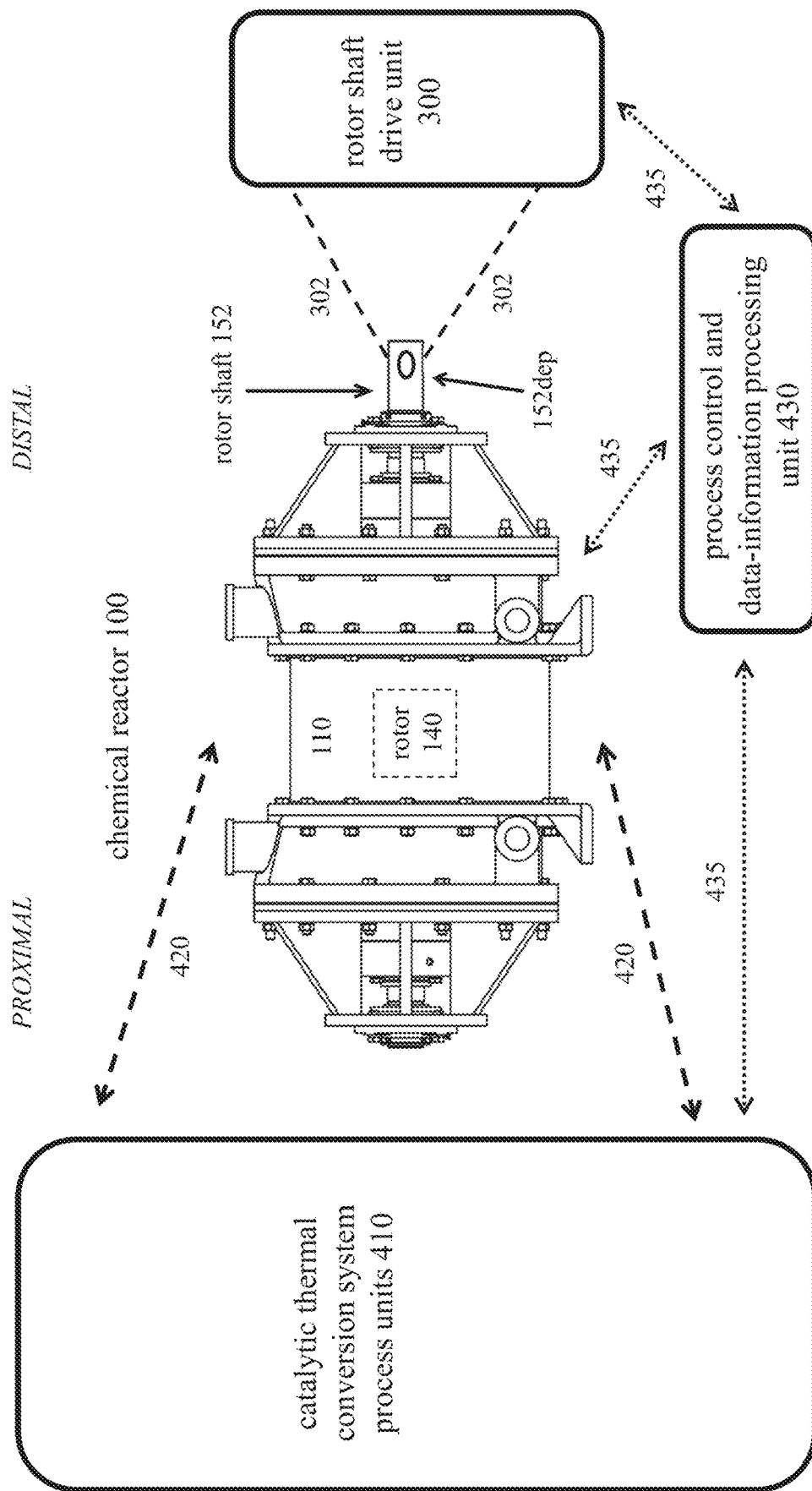
FIG. 38  catalytic thermal conversion system 400
[ including chemical reactor 100 ]

CHEMICAL REACTOR WITH HIGH SPEED ROTARY MIXING, FOR CATALYTIC THERMAL CONVERSION OF ORGANIC MATERIALS INTO DIESEL AND OTHER LIQUID FUELS, AND APPLICATIONS THEREOF

RELATED APPLICATION

This application claims the benefit of priority under 35 USC 119(e) of U.S. Provisional Patent Application No. 62/994,099, filed Mar. 24, 2020, the contents of which are incorporated herein by reference in their entirety.

FIELD OF THE INVENTION

The present invention, in some embodiments thereof, relates to chemical reactors that include high speed rotary mixing therein, and applications thereof, for catalytic thermal conversion of organic (i.e., hydrocarbon-containing) materials into diesel and other liquid fuels, and more particularly, but not exclusively, to a chemical reactor with high speed rotary mixing, a system thereof, and a method thereof, for catalytic thermal conversion of organic materials (e.g., coal, plastics, rubber, plant matter, wood shavings, biomass, organic wastes, among various other possible organic materials) into diesel and other liquid fuels (e.g., automobile or/and jet engine fuels). Some embodiments of the present invention are particularly relevant to fields of technology that involve non-conventional commercial scale production of liquid fuel products, and that involve environmentally acceptable commercial scale processing and disposing of organic waste materials.

BACKGROUND OF THE INVENTION

Catalytic thermal conversion (i.e., catalytically expedited thermal processes of cracking, degradation, decomposition, depolymerization) of heavy to light organic (i.e., hydrocarbon-containing) materials is a well established and widely used technique for producing a wide variety of numerous chemical products. Such technique, particularly performed at thermal conversion temperatures ordinarily no higher than about 400° C. inside the chemical reactor (i.e., inside a chemical reaction chamber thereof, wherein take place the various chemical reactions), for producing diesel and other liquid fuels, is also known as the KDV (Katalytische Drucklose Verölung) Technique, and as the NTK (Nieder Temperatur Konvertierung) Technique. In such techniques, the necessary thermal conversion temperatures inside the chemical reactor (chemical reaction chamber) are achieved by using designated heating equipment (heaters located outside of the chemical reactor) that externally heat the chemical reactor (chemical reaction chamber) and its contents.

Performance of such techniques by including and exploiting high speed rotary mixing of reactor contents inside the chemical reactor, for generating and providing the necessary thermal conversion temperatures inside the chemical reactor, was initially developed and taught about by Koch (for example, as disclosed in U.S. Pat. No. 7,473,348, and in U.S. Pat. Appl. Pub. Nos. 2007/0131585 A1, 2008/0116116 A1, and 2011/0297582 A1). Such newer techniques involve designing, constructing, and operating the chemical reactor with high speed rotary mixing equipment, particularly, pumps, rotor shafts, and rotors (impellers) having blades (vanes).

Although such newer catalytic thermal conversion techniques have the two important advantages of generating heat energy and mechanical mixing inside the chemical reactor (chemical reaction chamber), they also have several significant disadvantages and limitations which have yet to be fully, or at least effectively, overcome. Main, but, not the only, disadvantages and limitations are based on low energy efficiency (due to high energy consumption) of the overall process encompassing initial input conversion of the organic materials and output production of diesel and other liquid fuels, and on low durability (short life expectancy of the overall process due to extensive physical and chemical 'wear and tear') of the high speed rotary mixing equipment. At least these two main disadvantages and limitations preclude economically feasible commercial (industrial) scale operation of even the newer catalytic thermal conversion techniques.

Several 'substantial' attempts have been made in order to address and overcome such main disadvantages and limitations, for example, as disclosed in UK Patent No. GB 2473500 B, and in PCT Pat. Appl. Int'l. Pub. Nos.: WO 2014/087238, WO 2018/138194 A1, and WO 2018/228619 A1 (U.S. Pat. Appl. Pub. No. US 2020/0095505 A1).

Despite such attempts, and in view of at least the above stated main disadvantages and limitations, there is an ongoing need for developing and implementing new and improved chemical reactors that include high speed rotary mixing therein, systems thereof, and methods thereof, for catalytic thermal conversion of organic materials into diesel and other liquid fuels, which are applicable to economically feasible commercial (industrial) scale operation. Such need is particularly relevant to fields of technology that involve non-conventional commercial scale production of liquid fuel products, and that involve environmentally acceptable commercial scale processing and disposing of organic waste materials.

SUMMARY OF THE INVENTION

The present invention, in some embodiments thereof, relates to a chemical reactor with high speed rotary mixing, a system thereof, and a method thereof, for catalytic thermal conversion of organic (i.e., hydrocarbon-containing) materials (e.g., coal, plastics, rubber, plant matter, wood shavings, biomass, organic wastes, among various other possible organic materials) into diesel and other liquid fuels (e.g., automobile or/and jet engine fuels). Some embodiments of the present invention are particularly relevant to fields of technology that involve non-conventional commercial scale production of liquid fuel products, and that involve environmentally acceptable commercial scale processing and disposing of organic waste materials.

According to an aspect of some embodiments of the present invention, there is provided a chemical reactor with high speed rotary mixing, for catalytic thermal conversion of organic materials into diesel and other liquid fuels, the chemical reactor comprising:

a reactor stationary assembly (RSA), configured with only stationary components that remain stationary during operation of the chemical reactor, and comprising: a reactor central housing, configured as a tubular member longitudinally extending proximally and distally, having proximal and distal open ends; proximal and distal reactor input/output manifolds, each of the manifolds is configured with a longitudinally directed rotor shaft passageway, and has a respective distal or proximal side that covers, and is sealed to, the reactor central housing proximal or distal open end, and each of the manifolds is housed in a respective proximal or distal manifold housing having proximal and distal sides and configured with a longitudinally directed rotor shaft passageway; the proximal and distal manifold housings, with the respective proximal and distal manifolds housed therein, are oppositely located and parallel to each other with the reactor central housing longitudinally extending therebetween; proximal and distal dynamic seal housings, each of the dynamic seal housings is configured with a longitudinally directed rotor shaft passageway, and has a respective distal or proximal side that is sealed to the proximal or distal side of the proximal or distal manifold housing, respectively, the proximal and distal dynamic seal housings are located opposite and parallel to each other relative to the reactor central housing; and proximal and distal lubricated cartridge seal housings, each of the cartridge seal housings is configured with a longitudinally directed rotor shaft passageway, and has a respective distal or proximal side that is sealed to the proximal or distal side of the proximal or distal dynamic seal housing, respectively, the proximal and distal cartridge seal housings are located opposite and parallel to each other relative to the reactor central housing; and a reactor rotary mixing assembly (RRMA), configured with only rotatable components that rotate during operation of the chemical reactor, and comprising: a rotor, housed inside of the reactor central housing, and configured with a rotor tubular portion longitudinally extending proximally and distally with proximal and distal open ends, the rotor includes a plurality of equally sized radially curved rotor blades, that extend radially from, and longitudinally along, the outer circumferential periphery of the rotor tubular portion; proximal and distal rotatable dynamic seals, each of the dynamic seals is configured with a longitudinally directed rotor shaft passageway, and is housed inside of the proximal or distal dynamic seal housing, respectively; proximal and distal rotatable lubricated cartridge seals, each of the cartridge seals is configured with a longitudinally directed rotor shaft passageway, and is housed inside of the proximal or distal lubricated cartridge seal housing, respectively; and a rotatable rotor shaft, longitudinally supported via the proximal and distal lubricated cartridge seal housings, and longitudinally passing through the reactor central housing proximal and distal open ends, and through the rotor shaft passageways of the proximal and distal reactor input/output manifolds and the housings thereof, of the proximal and distal dynamic seals and the housings thereof, of the proximal and distal lubricated cartridge seals and the housings thereof, and through the rotor proximal and distal open ends, the rotor shaft is fixedly connected to the rotor tubular portion so as to facilitate controllable rotation of the rotor during operation of the chemical reactor.

According to an aspect of some embodiments of the present invention, there is provided a reactor rotary mixing assembly, for use in a chemical reactor with high speed rotary mixing, for catalytic thermal conversion of organic materials into diesel and other liquid fuels, the reactor rotary mixing assembly comprising: a rotor, configured with a tubular portion longitudinally extending proximally and distally with proximal and distal open ends, the rotor includes a plurality of equally sized radially curved rotor blades, that extend radially from, and longitudinally along, the outer circumferential periphery of the rotor tubular portion; proximal and distal rotatable dynamic seals, configured with respective longitudinally directed rotor shaft passageways, and located opposite and parallel to each other with the rotor tubular member longitudinally positioned therebetween; proximal and distal rotatable lubricated cartridge seals, configured with respective longitudinally directed rotor shaft passageways, and located opposite and parallel to each other with the proximal and distal dynamic seals longitudinally positioned therebetween; and a rotatable rotor shaft, longitudinally passing through the rotor proximal and distal circular open ends, and through the rotor shaft passageways of the proximal and distal dynamic seals, and of the proximal and distal lubricated cartridge seals, the rotor shaft is fixedly connected to the rotor tubular portion so as to facilitate controllable rotation of the rotor during operation of the chemical reactor.

According to some embodiments of the invention, the reactor stationary assembly additionally includes an antiabrasion shield that shields the tubular inner surface of the reactor central housing from abrasion during operation of the chemical reactor, the abrasion shield is configured as a tubular member longitudinally extending proximally and distally inside of the reactor central housing, having a proximal circular open end covered by, and sealed to, the distal circular side of the proximal reactor input/output manifold, and having a distal circular open end covered by, and sealed to, the proximal circular side of the distal reactor input/output manifold.

According to some embodiments of the invention, at least one of the rotor blades is configured with at least one rotor-based performance and process control structural feature selected from the group consisting of: openings, protrusions, and depressions, whereby the rotor-based performance and process control structural features facilitate controlling performance of the rotor, so as to provide an additional layer or level of control of chemical reaction related physicochemical processes of mass and heat transfer, mixing and degradation, and catalytic chemical conversion, taking place inside of the reactor central housing during operation of the chemical reactor.

According to some embodiments of the invention, the openings are in a form of holes or slits passing entirely through the radially curved thickness of the at least one of the rotor blades.

According to some embodiments of the invention, the protrusions are in a form of teeth or spikes, or mounds protruding or projecting out from the radially curved thickness of the at least one of the rotor blades. According to some embodiments of the invention, the protrusions are configured only on the leading or front convex side of the at least one of the rotor blades, and face toward, and in, the direction of rotation of the rotor.

According to some embodiments of the invention, the depressions are in a form of inverse mounds protruding or projecting partly into, not entirely through, the radially curved thickness of the at least one of the rotor blades. According to some embodiments of the invention, the depressions are configured only in the leading or front convex sides of the rotor blades, and face toward, and in, the direction of rotation of the rotor.

According to some embodiments of the invention, the rotor includes a rotor central reinforcement disc, having proximal and distal circular faces, and a central opening concentric with the circumferential periphery of the rotor tubular portion, thereby facilitating longitudinal passage therethrough of the rotor shaft, the rotor central reinforcement disc transversely bisects the longitudinal lengths of the rotor blades, and the outer circumferential periphery of the rotor central reinforcement disc is transverse to, and coincides with, the radial outer ends of the rotor blades.

According to some embodiments of the invention, the rotor central reinforcement disc is configured with at least one rotor-based performance and process control structural feature selected from the group consisting of: openings, protrusions, and depressions, whereby the rotor-based performance and process control structural features facilitate controlling performance of the rotor, so as to provide additional control of chemical reaction related physicochemical processes of mass and heat transfer, mixing and degradation, and catalytic chemical conversion, taking place inside of the reactor central housing during operation of the chemical reactor.

According to some embodiments of the invention, in the rotor central reinforcement disc, the openings are in a form of holes or slits passing entirely through the thickness of the rotor central reinforcement disc.

According to some embodiments of the invention, in the rotor central reinforcement disc, the protrusions are in a form of teeth or spikes, or mounds protruding or projecting out from the thickness of the rotor central reinforcement disc. According to some embodiments of the invention, in the rotor central reinforcement disc, the protrusions are configured in the rotor central reinforcement disc proximal circular side or/and in the distal circular side.

According to some embodiments of the invention, in the rotor central reinforcement disc, the depressions are in a form of inverse mounds protruding or projecting partly into, not entirely through, the thickness of the rotor central reinforcement disc. According to some embodiments of the invention, in the rotor central reinforcement disc, the depressions are configured in the rotor central reinforcement disc proximal circular side or/and in the distal circular side.

According to some embodiments of the invention, the rotor shaft is operably connectable to a rotor shaft drive unit that drives and rotates the rotor shaft.

According to some embodiments of the invention, the chemical reactor is additionally operably connectable to a catalytic thermal conversion system.

According to an aspect of some embodiments of the present invention, there is provided a system for catalytically thermally converting organic materials into diesel and other liquid fuels, the system comprising: a chemical reactor that includes a reactor stationary assembly (RSA), configured with only stationary components that remain stationary during operation of the chemical reactor, and a reactor rotary mixing assembly (RRMA), configured with only rotatable components that rotate during operation of the chemical reactor; a rotor shaft drive unit configured for driving and rotating the reactor rotary mixing assembly (RRMA) relative to the reactor stationary assembly (RSA); and catalytic conversion system process units, operatively connected to the chemical reactor. In exemplary embodiments, the catalytic thermal conversion system additionally includes a process control and data-information processing unit, operatively connected to, and, configured for controlling operation of and processing data-information associated with, the other units (and components therein) of the catalytic thermal conversion system, namely, the chemical reactor, the rotor shaft drive unit, and the catalytic thermal conversion system process units.

According to an aspect of some embodiments of the present invention, there is provided a method for catalytically thermally converting organic materials into diesel and other liquid fuels, the method comprising: providing a chemical reactor that includes a reactor stationary assembly (RSA), configured with only stationary components that remain stationary during operation of the chemical reactor, and a reactor rotary mixing assembly (RRMA), configured with only rotatable components that rotate during operation of the chemical reactor; operatively connecting the reactor rotary mixing assembly (RRMA) to a rotor shaft drive unit, so as to drive and rotate the reactor rotary mixing assembly (RRMA) relative to the reactor stationary assembly (RSA); operatively connecting the chemical reactor to catalytic conversion system process units; and operating the chemical reactor and the catalytic conversion system process units, so as to thermally convert organic materials into diesel and other liquid fuels. In exemplary embodiments, the method further includes controlling operation of and processing data-information associated with, the chemical reactor, the rotor shaft drive unit, and the catalytic thermal conversion system process units.

All technical or/and scientific words, terms, or/and phrases, used herein have the same or similar meaning as commonly understood by one of ordinary skill in the art to which the invention pertains, unless otherwise specifically defined or stated herein. Exemplary embodiments of apparatuses (devices, systems, components thereof), equipment, materials, and methods (steps, procedures), illustratively described herein are exemplary and illustrative only and are not intended to be necessarily limiting. Although apparatuses, equipment, materials, and methods, equivalent or similar to those described herein can be used in practicing or/and testing embodiments of the invention, exemplary apparatuses, equipment, materials, and methods, are illustratively described below. In case of conflict, the patent specification, including definitions, will control.

BRIEF DESCRIPTION OF THE SEVERAL VIEWS OF THE DRAWINGS

Some embodiments of the present invention are herein described, by way of example only, with reference to the accompanying drawings. With specific reference now to the drawings in detail, it is stressed that the particulars shown are by way of example and for purposes of illustrative description of some embodiments of the present invention. In this regard, the description taken together with the accompanying drawings make apparent to those skilled in the art how some embodiments of the present invention may be practiced.

In the drawings:

FIGS. 1, and 2A-2B, are schematic partly cut-away side, and perspective, views, respectively, of the chemical reactor with high speed rotary mixing, for catalytic conversion of organic materials into diesel and other liquid fuels, in accordance with some embodiments of the invention;

FIG. 3 is a schematic exploded perspective views of the chemical reactor, and of both the reactor stationary assembly (RSA) and the reactor rotary mixing assembly (RRMA), and components thereof, along with highlighting those components which form and define the chemical reaction chamber, in accordance with some embodiments of the invention;

FIGS. 4 and 5 are schematic exploded perspective views and of the reactor stationary assembly (RSA), and of the reactor rotary mixing assembly (RRMA), respectively, and components thereof, of the chemical reactor, in accordance with some embodiments of the invention;

FIGS. 6, 7, and 8 are schematic side, perspective, and distal front cut-away, views, respectively, of the chemical reactor, highlighting latitudinal or radial (transverse) offset of indicated chemical reactor components, in accordance with some embodiments of the invention;

FIGS. 9A and 9B are schematic perspective and side views, respectively, of the reactor central housing (part of the reactor stationary assembly (RSA)), in accordance with some embodiments of the invention;

FIGS. 10A and 10B are schematic proximal front and distal front views, respectively, of the distal reactor input/output manifold (part of the reactor stationary assembly (RSA)), in accordance with some embodiments of the invention;

FIGS. 11A and 11B are schematic proximal front and distal front views, respectively, of the distal manifold housing (part of the reactor stationary assembly (RSA)), in accordance with some embodiments of the invention;

FIGS. 12A and 12B are schematic proximal front and distal front views, respectively, of the proximal reactor input/output manifold (part of the reactor stationary assembly (RSA)), in accordance with some embodiments of the invention;

FIGS. 13A and 13B are schematic proximal front and distal front views, respectively, of the proximal manifold housing (part of the reactor stationary assembly (RSA)), in accordance with some embodiments of the invention;

FIGS. 14A and 14B are schematic perspective and side views, respectively, of the distal dynamic seal housing (part of the reactor stationary assembly (RSA)), in accordance with some embodiments of the invention;

FIG. 14C is a schematic of the proximal front view of the proximal dynamic seal housing, and also of the distal front view of the distal dynamic seal housing, in accordance with some embodiments of the invention;

FIG. 14D is a schematic of the distal front view of the proximal dynamic seal housing, and also of the proximal front view of the distal dynamic seal housing, in accordance with some embodiments of the invention;

FIGS. 15A and 15B are schematic perspective and side views, respectively, of the distal lubricated cartridge seal housing (part of the reactor stationary assembly (RSA)), in accordance with some embodiments of the invention;

FIG. 15C is a schematic of the proximal front view of the proximal lubricated cartridge seal housing, and also of the distal front view of the distal lubricated cartridge seal housing, in accordance with some embodiments of the invention;

FIG. 15D is a schematic of the distal front view of the proximal lubricated cartridge seal housing, and also of the proximal front view of the distal lubricated cartridge seal housing, in accordance with some embodiments of the invention;

FIGS. 16A, 16B, and 16C are schematic tilted front, side, and perspective views, respectively, of the anti-abrasion shield (part of the reactor stationary assembly (RSA)), in accordance with some embodiments of the invention;

FIGS. 17A and 17B are schematic perspective and side views, respectively, of the rotor 140 (part of the reactor rotary mixing assembly (RRMA)), in accordance with some embodiments of the invention;

FIGS. 18A and 18B are schematic perspective and side views, respectively, of the rotor 140 (part of the reactor rotary mixing assembly (RRMA)), with a rotor central reinforcement disc, in accordance with some embodiments of the invention;

FIGS. 19A and 19B are schematic perspective and side views, respectively, of the distal rotatable dynamic seal (part of the reactor stationary assembly (RRMA)), in accordance with some embodiments of the invention;

FIG. 19C is a schematic of the proximal front view of the proximal rotatable dynamic seal, and also of the distal front view of the distal rotatable dynamic seal, in accordance with some embodiments of the invention;

FIG. 19D is a schematic of the distal front view of the proximal rotatable dynamic seal, and also of the proximal front view of the distal rotatable dynamic seal, in accordance with some embodiments of the invention;

FIGS. 20A and 20B are schematic perspective and side views, respectively, of the distal rotatable lubricated cartridge seal (part of the reactor rotary mixing assembly (RRMA)), in accordance with some embodiments of the invention;

FIGS. 21A and 21B are schematic perspective and top views, respectively, of the rotatable rotor shaft (part of the reactor rotary mixing assembly (RRMA)), in accordance with some embodiments of the invention;

FIGS. 22A and 22B are schematic perspective and side views, respectively, of the distal rotatable cartridge bearing (part of the reactor rotary mixing assembly (RRMA)), in accordance with some embodiments of the invention;

FIG. 23 is a schematic perspective view of a distal rotatable paired set of a locknut and a locknut washer (part of the reactor rotary mixing assembly (RRMA)), in accordance with some embodiments of the invention;

FIGS. 24A and 24B are schematic perspective views of the rotor 140, with rotor-based performance and process control structural features, being hole type openings in one blade, and in all blades, respectively, in accordance with some embodiments of the invention;

FIGS. 25A and 25B are schematic perspective views of the rotor 140, with rotor-based performance and process control structural features, being slit type openings in one blade, and in all blades, respectively, in accordance with some embodiments of the invention;

FIGS. 26A and 26B are schematic perspective views of the rotor 140, with rotor-based performance and process control structural features, being teeth or spike type protrusions on the convex side of one blade, and of all blades, respectively, in accordance with some embodiments of the invention;

FIGS. 27A and 27B are schematic perspective views of the rotor 140, with rotor-based performance and process control structural features, being mound type protrusions on the convex side of one blade, and of all blades, respectively, in accordance with some embodiments of the invention;

FIGS. 28A and 28B are schematic perspective views of the rotor 140, with rotor-based performance and process control structural features, being inverse mound type depressions in the convex side of one blade, and of all blades, respectively, in accordance with some embodiments of the invention;

FIGS. 29A and 29B are schematic perspective views of the rotor 140, with rotor-based performance and process control structural features, being hole type openings in one sector, and in all sectors, respectively, of the reinforcement disc, in accordance with some embodiments of the invention;

FIGS. 30A and 30B are schematic perspective views of the rotor 140, with rotor-based performance and process control structural features, being slit type openings in one sector, and in all sectors, respectively, of the reinforcement disc, in accordance with some embodiments of the invention;

FIGS. 31A and 31B are schematic perspective views of the rotor 140, with rotor-based performance and process control structural features, being teeth or spike type protrusions on the distal face (surface) of one sector, and of all sectors, respectively, of the reinforcement disc, in accordance with some embodiments of the invention;

FIGS. 32A and 32B are schematic perspective views of the rotor 140, with rotor-based performance and process control structural features, being teeth or spike type protrusions on the proximal face (surface) of one sector, and of all sectors, respectively, of the reinforcement disc, in accordance with some embodiments of the invention;

FIGS. 33A and 33B are schematic perspective views of the rotor 140, with rotor-based performance and process control structural features, being mound type protrusions on the distal face (surface) of one sector, and of all sectors, respectively, of the reinforcement disc, in accordance with some embodiments of the invention;

FIGS. 34A and 34B are schematic perspective views of the rotor 140, with rotor-based performance and process control structural features, being mound type protrusions on the proximal face (surface) of one sector, and of all sectors, respectively, of the reinforcement disc, in accordance with some embodiments of the invention;

FIGS. 35A and 35B are schematic perspective views of the rotor 140, with rotor-based performance and process control structural features, being inverse mound type depressions in the distal face (surface) of one sector, and of all sectors, respectively, of the reinforcement disc, in accordance with some embodiments of the invention;

FIGS. 36A and 36B are schematic perspective views of the rotor 140, with rotor-based performance and process control structural features, being inverse mound type depressions in the proximal face (surface) of one sector, and of all sectors, respectively, of the reinforcement disc, in accordance with some embodiments of the invention;

FIG. 38 is a schematic diagram of another exemplary application of the chemical reactor, highlighting a catalytic thermal conversion system that includes the chemical reactor, in accordance with some embodiments of the invention.

DESCRIPTION OF SPECIFIC EMBODIMENTS OF THE INVENTION

Figure 37:
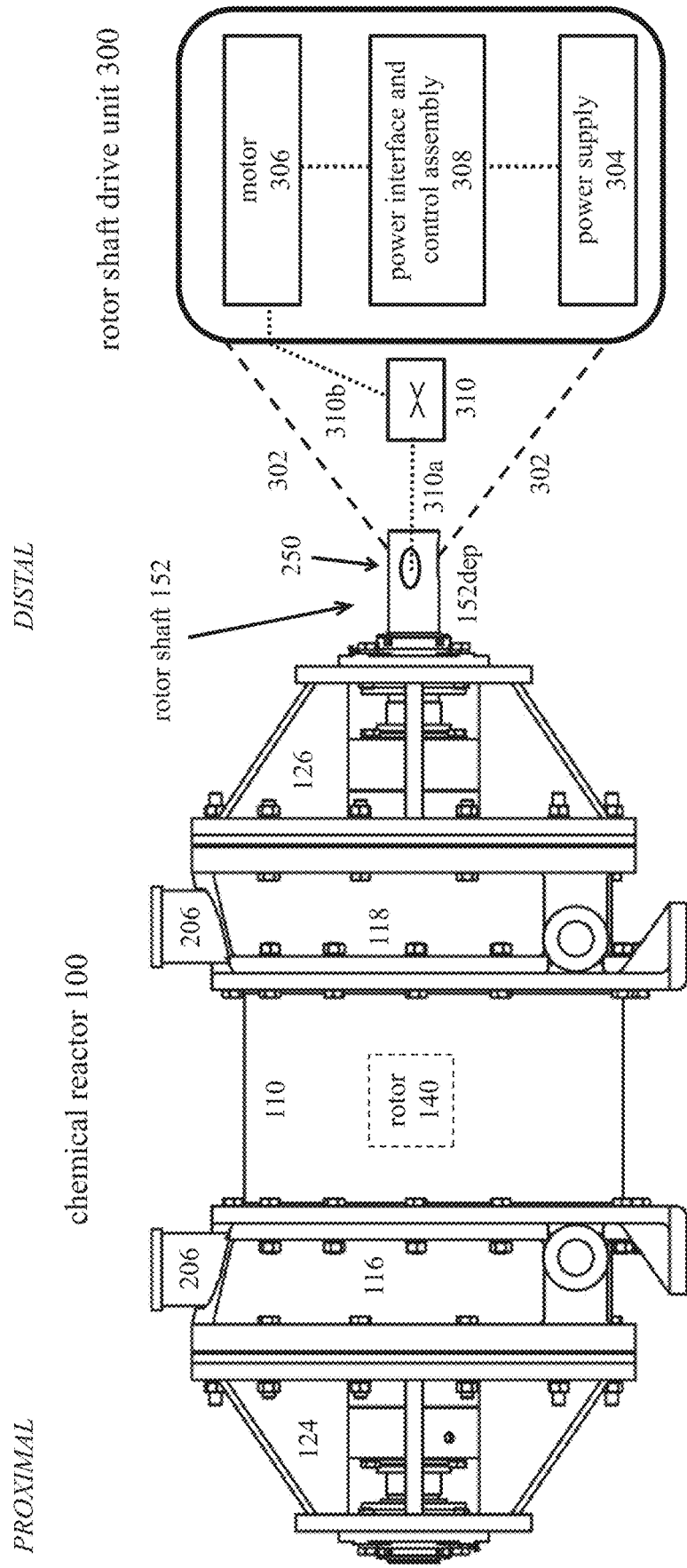
FIG. 37 is a schematic diagram of an exemplary application of the chemical reactor, highlighting the chemical reactor operatively connected to an exemplary rotor shaft drive unit, in accordance with some embodiments of the invention.

The present invention, in some embodiments thereof, relates to a chemical reactor with high speed rotary mixing, a system thereof, and a method thereof, for catalytic thermal conversion of organic (i.e., hydrocarbon-containing) materials (e.g., coal, plastics, rubber, plant matter, wood shavings, biomass, organic wastes, among various other possible organic materials) into diesel and other liquid fuels (e.g., automobile or/and jet engine fuels). Some embodiments of the present invention are particularly relevant to fields of technology that involve non-conventional commercial scale production of liquid fuel products, and that involve environmentally acceptable commercial scale processing and disposing of organic waste materials.

Implementation of the present invention attempts to address, and overcome, at least some of the on-going problems associated with chemical reactors that include high speed rotary mixing therein for catalytic thermal conversion of organic materials into diesel and other liquid fuels.

The present invention, in exemplary embodiments thereof, includes (at least) the following aspects. A chemical reactor with high speed rotary mixing, for catalytic thermal conversion of organic materials into diesel and other liquid fuels. A reactor rotary mixing assembly, for use in a chemical reactor with high speed rotary mixing, for catalytic thermal conversion of organic materials into diesel and other liquid fuels. A system for catalytically thermally converting organic materials into diesel and other liquid fuels. A method for catalytically thermally converting organic materials into diesel and other liquid fuels.

The several aspects of the present invention, in a non-limiting manner, are interrelated, in that illustrative description of characteristics and technical features of one aspect also relates to, and is fully applicable for, illustratively describing characteristics and technical features of other aspects of the present invention. For example, illustrative description of characteristics and technical features of the chemical reactor with high speed rotary mixing, for catalytic thermal conversion of organic materials into diesel and other liquid fuels, or of a component (e.g., reactor rotary mixing assembly) of the chemical reactor, also relates to, and is fully applicable for, illustratively describing characteristics and technical features of one or more other aspects of the present invention, for example, one or more aspects about a system for catalytically thermally converting organic materials into diesel and other liquid fuels, and one or more aspects about a method for catalytically thermally converting organic materials into diesel and other liquid fuels.

Additionally, for example, in a non-limiting manner, embodiments of the chemical reactor with high speed rotary mixing, for catalytic thermal conversion of organic materials into diesel and other liquid fuels, or of a component (e.g., reactor rotary mixing assembly) of the chemical reactor, are suitable for implementing embodiments of a system for catalytically thermally converting organic materials into diesel and other liquid fuels, and for implementing embodiments of a method for catalytically thermally converting organic materials into diesel and other liquid fuels.

The chemical reactor with high speed rotary mixing, for catalytic thermal conversion of organic materials into diesel and other liquid fuels, in a non-limiting manner, and in some embodiments, includes: a reactor stationary assembly (RSA), configured with only stationary components that remain stationary during operation of the chemical reactor, and a reactor rotary mixing assembly (RRMA), configured with only rotatable components that rotate during operation of the chemical reactor.

In exemplary embodiments, the reactor rotary mixing assembly (RRMA) of the chemical reactor, in a non-limiting manner, may be considered as an individual 'stand-alone' apparatus, particularly, based on its structural and functional/operational characteristics and features, and also based on the manner in which it is illustratively described herein. Such an individual 'stand-alone' (structural and functional/operational) apparatus corresponds to a particular 'sub-combination' of the (overall) chemical reactor with high speed rotary mixing, for catalytic thermal conversion of organic materials into diesel and other liquid fuels, which, in turn, corresponds to another aspect of the present invention.

The system for catalytically thermally converting organic materials into diesel and other liquid fuels, in a non-limiting manner, and in some embodiments, includes: a chemical reactor that includes a reactor stationary assembly (RSA), configured with only stationary components that remain stationary during operation of the chemical reactor, and a reactor rotary mixing assembly (RRMA), configured with only rotatable components that rotate during operation of the chemical reactor; a rotor shaft drive unit, operatively connected to the reactor rotary mixing assembly (RRMA), and configured for driving and rotating the reactor rotary mixing assembly (RRMA) relative to the reactor stationary assembly (RSA); and catalytic conversion system process units, operatively connected to the chemical reactor. In exemplary embodiments, the catalytic thermal conversion system additionally includes a process control and data-information processing unit, operatively connected to, and, configured for controlling operation of and processing data-information associated with, the other units (and components therein) of the catalytic thermal conversion system, namely, the chemical reactor, the rotor shaft drive unit, and the catalytic thermal conversion system process units.

The method for catalytically thermally converting organic materials into diesel and other liquid fuels, in a non-limiting manner, and in some embodiments, includes: providing a chemical reactor that includes a reactor stationary assembly (RSA), configured with only stationary components that remain stationary during operation of the chemical reactor, and a reactor rotary mixing assembly (RRMA), configured with only rotatable components that rotate during operation of the chemical reactor; operatively connecting the reactor rotary mixing assembly (RRMA) to a rotor shaft drive unit, so as to drive and rotate the reactor rotary mixing assembly (RRMA) relative to the reactor stationary assembly (RSA); operatively connecting the chemical reactor to catalytic conversion system process units; and operating the chemical reactor and the catalytic conversion system process units, so as to thermally convert organic materials into diesel and other liquid fuels. In exemplary embodiments, the method further includes controlling operation of and processing data-information associated with, the chemical reactor, the rotor shaft drive unit, and the catalytic thermal conversion system process units.

For purposes of further understanding exemplary embodiments of the present invention, in the following illustrative description thereof, reference is made to the figures. Throughout the following description and accompanying drawings, same reference numbers refer to same apparatus components, elements, or features. It is to be understood that the invention is not necessarily limited in its application to particular details of construction or/and arrangement of exemplary device, apparatus, or/and system components, or to particular sequential ordering of exemplary method steps or procedures, set forth in the following illustrative description. The invention is capable of having other exemplary embodiments, or/and of being practiced or carried out in various alternative ways. Exemplary materials of construction and size dimensions of components, elements, and structural features, and exemplary operating conditions and parameters in applications, of the herein disclosed chemical reactor are separately provided at the end of the Description, so as to preserve coherence and clarity of presentation of the disclosed invention.

Throughout the description and accompanying drawings, physical orientation (location, position) and directional type terms "proximal" and "distal" are used, in a non-limiting manner, for indicating relative orientations (locations, positions) and directions. The term "distal", as used herein, refers to the location, position, or direction of the stated or illustrated object or structural feature (being the herein disclosed overall chemical reactor, a part thereof, or, one or more components thereof) that is/are 'farther' (or away) from other components and structures of a more encompassing chemical processing system. The term "proximal", as used herein, refers to the location, position, or direction of the stated or illustrated object or structural feature (being the herein disclosed overall chemical reactor, a part thereof, or, one or more components thereof) that is/are 'nearer or closer to' (or towards) other components and structures of a more encompassing chemical processing system. With respect to left and right sides of a printed page, or of a computer display, the terms "proximal" and "distal", as used herein, in a non-limiting manner, correspond to the left and right sides, respectively, thereof. It is to be understood that 'symmetrically opposite' terminology (i.e., "distal" instead of "proximal", and "proximal" instead of "distal") can be (consistently) used for fully and properly illustratively describing embodiments of the present invention.

Consistent with the preceding usage of the physical orientation and directional terms "proximal" and "distal", the term "longitudinally extending", as used herein, refers to the physical extension (spanning) of the referenced component or structural feature along a longitudinal axis (e.g., a central longitudinal axis) that extends in (and along) the proximal direction and in (and along) the distal direction.

The term "longitudinally directed", as used herein, refers to the direction that the referenced component or structural feature transversely faces along a longitudinal axis (e.g., a central longitudinal axis) that extends in (and along) the proximal direction and in (and along) the distal direction. For example, the term "longitudinally directed rotor shaft passageway", as used herein, refers to a passageway (e.g., a circular opening [hole] in the referenced component) in the direction of, and transversely facing, a longitudinal axis that extends proximally and distally (consistent with the above terminology), so as to facilitate longitudinal passage therethrough of a rotor shaft. Additionally, for example, the term "longitudinally directed face", as used herein, refers to either of two faces of the referenced component positioned in the direction of, and transversely facing, a longitudinal axis that extends proximally and distally (consistent with the above terminology).

Additionally, in the description and accompanying drawings, during operation of the chemical reactor (and inside the chemical reaction chamber thereof), the intended direction of rotation of the rotor shaft (and of the rotor fixedly connected thereto, and of the other selected components [i.e., of the reactor rotary mixing assembly (RRMA)] of the chemical reactor that also rotate, is 'clockwise'. In the figures, such 'clockwise' rotation is indicated as, and referred to by, the reference letter R alongside a curved arrow pointing in the 'clockwise' direction.

Referring now to the drawings, FIGS. 1, and 2A-2B, are schematic partly cut-away side, and perspective, views, respectively, of an exemplary embodiment of the chemical reactor [indicated as, and referred to by, reference number 100] with high speed rotary mixing, for catalytic conversion of organic materials into diesel and other liquid fuels. FIG. 3 is a schematic exploded perspective views of exemplary embodiments of the chemical reactor 100, and of both the reactor stationary assembly (RSA) 102 and the reactor rotary mixing assembly (RRMA) 104, and components thereof, along with highlighting those components which form and define the chemical reaction chamber 165. FIGS. 4 and 5 are schematic exploded perspective views of an exemplary embodiment of the reactor stationary assembly (RSA) 102, and of the reactor rotary mixing assembly (RRMA) 104, respectively, and components thereof, of the chemical reactor 100. FIGS. 6, 7, and 8 are schematic side, perspective, and distal front cut-away, views, respectively, of exemplary embodiments of the chemical reactor 100, highlighting latitudinal (transverse) offset λ of indicated chemical reactor components. FIGS. 9 through 36 are different schematic views of exemplary embodiments of the several components (and structural features thereof) of the chemical reactor 100 with high speed rotary mixing, for catalytic conversion of organic materials into diesel and other liquid fuels.

FIG. 37 is a schematic diagram of an exemplary application of the chemical reactor 100, highlighting the chemical reactor 100 operatively connected to an exemplary rotor shaft drive unit. FIG. 38 is a schematic diagram of another exemplary application of the chemical reactor 100, highlighting a catalytic thermal conversion system that includes the chemical reactor 100.

With reference to FIGS. 1 through 5, in exemplary embodiments, the chemical reactor 100 with high speed rotary mixing, for catalytic thermal conversion of organic materials into diesel and other liquid fuels, includes: a reactor stationary assembly (RSA) 102 and a reactor rotary mixing assembly (RRMA) 104. The chemical reactor 100 is a structural (mechanical) and functional (operational) integrated combination of the two kinds of assemblies, namely, the reactor stationary assembly (RSA) 102 and the reactor rotary mixing assembly (RRMA) 104, and respective components of each assembly. In addition to FIGS. 1, 2A, 2B, particular illustration of this structural (mechanical) and functional (operational) integrated combination is provided by FIG. 3, wherein components of both assemblies are shown (via an exploded view) in their functional (operational) positions (as they are located in the chemical reactor 100 [shown in FIGS. 1, 2A, 2B]) relative to each other, and wherein components of the reactor stationary assembly (RSA) 102 are referenced in the lower portion of the figure, while components of the reactor rotary mixing assembly (RRMA) 104 are referenced in the upper portion of the figure. FIG. 3 also highlights (indicated by the dotted lines and arrows) the chemical reaction chamber 115, being spatially defined by the space (volume) formed and bounded by selected components of the reactor stationary assembly (RSA) 102, and by selected components of the reactor rotary mixing assembly (RRMA) 104 contained in that space (volume). The chemical reaction chamber 115 corresponds to the actual (effective) portion of the overall chemical reactor 100 wherein take place the numerous (chemical reaction related) physicochemical processes of mass and heat transfer, mixing, degradation, and catalytic chemical conversion, during operation of the chemical reactor 100.

Reactor Stationary Assembly (RSA)

The reactor stationary assembly (RSA) 102 is configured with only stationary components that remain stationary (i.e., relative to components of the reactor rotary mixing assembly (RRMA) 104) during operation of the chemical reactor 100, and includes the following components: a reactor central housing 110; proximal and distal reactor input/output manifolds 112 and 114, respectively; proximal and distal manifold housings 116 and 118, respectively; proximal and distal dynamic seal housings 120 and 122, respectively; and proximal and distal lubricated cartridge seal housings 124 and 126, respectively. In exemplary embodiments, the reactor stationary assembly (RSA) 102 is additionally configured with an anti-abrasion shield 128.

The reactor central housing 110 is configured as a tubular member longitudinally extending proximally and distally, and having a middle portion with proximal and distal circular open ends.

The proximal and distal reactor input/output manifolds 112 and 114, respectively, are each configured with a longitudinally directed rotor shaft passageway (e.g., a circular opening [hole] that facilitates longitudinal passage therethrough of the rotor shaft 152). The proximal and distal reactor input/output manifolds 112 and 114, respectively, have a respective distal or proximal circular face that covers, and is sealed to, the respective reactor central housing 110 proximal or distal circular open end. The proximal and distal reactor input/output manifolds 112 and 114, respectively, are each housed in a respective proximal or distal manifold housing 116 or 118 that has proximal and distal circular faces and is configured with a longitudinally directed rotor shaft passageway (e.g., a circular opening [hole] that facilitates longitudinal passage therethrough of the rotor shaft 152). The proximal and distal manifold housings 116 and 118, respectively, with the respective proximal and distal reactor input/output manifolds 112 and 114 housed therein, are oppositely located and parallel to each other with the reactor central housing 110 longitudinally extending therebetween.

The proximal and distal dynamic seal housings 120 and 122, respectively, are each configured with a longitudinally directed rotor shaft passageway (e.g., a circular opening [hole] that facilitates longitudinal passage therethrough of the rotor shaft 152). The proximal and distal dynamic seal housings 120 and 122, respectively, have a respective distal or proximal circular face that covers, and is sealed to, the respective proximal or distal circular face of the respective proximal or distal manifold housing 116 or 118. The proximal and distal dynamic seal housings 120 and 122, respectively, are located opposite and parallel to each other relative to the reactor central housing 110.

The proximal and distal lubricated cartridge seal housings 124 and 126, respectively, are each configured with a longitudinally directed rotor shaft passageway (e.g., a circular opening [hole] that facilitates longitudinal passage therethrough of the rotor shaft 152). The proximal and distal lubricated cartridge seal housings 124 and 126, respectively, have a respective distal or proximal circular face that covers, and is sealed to, the respective proximal or distal circular face of the respective proximal or distal dynamic seal housing 120 or 122. The proximal and distal lubricated cartridge seal housings 124 and 126, respectively, are each configured with a longitudinally directed rotor shaft passageway (e.g., a circular opening [hole] that facilitates longitudinal passage therethrough of the rotor shaft 152). The proximal and distal lubricated cartridge seal housings 124 and 126, respectively, are located opposite and parallel to each other relative to the reactor central housing 110.

The anti-abrasion shield 128 is configured as a tubular member longitudinally extending proximally and distally inside of the reactor central housing 110, and having a body with proximal and distal circular open ends, respectively. The proximal circular open end is covered by, fixedly connected (attached) and sealed to, the distal circular face of the proximal reactor input/output manifold 112. The distal circular open end is covered by, fixedly connected (attached) and sealed to, the proximal circular face of the distal reactor input/output manifold 114.

Reactor Rotary Mixing Assembly (RRMA)

The reactor rotary mixing assembly (RRMA) 104 is configured with only rotatable components that rotate (i.e., relative to components of the reactor stationary assembly (RSA) 102) during operation of the chemical reactor 100, and includes the following components: a rotor 140; proximal and distal rotatable dynamic seals 144 and 146, respectively; proximal and distal rotatable lubricated cartridge seals 148 and 150, respectively; and a rotatable rotor shaft 152. In exemplary embodiments, the rotary mixing assembly (RRMA) 104 is additionally configured with proximal and distal rotatable cartridge bearings 154 and 156, respectively. In exemplary embodiments, the rotary mixing assembly (RRMA) 104 is additionally configured with one proximal rotatable paired set 158*a*, and with two distal rotatable paired sets 158*b* and 158*c*, of a locknut 160 and a locknut washer 162.

The rotor 140 is housed inside of the reactor central housing 110, and is configured with a rotor tubular portion and a plurality of equally configured (shaped and sized) radially curved rotor blades that radially extend from, and longitudinally along, the outer circumferential periphery of the rotor tubular portion. The rotor tubular portion longitudinally extends proximally and distally, and has proximal and distal circular open ends, so as to form a longitudinally directed rotor shaft passageway (a circular opening) that facilitates longitudinal passage therethrough of the rotor shaft 152. The rotor 140 is fixedly mounted on (connected, attached to), via the rotor tubular portion, the rotatable rotor shaft 152 so as to facilitate controllable rotation of the rotor 140 during operation of the chemical reactor 100.

In exemplary embodiments, the rotor 140 includes a rotor central reinforcement disc. The rotor central reinforcement disc has proximal and distal circular faces, and a central opening concentric with the circumferential periphery of the rotor tubular portion, thereby facilitating longitudinal passage therethrough of the rotor shaft 152. The rotor central reinforcement disc transversely bisects (divides into two equal portions) the longitudinal lengths of the rotor blades, and the outer circumferential periphery of the rotor central reinforcement disc is transverse to, and coincides with, the radial outer ends of the rotor blades.

As illustratively described below along with reference to FIGS. 24-36, in exemplary embodiments of the chemical reactor 100, in general, and of the rotor 140, in particular, the rotor 140 is configured with at least one rotor-based performance and process control structural feature selected from the group consisting of: openings (e.g., holes or slits), protrusions (e.g., teeth or spikes, or mounds), and depressions (e.g., inverse mounds). In such exemplary embodiments, at least one of the rotor blades 180 is configured with one or more of the rotor-based performance and process control structural features. In exemplary embodiments wherein the rotor 140 includes the rotor central reinforcement disc 190, optionally, alternatively, or additionally, at least a portion of the rotor central reinforcement disc 190 is configured with one or more of the rotor-based performance and process control structural features. In such exemplary embodiments, the rotor-based performance and process control structural features facilitate 'fine-tuning' type additional controlling performance of the rotor 140, in particular, and of the chemical reactor 100, in general, so as to provide an additional layer or level of control of the numerous (chemical reaction related) physicochemical processes of mass and heat transfer, mixing, degradation, and catalytic chemical conversion, taking place inside of the reactor central housing 110 (i.e., inside of the chemical reaction chamber 115 therein) during operation of the chemical reactor 100.

The proximal and distal rotatable dynamic seals 144 and 146, respectively, are each configured with a longitudinally directed rotor shaft passageway (e.g., a circular opening [hole] that facilitates longitudinal passage therethrough of the rotor shaft 152), and are each housed inside of the respective proximal or distal dynamic seal housing 120 or 122.

The proximal and distal rotatable lubricated cartridge seals 148 and 150 are each configured with a longitudinally directed rotor shaft passageway (e.g., a circular opening [hole] that facilitates longitudinal passage therethrough of the rotor shaft 152), and are each housed in the respective proximal or distal lubricated cartridge seal housing 124 or 126.

The rotatable rotor shaft 152 is longitudinally supported via the proximal and distal lubricated cartridge seal housings 124 and 126, respectively, and longitudinally passes through the reactor central housing 110 proximal and distal circular open ends, and through the rotor shaft passageways of the following components: the rotor 152, the proximal and distal reactor input/output manifolds 112 and 114, respectively; the proximal and distal manifold housings 116 and 118, respectively; the proximal and distal rotatable dynamic seals 144 and 146, respectively; the proximal and distal dynamic seal housings 120 and 122, respectively; the proximal and distal rotatable lubricated cartridge seals 148 and 150, respectively; and the proximal and distal lubricated seal housings 124 and 126, respectively. In exemplary embodiments wherein the reactor stationary assembly (RSA) 102 additionally includes the anti-abrasion shield 128, the rotor shaft 152 also longitudinally passes therethrough. In exemplary embodiments wherein the reactor rotary mixing assembly (RRMA) 104 additionally includes the proximal and distal rotatable cartridge bearings 154 and 156, respectively, or/and, additionally includes at least one rotatable paired set 158 of a locknut 160 and a locknut washer 162, the rotor shaft 152 also longitudinally passes through these components.

The rotor shaft 152 is fixedly connected (attached) to the rotor tubular portion so as to facilitate controllable rotation of the rotor 140 inside the chemical reaction chamber 115 during operation of the chemical reactor 100. The rotor shaft 152 includes several reactor rotary mixing assembly (RRMA) component mounting (connecting, attaching) and fixing portions or sections (for example, grooves, slots, slits, recesses, depressions, and the like) located at several places along the longitudinal length of the rotor shaft 152, which are configured for mounting (connecting, attaching) and fixing all the components of the reactor rotary mixing assembly (RRMA) 104 that rotate during operation of the chemical reactor 100. Thus, the reactor rotary mixing assembly (RRMA) component mounting and fixing portions or sections are configured for fixedly mounting (connecting, attaching) upon the rotor shaft 152 all components of the reactor rotary mixing assembly (RRMA) 104, namely, the rotor 140; the proximal and distal rotatable dynamic seals 144 and 146, respectively; and the proximal and distal rotatable lubricated cartridge seals 148 and 150, respectively.

In exemplary embodiments wherein the reactor rotary mixing assembly (RRMA) 104 additionally includes the proximal and distal rotatable cartridge bearings 154 and 156, respectively, or/and, additionally includes at least one rotatable paired set 158 of a locknut 160 and a locknut washer 162, the reactor rotary mixing assembly (RRMA) component mounting and fixing portions or sections (along the rotor shaft 152) are also configured for fixedly mounting those additional reactor components upon the rotor shaft 152.

The chemical reactor 100, in general, and the rotor shaft 152, in particular, are operably connectable to a rotor shaft drive unit (for example, rotor shaft drive unit 300 shown in FIGS. 37 and 38, and further described hereinbelow) that is configured for driving (powering) and rotating the rotor shaft 152. Such operable connection between the rotor shaft 152 and a rotor shaft drive unit is facilitated by the rotor shaft 152 additionally including a rotor shaft drive unit connecting and fixing portion that is located along the distal end portion of the rotor shaft 152.

In exemplary embodiments of the chemical reactor 100, the reactor rotary mixing assembly (RRMA) 104 additionally includes a proximal rotatable cartridge bearing 154, that is configured with a longitudinally directed rotor shaft passageways (e.g., a circular opening [hole] that facilitates longitudinal passage therethrough of the rotor shaft 152), and has a distal circular face that covers, and is sealed to, the proximal circular face of the proximal rotatable lubricated cartridge seal 148. In exemplary embodiments, the proximal rotatable cartridge bearing 154 is configured as a 'non-locating' type of cartridge bearing, that provides 'radial' support to the rotor shaft 152.

In exemplary embodiments of the chemical reactor 100, the reactor rotary mixing assembly (RRMA) 104 additionally includes a distal rotatable cartridge bearing 156, that is configured with a longitudinally directed rotor shaft passageway (e.g., a circular opening [hole] that facilitates longitudinal passage therethrough of the rotor shaft 152), and has a proximal circular face that covers, and is sealed to, the distal circular face of the distal rotatable lubricated cartridge seal 150. In exemplary embodiments, the distal rotatable cartridge bearing 156 is configured as a 'locating' type of cartridge bearing, that provides both 'radial' support and (proximal-distal) 'longitudinal' guidance to the rotor shaft 152.

In exemplary embodiments of the chemical reactor 100, the reactor rotary mixing assembly (RRMA) 104 additionally includes at least one rotatable paired set 158 of a locknut 160 and a locknut washer 162, located at one or more respective positions on the rotor shaft 152. FIG. 5 shows an exploded perspective view of such an exemplary embodiment, corresponding to one proximal rotatable paired set 158a, and two distal rotatable paired sets 158b and 158c, of the locknut 160 and the locknut washer 162.

Chemical Reaction Chamber

The chemical reaction chamber 115 corresponds to the actual (effective) portion of the overall chemical reactor 100 wherein take place the numerous (chemical reaction related) physicochemical processes of mass and heat transfer, mixing, degradation, and catalytic chemical conversion, during operation of the chemical reactor 100. For example, as shown in FIG. 3, and indicated therein by the dotted lines and arrows, the chemical reaction chamber 115 is spatially defined as the space (volume) formed and bounded (exclusively and only) by: (i) selected components of the reactor stationary assembly (RSA) 102 and (ii) selected components of the reactor rotary mixing assembly (RRMA) 104 contained in (i.e., occupying part of) the space (volume) of (i).

Specifically, in exemplary embodiments, the chemical reaction chamber 115 is defined as the space (volume) formed and bounded (exclusively and only) by: (i) the distal and proximal faces of the respective proximal and distal reactor input/output manifolds 112 and 114, that are fixedly connected (attached) and sealed to the respective proximal and distal open ends of the reactor central housing 110, and (ii) the presence of the rotor 140, fixedly mounted on the rotor shaft 152, of the reactor rotary mixing assembly (RRMA) 104, contained in (occupying part of) the space (volume) of (i).

In exemplary embodiments wherein the reactor stationary assembly (RSA) 102 is additionally configured with the anti-abrasion shield 128, then, the chemical reaction chamber 115 is defined as the space (volume) formed and bounded (exclusively and only) by: (i) the distal and proximal faces of the respective proximal and distal reactor input/output manifolds 112 and 114, that are fixedly connected (attached) and sealed to the respective proximal and distal open ends of the anti-abrasion shield 128, and (ii) the presence of the rotor 140, fixedly mounted on the rotor shaft 152, of the reactor rotary mixing assembly (RRMA) 104, contained in (occupying part of) the space (volume) of (i).

Latitudinal or Radial (Transverse) Offset of Chemical Reactor Components

The chemical reactor 100 is configured based on principles, not identical, but similar to, those of a liquid-ring (centrifugal) pump. Structure and function (operation) of the chemical reactor 100 (and components therein) are based on and involve relative differential positioning and functioning of 'all' chemical reactor components (i.e., of the reactor stationary assembly (RSA) 102) and of the reactor rotary mixing assembly (RRMA) 104), and not only of two chemical reactor components (e.g., the rotor 140 and the reactor central housing 110).

The chemical reactor 100 is configured with a 'latitudinal or radial eccentricity', wherein a first sub-set of reactor components are positioned, and have geometrical centers, latitudinally or radially eccentric relative to the positioning and geometrical centers of a second sub-set of reactor components. Herein, such 'latitudinal or radial eccentricity' of the chemical reactor 100 is also referred to as 'latitudinal or radial (transverse) offset', wherein the chemical reactor 100 is configured with a 'latitudinal or radial (transverse) offset' of a first sub-set of reactor components relative to a second sub-set of reactor components.

The term 'latitudinal or radial (transverse) offset', or, more briefly, 'latitudinal or radial offset', as used herein, refers to the offset defined by the distance or length that latitudinally or radially (i.e., transversely) extends in between two parallel proximal-distal central longitudinal axes of a first sub-set of reactor components and a second sub-set of reactor components. Alternatively stated, the 'latitudinal or radial (transverse) offset' refers to, and is defined by, the latitudinal or radial distance or length that transversely extends between a first proximal-distal central longitudinal axis that passes through the geometrical center points of the first sub-set of reactor components and a second proximal-distal central longitudinal axis that passes through the geometrical center points of the second sub-set of reactor components.

FIGS. 6 and 7 are schematic side and perspective views, respectively, of the chemical reactor 100, highlighting the latitudinal or radial (transverse) offset of the indicated chemical reactor components, with respect to (proximal-distal) longitudinal axes. The 'latitudinal or radial (transverse) offset' is indicated as, and referred to by, the reference symbol λ.

In exemplary embodiments, the first sub-set of reactor components includes: (i) the rotor 140 (of the RRMA 104); (ii) the rotatable rotor shaft 152 (of the RRMA 104); (iii) the proximal and distal rotatable dynamic seals 144 and 146, respectively (of the RRMA 104); (iv) the proximal and distal dynamic seal housings 120 and 122, respectively (of the RSA 102); (v) the proximal and distal rotatable lubricated cartridge seals 148 and 150, respectively (of the RRMA 104); (vi) the proximal and distal lubricated cartridge seal housings 124 and 126, respectively (of the RSA 102); and (vii) the proximal and distal rotatable cartridge bearings 154 and 156, respectively (of the RRMA 104).

The first sub-set of reactor components (i)-(vii) is characterized by a first central longitudinal axis (as indicated in FIGS. 6 and 7 by the dashed line with reference symbol X1)

that longitudinally (proximally to distally) passes through the geometrical center points of each of the reactor components (i)-(vii).

In exemplary embodiments, the second sub-set of reactor components includes: (viii) the reactor central housing 110 (of the RSA 102); (ix) the proximal and distal reactor input/output manifolds 112 and 114, respectively (of the RSA 102); (x) the proximal and distal manifold housings 116 and 118, respectively (of the RSA 102); and, if present in the chemical reactor 100, (xi) the anti-abrasion shield 128 (of the RSA 102).

The second sub-set of reactor components (viii)-(xi) is characterized by a second central longitudinal axis (as indicated in FIGS. 6 and 7 by the dotted line with reference symbol X2) that longitudinally (proximally to distally) passes through the geometrical center points of each of the reactor components (viii)-(xi).

Accordingly, in exemplary embodiments, the chemical reactor 100 is configured with a latitudinal or radial (transverse) offset λ of a first sub-set of reactor components (i)-(vii) relative to a second sub-set of reactor components (viii)-(xi). More specifically, in exemplary embodiments, the chemical reactor 100 is configured with a latitudinal or radial (transverse) offset λ, whereby the first sub-set of reactor components (i)-(vii) has a first central longitudinal axis X1 that is latitudinally or radially (transversely) offset relative to a second central longitudinal axis X2 of the second sub-set of reactor components (viii)-(xi).

Another view of the above described latitudinal or radial (transverse) offset λ of reactor components is provided in FIG. 8, being a schematic distal front cut-away view of the chemical reactor 100, highlighting the latitudinal or radial (transverse) offset λ of the chemical reactor components, with respect to transverse axes. The view shown in FIG. 8 is transverse (perpendicular) to the view shown in FIG. 6. Accordingly, as shown in FIG. 8, in exemplary embodiments, the chemical reactor 100 is configured with a latitudinal or radial (transverse) offset λ, whereby the first sub-set of reactor components (i)-(vii) has a first central transverse axis Y1 that is latitudinally or radially (transversely) offset relative to a second central transverse axis Y2 of the second sub-set of reactor components (viii)-(xi).

The chemical reactor 100, with the latitudinal or radial (transverse) offset λ of the first sub-set of reactor components (i)-(vii) relative to the second sub-set of reactor components (viii)-(xi), operates as follows, with particular reference made to FIG. 8. Rotation of the rotor shaft 152 drives rotation of the reactor rotary mixing assembly (RRMA) 104, which, in turn, drives rotation of the rotor 140 inside the chemical reaction chamber 115. Rotary motion of the rotor 140, via centrifugal forces, centrifugally propels and forces liquid in the chemical reaction chamber 115 onto the tubular inner surface of the reactor central housing 110 (or, if present, onto the tubular inner surface of the anti-abrasion shield 128). The propelled liquid forms a liquid ring along the tubular inner surface of the reactor central housing 110 or the anti-abrasion shield 128. The liquid ring acts as a sealant along the tubular inner surface of the reactor central housing 110 (or of the anti-abrasion shield 128) which prevents, or at least minimizes, gases from escaping the chemical reaction chamber 115, translating to high efficiency and performance of the chemical reactor 100.

As a result of the latitudinal or radial (transverse) offset λ existing between the first and second sub-set of reactor components, rotary motion of the rotor 140 and the rotor blades thereof generate a pressure gradient circumferentially along the tubular inner surface of the reactor central housing 110 (or of the anti-abrasion shield 128), thereby producing pressure differentials at different locations along the reactor central housing (or anti-abrasion shield) tubular inner surface. By way of such pressure differentials, chemical reactor input material (containing a mixture of solids, liquids, and gases) is input (sucked), via the input ports 202 of the reactor input/output manifolds 112 and 114, into the chemical reaction chamber 115. Continuous rotary motion of the rotor 140 then drives the numerous (chemical reaction related) physicochemical processes of mass and heat transfer, mixing, degradation, and catalytic chemical conversion, taking place inside the chemical reaction chamber 115. Also, by way of the pressure differentials, along with the rotating rotor blades compressing chemical reaction material along the reactor central housing (or anti-abrasion shield) tubular inner surface, chemical reactor output material (containing a mixture of solids, liquids, and gases) is output (discharged), via the output ports 206 of the reactor input/output manifolds 112 and 114, from the chemical reaction chamber 115.

Additional Views, Characteristics, and Features of Components of the Reactor Stationary Assembly (RSA) and of the Reactor Rotary Mixing Assembly (RRMA)

FIGS. 9 through 23 are additional schematic views of exemplary embodiments of the several components (and features thereof) of the chemical reactor 100 with high speed rotary mixing, for catalytic conversion of organic materials into diesel and other liquid fuels.

Reactor Stationary Assembly (RSA)

The reactor stationary assembly (RSA) 102 is configured with only stationary components that remain stationary (i.e., relative to components of the reactor rotary mixing assembly (RRMA) 104) during operation of the chemical reactor 100, and includes: a reactor central housing 110; proximal and distal reactor input/output manifolds 112 and 114, respectively; proximal and distal manifold housings 116 and 118, respectively; proximal and distal dynamic seal housings 120 and 122, respectively; and proximal and distal lubricated cartridge seal housings 124 and 126, respectively. In exemplary embodiments, the reactor stationary assembly (RSA) 102 is additionally configured with an anti-abrasion shield 128.

Reactor Central Housing

FIGS. 9A and 9B are schematic perspective and side views, respectively, of an exemplary embodiment of the reactor central housing 110 (part of the reactor stationary assembly (RSA) 102). The reactor central housing 110 is structured and functions as the (geometrical) central component (body, member) of the overall chemical reactor 100, that houses, and is fixedly connected (attached) to, other components of the chemical reactor 100.

The reactor central housing 110 is configured as a tubular member longitudinally extending proximally and distally, and having a middle portion 110a with proximal and distal circular open ends 110b and 110c, respectively. In exemplary embodiments, the proximal and distal circular open ends 110b and 110c, respectively, are flanged and include circumferentially positioned bolt holes, for facilitating covering of, and sealing to, the proximal and distal open ends 110b and 110c by corresponding distal and proximal circular open faces of the proximal and distal reactor input/output manifolds 112 and 114, respectively. In exemplary embodiments, the reactor central housing 110 is additionally configured with supporting and fixing members (for example, supporting and fixing members 110d) that extend from bottom portions of the proximal and distal open ends 110b and 110c, respectively. The supporting and fixing members 110d are configured for supporting and fixing the reactor central housing 110, in particular, and the overall chemical reactor 100, in general, to a stable and level structure, such as the floor or ground.

In exemplary embodiments of the chemical reactor, the reactor stationary assembly (RSA) 102 is additionally configured with an anti-abrasion shield (for example, anti-abrasion shield 128) that physically/mechanically shields the tubular inner surface 110e of the reactor central housing 110 from abrasion (i.e., physical or/and chemical 'wear and tear') during operation of the chemical reactor 100. In exemplary embodiments, the anti-abrasion shield 128 is fixedly connected (attached) to the inside (i.e., the tubular inner surface 110e) of the middle portion 110a of the reactor central housing 110. In exemplary embodiments, the anti-abrasion shield 128 is configured with at least one fixing element (for example, in FIGS. 16A-16C, two fixing elements 230) which facilitate fixedly connecting (attaching) the anti-abrasion shield 128 to the inner surface 110e of the reactor central housing middle portion 110a. In exemplary embodiments, the anti-abrasion shield fixing elements 230 are configured as small (circular or elliptical) protrusions that protrude (extend, jut out, or project) from the tubular outer peripheral surface of the anti-abrasion shield 128. Such small protrusions are configured (shaped and sized) so as to securely and fixedly fit into corresponding mating depressions (small hollowed out portions) that are configured in the tubular inner surface 110e of the reactor central housing middle portion 110a. In FIG. 9B, exemplary mating depressions (small hollowed out portions) configured in the tubular inner surface 110e of the reactor central housing middle portion 110a are referenced as anti-abrasion shield fixing points 110fp, whose exemplary locations are indicated by the two dotted line arrows.

Reactor Input/Output Manifolds, and Manifold Housings

FIGS. 10A and 10B are schematic proximal front and distal front views, respectively, of an exemplary embodiment of the distal reactor input/output manifold 114 (part of the reactor stationary assembly (RSA) 102). FIGS. 11A and 11B are schematic proximal front and distal front views, respectively, of an exemplary embodiment of the distal manifold housing 118 (part of the reactor stationary assembly (RSA) 102). FIGS. 12A and 12B are schematic proximal front and distal front views, respectively, of an exemplary embodiment of the proximal reactor input/output manifold 112 (part of the reactor stationary assembly (RSA) 102). FIGS. 13A and 13B are schematic proximal front and distal front views, respectively, of an exemplary embodiment of the proximal manifold housing 116 (part of the reactor stationary assembly (RSA) 102).

The distal and proximal reactor input/output manifolds 114 and 112, respectively, aside from being structural mirror images of each other, are identically the same components with the same structural and functional features and characteristics, and are located opposite and parallel to each other relative to the reactor central housing 110. The distal and proximal reactor input/output manifold housings 118 and 116, respectively, aside from being structural mirror images of each other, are identically the same components with the same structural and functional features and characteristics, and are located opposite and parallel to each other relative to the reactor central housing 110. The reactor input/output manifolds 114 and 112 are structured and function for: (i) facilitating input of materials into the chemical reactor 100, and (ii) facilitating output of materials from the chemical reactor 100. The manifold housings 118 and 116 are structured and function for firmly supporting and holding (housing) the respective reactor input/output manifolds 114 and 112.

Each of the distal and proximal reactor input/output manifolds 114 and 112, respectively, is configured with a manifold input (suction) port 202, a manifold input aperture 204, a manifold output (discharge) port 206, a manifold output aperture 208, a manifold drain port 210, a manifold drain aperture 212, and a longitudinally directed rotor shaft passageway (e.g., a circular opening) 200 that facilitates longitudinal passage therethrough of the rotor shaft 152.

In exemplary embodiments, each of the distal and proximal reactor input/output manifolds 114 and 112, respectively, is configured with a circular base 114a and 112a, respectively, that has two longitudinally directed distal and proximal circular faces. Each of the distal face of the distal reactor input/output manifold 114, and the proximal face of the proximal reactor input/output manifold 112, is configured thereupon with the manifold input (suction) port 202, the manifold output (discharge) port 206, and the manifold drain port 210, for example, as particularly shown in FIGS. 10B and 12A. Each of the proximal face of the distal reactor input/output manifold 114, and the distal face of the proximal reactor input/output manifold 112, is configured with the manifold input aperture 204, the manifold output aperture 208, and the manifold drain aperture 212, which are in fluid communication with the corresponding manifold input (suction) port 202, manifold output (discharge) port 206, and manifold drain port 210, respectively, for example, as particularly shown in FIGS. 10A and 12B.

Each of the distal and proximal manifold housings 118 and 116, respectively, is configured with correspondingly shaped and sized channels that facilitate passage and firm holding of the reactor input/output manifold input (suction) port 202, output (discharge) port 206, and drain port 210. Namely, a manifold input (suction) port channel 216, a manifold output (discharge) port channel 218, and a manifold drain port channel 220, respectively, for example, as particularly shown in FIGS. 11A and 13B. Each of the distal and proximal reactor input/output manifold housings 118 and 116, respectively, is also configured with a longitudinally directed rotor shaft passageway (e.g., a circular opening) 214 that facilitates longitudinal passage therethrough of the rotor shaft 152.

In exemplary embodiments, each of the distal and proximal manifold housings 118 and 116, respectively, is configured with a circular base 118a and 116a, respectively, that has two longitudinally directed distal and proximal circular faces. Each of the proximal face of the distal manifold housing 118, and the distal face of the proximal manifold housing 116, is configured with the manifold input (suction) port channel 216, the manifold output (discharge) port channel 218, and the manifold drain port channel 220, respectively, for example, as particularly shown in FIGS. 11A and 13B. Each of the distal face of the distal manifold housing 118, and the proximal face of the proximal manifold housing 116, is configured on the periphery thereof with one or more annular channels, for example, as particularly shown in FIGS. 11B and 13A, for facilitating direct, immediately adjacent fixed connection (attachment) and sealing to a corresponding proximal or distal face of the distal and proximal dynamic seal housings 122 and 120, respectively.

Dynamic Seal Housings

FIGS. 14A and 14B are schematic perspective and side views, respectively, of an exemplary embodiment of the distal dynamic seal housing 122 (part of the reactor stationary assembly (RSA) 102). FIG. 14C is a schematic of the proximal front view of an exemplary embodiment of the proximal dynamic seal housing 120, and also of the distal front view of the distal dynamic seal housing 122. FIG. 14D is a schematic of the distal front view of an exemplary embodiment of the proximal dynamic seal housing 120, and also of the proximal front view of the distal dynamic seal housing 122. The distal and proximal dynamic seal housings 122 and 120, respectively, are identically the same components with the same structural and functional features and characteristics, and are located opposite and parallel to each other relative to the reactor central housing 110. The dynamic seal housings 122 and 120 are structured and function for firmly supporting and holding (housing) the respective rotatable dynamic seals 146 and 144.

In exemplary embodiments, each of the distal and proximal dynamic seal housings 122 and 120, respectively, is configured with a circular base 121 that has two longitudinally directed distal and proximal circular faces. Each of the distal face of the distal dynamic seal housing 122, and the proximal face of the proximal dynamic seal housing 120, is configured thereupon with a tubular support member 123 that supports and holds a corresponding proximal or distal face of the distal and proximal rotatable lubricated cartridge seals 150 and 148, respectively. Each of the proximal face of the distal dynamic seal housing 122, and the distal face of the proximal dynamic seal housing 120, is configured with a surface 121s that firmly holds thereupon a respective distal or proximal rotatable dynamic seal 146 or 148. Each of the distal and proximal dynamic seal housings 122 and 120, respectively, is also configured with a longitudinally directed rotor shaft passageway (e.g., a circular opening) 222 that facilitates longitudinal passage therethrough of the rotor shaft 152.

The proximal face of the distal dynamic seal housing 122 is fixedly connected (attached) and sealed to the distal face of the distal manifold housing 118. The distal face of the distal dynamic seal housing 122 is fixedly connected (attached) and sealed to the proximal face of the distal lubricated cartridge seal housing 126. The distal face of the proximal dynamic seal housing 120 is fixedly connected (attached) and sealed to the proximal face of the proximal manifold housing 116. The proximal face of the proximal dynamic seal housing 120 is fixedly connected (attached) and sealed to the distal face of the proximal lubricated cartridge seal housing 124.

Lubricated Cartridge Seal Housings

FIGS. 15A and 15B are schematic perspective and side views, respectively, of an exemplary embodiment of the distal lubricated cartridge seal housing 126 (part of the reactor stationary assembly (RSA) 102). FIG. 15C is a schematic of the proximal front view of an exemplary embodiment of the proximal lubricated cartridge seal housing 124, and also of the distal front view of the distal lubricated cartridge seal housing 126. FIG. 15D is a schematic of the distal front view of an exemplary embodiment of the proximal lubricated cartridge seal housing 124, and also of the proximal front view of the distal lubricated cartridge seal housing 126. The distal and proximal lubricated cartridge seal housings 126 and 124, respectively, are identically the same components with the same structural and functional features and characteristics, and are located opposite and parallel to each other relative to the reactor central housing 110. The lubricated cartridge seal housings 126 and 124 are structured and function for firmly supporting and holding (housing) the respective rotatable lubricated cartridge seals 150 and 148, and for firmly supporting the rotor shaft 152.

In exemplary embodiments, each of the distal and proximal lubricated cartridge seal housings 126 and 124, respectively, is configured with a circular base 125 that has two longitudinally directed distal and proximal circular faces. Each of the distal face of the distal lubricated cartridge seal housing 126, and the proximal face of the proximal lubricated cartridge seal housing 124, is configured thereupon with a seal supporting and holding member 127 that supports and holds the body of the distal and proximal rotatable lubricated cartridge seals 150 and 148, respectively. In exemplary embodiments, the seal supporting and holding member 127 is configured as a tubular member longitudinally extending proximally and distally, and having at least two (for example, six) triangular support arms 127a extending from along the longitudinal walls of the seal supporting and holding member 127 to the outer surface of the corresponding distal or proximal face of the base 125 of the respective distal or proximal lubricated cartridge seal housing 126 and 124. Each of the distal and proximal lubricated cartridge seal housings 126 and 124, respectively, is also configured with a longitudinally directed rotor shaft passageway (e.g., a circular opening) 224 that facilitates longitudinal passage therethrough of the rotor shaft 152.

The proximal face of the distal lubricated cartridge seal housing 126 is fixedly connected (attached) and sealed to the distal face of the distal dynamic seal housing 122. The distal face of the distal lubricated cartridge seal housing 126 is fixedly connected (attached) and sealed to the proximal face of the (locating) distal rotatable cartridge bearing 156. The distal face of the proximal lubricated cartridge seal housing 124 is fixedly connected (attached) and sealed to the proximal face of the proximal dynamic seal housing 120. The proximal face of the proximal lubricated cartridge seal housing 124 is fixedly connected (attached) and sealed to the distal face of the (non-locating) proximal rotatable cartridge bearing 154.

Anti-Abrasion Shield

In exemplary embodiments of the chemical reactor, the reactor stationary assembly (RSA) 102 is additionally configured with an anti-abrasion shield (for example, anti-abrasion shield 128). FIGS. 16A, 16B, and 16C are schematic tilted front, side, and perspective views, respectively, of an exemplary embodiment of the anti-abrasion shield 128 (part of the reactor stationary assembly (RSA) 102). FIG. 8 schematically shows a distal front cut-away view of the anti-abrasion shield 128 relative to the reactor central housing 110, inside the chemical reaction chamber 115. The anti-abrasion shield 128 is structured and functions for physically/mechanically shielding the tubular inner surface 110e of the reactor central housing 110 from abrasion (i.e., physical or/and chemical 'wear and tear') during operation of the chemical reactor 100.

The anti-abrasion shield 128 is configured as a tubular member longitudinally extending proximally and distally inside of the reactor central housing 110, and having a body 128a with proximal and distal circular open ends 128b and 128c, respectively. The proximal circular open end 128b is covered by, fixedly connected (attached) and sealed to, the distal circular face of the base 112a of the proximal reactor input/output manifold 112. The distal circular open end 128c is covered by, fixedly connected (attached) and sealed to, the proximal circular face of the base 112a of the distal reactor input/output manifold 114.

In exemplary embodiments, the anti-abrasion shield 128 is fixedly connected (attached) to the inside (i.e., the tubular inner surface 110e) of the middle portion 110a of the reactor central housing 110. In exemplary embodiments, the antiabrasion shield 128 is configured with at least one fixing element (for example, in FIGS. 16A-16C, two fixing elements 230) which facilitate fixedly connecting (attaching) the anti-abrasion shield 128 to the inner surface 110e of the reactor central housing 110. In exemplary embodiments, the anti-abrasion shield fixing elements 230 are configured as small (circular or elliptical) protrusions that protrude (extend, jut out, or project) from the tubular outer peripheral surface of the anti-abrasion shield 128. Such small protrusions are configured (shaped and sized) so as to securely and fixedly fit into corresponding mating depressions (small hollowed out portions) [for example, in FIG. 9B, indicated as anti-abrasion shield fixing points 110fp] that are configured in the tubular inner surface 110e of the reactor central housing 110.

In exemplary embodiments wherein the reactor stationary assembly (RSA) 102 is additionally configured with the anti-abrasion shield 128, after extended operation of the chemical reactor 100, and upon observing that the anti-abrasion shield 128 shows signs of extensive abrasion (physical or/and chemical 'wear and tear'), there is replacing the used and 'worn' anti-abrasion shield 128 with a new one, while keeping the same reactor central housing 110 in the reactor stationary assembly (RSA) 102 of the chemical reactor 100. Such exemplary embodiments provide the advantage of not needing to replace the reactor central housing 110 after extended operation of the chemical reactor 100, during which extensive abrasion (physical or/and chemical 'wear and tear') occur during operation of the chemical reactor 100.

Reactor Rotary Mixing Assembly (RRMA)

The reactor rotary mixing assembly (RRMA) 104 is configured with only rotatable components that rotate (i.e., relative to components of the reactor stationary assembly (RSA) 102) during operation of the chemical reactor 100, and includes: a rotor 140; proximal and distal rotatable dynamic seals 144 and 146, respectively; proximal and distal rotatable lubricated cartridge seals 148 and 150, respectively; and a rotatable rotor shaft 152. In exemplary embodiments, the rotary mixing assembly (RRMA) 104 is additionally configured with proximal and distal rotatable cartridge bearings 154 and 156, respectively. In exemplary embodiments, the rotary mixing assembly (RRMA) 104 is additionally configured with one proximal rotatable paired set 158a, and with two distal rotatable paired sets 158b and 158c, of a locknut 160 and a locknut washer 162.

Rotor

FIGS. 17A and 17B are schematic perspective and side views, respectively, of an exemplary embodiment of the rotor 140 (part of the reactor rotary mixing assembly (RRMA) 104). FIGS. 18A and 18B are schematic perspective and side views, respectively, of an exemplary embodiment of the rotor 140 (part of the reactor rotary mixing assembly (RRMA) 104), with an exemplary central reinforcement disc 190. The rotor 140 is structured and functions for being: (i) a main driver of inputting (via forced pressure differentials and suction) of material into the chemical reactor 100 (chemical reaction chamber 115), (ii) a main driver of outputting (via forced pressure differentials and discharge) of material from the chemical reactor 100 (chemical reaction chamber 115), (iii) an internal generator of additional heat (produced by forcibly mixing all contents inside the chemical reaction chamber 115) that facilitates desired chemical reactions and catalytic chemical conversion, and (iv) a moving (rotating and impinging) surface upon which takes place desired chemical reactions and catalytic chemical conversion.

The rotor 140 is housed inside of the reactor central housing 110, and is configured with a rotor tubular portion 170 and a plurality of equally configured (shaped and sized) radially curved rotor blades 180 that radially extend from, and longitudinally along, the outer circumferential periphery of the rotor tubular portion 170. The rotor tubular portion 170 longitudinally extends proximally and distally, and has proximal and distal circular open ends, so as to form a longitudinally directed rotor shaft passageway (a circular opening) 172 that facilitates longitudinal passage therethrough of the rotor shaft 152. The rotor 140 is fixedly mounted on (connected, attached to), via the rotor tubular portion 170, the rotatable rotor shaft 152, so as to facilitate controllable rotation of the rotor 140 during operation of the chemical reactor 100.

In exemplary embodiments, the rotor 140 is configured without a rotor central reinforcement disc 190, for example, as shown in FIGS. 17A and 17B. In other exemplary embodiments, the rotor 140 is configured with a rotor central reinforcement disc 190, for example, as shown in FIGS. 18A and 18B, and in several other accompanying figures.

In exemplary embodiments, the rotor central reinforcement disc 190 is configured for mechanically reinforcing (strengthening) the rotor 140. The rotor central reinforcement disc 190 has proximal and distal circular faces, and a central opening concentric with the circumferential periphery of the rotor tubular portion 170, thereby facilitating longitudinal passage therethrough of the rotor shaft 152. The rotor central reinforcement disc 190 transversely bisects (divides into two equal portions) the longitudinal lengths LL of the rotor blades 180, and the outer circumferential periphery of the rotor central reinforcement disc 190 is transverse to, and coincides with, the radial outer ends of the rotor blades 180. In exemplary embodiments, the rotor central reinforcement disc 190 has equally configured (shaped and sized), triangular like, sectors 190s, wherein each sector 190s has distal and proximal facing sides (surfaces).

Exemplary reference is made to the exemplary rotor 140 shown in FIGS. 17A and 17B, whereby the following illustrative description of the rotor blades 180 is equally applicable to the exemplary rotor 140 shown in FIGS. 18A and 18B.

In exemplary embodiments, the rotor 140 is characterized by the structural features of the rotor tubular portion 170, of the rotor blades 180, and of the rotor central reinforcement disc 190.

In the rotor 140, the rotor tubular portion 170 is characterized by its inner diameter.

In the rotor 140, the equally configured (shaped and sized) radially curved rotor blades 180 are characterized by the structural features of: (i) number of rotor blades, (ii) rotor blade longitudinal length LL, (iii) rotor blade curved radial length CL, (iv) rotor blade thickness TK, and (v) rotor blade angle of curvature a.

(i) The number of rotor blades corresponds to the total number of equally configured (shaped and sized) radially curved rotor blades 180 that radially extend from, and longitudinally along, the outer circumferential periphery of the rotor tubular portion 170.

(ii) The rotor blade longitudinal length LL corresponds to the longitudinal (proximal to distal) length of each rotor blade 180.

(iii) The rotor blade curved radial length CL corresponds to the 'actual' full radially directed length of each rotor blade 180 in its curved form, that radially extends from the outer circumferential periphery of the rotor tubular portion 170.

(iv) The rotor blade thickness TK corresponds to the (for example, uniform) thickness of each rotor blade 180 (longitudinally and radially) along the entirety of its curved form.

(v) The rotor blade angle of curvature a corresponds to the angle formed between a first tangent line t1 that originates from a point on the outer periphery of the rotor tubular portion 170 and tangentially extends therefrom along the essentially non-curved and minimally curved portions of the rotor blade 180, and a second tangent line t2 that originates from a point on the most curved portion of the rotor blade 180 and tangentially extends therefrom.

In the rotor 140, the rotor central reinforcement disc 190 is characterized by the structural features of: (i) (radially directed) disc diameter, and (ii) (longitudinally directed) disc thickness.

Exemplary embodiments of the rotor 140, wherein at least one of the rotor blades 180, or/and the rotor central reinforcement disc 190, is/are configured with at least one rotor-based performance and process control structural feature selected from the group consisting of: openings (e.g., holes or slits), protrusions (e.g., teeth or spikes, or mounds), and depressions (e.g., inverse mounds), are illustratively described below in the section entitled: Rotor-based performance and process control structural features.

Exemplary ranges of size dimensions for each of the above described structural features of the rotor 140 are also provided further below.

In exemplary embodiments, during operation of the chemical reactor 100 (and inside the chemical reaction chamber 115), the intended direction of rotation of the rotor 140 (when fixedly mounted on (connected, attached to) the rotor shaft 152), and of the other selected components (i.e., of the reactor rotary mixing assembly (RRMA)) of the chemical reactor that also rotate, is 'clockwise', as indicated, for example, in FIGS. 2A, 2B, and 17A, 18A, by the reference letter R alongside the curved arrow pointing in the 'clockwise' direction. According to such exemplary embodiments, the convex faces (surfaces) of the rotor blades 180 are the leading or front faces (surfaces) during the clockwise rotation of the rotor 140, and the concave faces (surfaces) of the rotor blades 180 are the trailing or back faces (surfaces) during the clockwise rotation of the rotor 140. During the clockwise rotation of the rotor 140, the convex leading or front faces (surfaces) 'forcibly' impinge upon, physically (mechanically) engage and interact with, and drive the contents (i.e., the solid/liquid/vapor/gas mixture) inside the chemical reaction chamber 115.

Rotatable Dynamic Seals

FIGS. 19A and 19B are schematic perspective and side views, respectively, of an exemplary embodiment of the distal rotatable dynamic seal 146 (part of the reactor stationary assembly (RRMA) 104). FIG. 19C is a schematic of the proximal front view of an exemplary embodiment of the proximal rotatable dynamic seal 144, and also of the distal front view of the distal rotatable dynamic seal 146. FIG. 19D is a schematic of the distal front view of an exemplary embodiment of the proximal rotatable dynamic seal 144, and of the proximal front view of the distal rotatable dynamic seal 146. The distal and proximal rotatable dynamic seals 146 and 144, respectively, are identically the same components with the same structural and functional features and characteristics, and are located opposite and parallel to each other relative to the reactor central housing 110.

The rotatable dynamic seals 146 and 144 are structured and function like impellers that are rotationally driven by the rotary motion of the rotor shaft 152. During operation of the chemical reactor 100, each of the distal and proximal rotatable dynamic seals 146 and 144, respectively, rotates and impels (forcibly moves, pumps, transfers) and returns chemical reaction material which escapes or leaks from the chemical reaction chamber 115, back into the direction of the chemical reaction chamber 115. Accordingly, chemical reaction material that escapes or leaks from the chemical reaction chamber 115 and contacts the rotatable dynamic seals 146 and 144, via action of the rotatable dynamic seals 146 and 144 is longitudinally inwardly (i.e., proximally or distally, respectfully) impelled (forcibly moved, pumped, transferred) along the outer surface of the rotor shaft 152, towards and back into the direction of the chemical reaction chamber 115.

Such action by the rotatable dynamic seals 146 and 144 prevents, or at least minimizes chemical reaction material that contacts the rotatable dynamic seals 146 and 144, from further moving longitudinally outwardly (i.e., distally or proximally, respectfully) through and past the rotatable dynamic seals 146 and 144, towards and into the direction of the respective rotatable lubricated cartridge seals 150 and 148. That, in turn, prevents, or at least minimizes, chemical reaction material from contacting and possibly contaminating, and decreasing sealing performance of, the respective rotatable lubricated cartridge seals 150 and 148. In effect, the rotatable dynamic seals 146 and 144 function as 'secondary' seals, which, together with the respective rotatable lubricated cartridge seals 150 and 148 functioning as 'primary' seals, prevent, or at least minimize, chemical reaction material (originating from the chemical reaction chamber 115) that longitudinally outwardly moves along or/and through the rotor shaft 152, from escaping the chemical reactor 100.

In exemplary embodiments, each of the distal and proximal rotatable dynamic seals 146 and 144, respectively, is configured with a circular base 145 that has two longitudinally directed distal and proximal circular faces. Each of the distal face of the distal rotatable dynamic seal 146, and the proximal face of the proximal rotatable dynamic seal 144, is configured thereupon with a star fish like member 147. In exemplary embodiments, the star fish like member 147 has at least two (for example, twelve) curved arms. Each of the proximal face of the distal rotatable dynamic seal 146, and the distal face of the proximal rotatable dynamic seal 144, is configured with a flat surface 145s that facilitates each of the distal and proximal rotatable dynamic seals 146 and 144, respectively, to firmly fit upon, and be held by, the surface 121s of the respective distal or proximal dynamic seal housing 122 or 120. Each of the distal and proximal rotatable dynamic seals 146 and 144, respectively, is also configured with a longitudinally directed rotor shaft passageway (e.g., a circular opening) 226 that facilitates longitudinal passage therethrough of the rotor shaft 152.

Rotatable Lubricated Cartridge Seals

FIGS. 20A and 20B are schematic perspective and side views, respectively, of an exemplary embodiment of the distal rotatable lubricated cartridge seal 150 (part of the reactor rotary mixing assembly (RRMA) 104). The distal and proximal rotatable cartridge seals 150 and 148, respectively, are identically the same components with the same structural and functional features and characteristics, and are located opposite and parallel to each other relative to the reactor central housing 110. Each of the distal and proximal rotatable lubricated cartridge seals 150 and 148, respectively, is housed inside the seal supporting and holding member 127 of each respective distal and proximal lubricated cartridge seal housing 126 and 124.

The distal and proximal rotatable cartridge seals 150 and 148, respectively, are structured and function to receive, and then, transfer, an externally supplied flow of cool lubricant along the outer surface of the rotor shaft 152, longitudinally inwardly (i.e., proximally or distally, respectively) towards and into the direction of the chemical reaction chamber 115. The rotatable lubricated cartridge seals 150 and 148 function as 'primary' seals, which, together with the respective rotatable dynamic seals 146 and 144 functioning as 'secondary' seals, prevent, or at least minimize, chemical reaction material (originating from the chemical reaction chamber 115) that longitudinally outwardly moves along or/and through the rotor shaft 152, from escaping the chemical reactor 100.

In exemplary embodiments, each of the proximal face of the distal rotatable cartridge seal 150, and the distal face of the proximal rotatable cartridge seal 148, is configured thereupon with a telescopic like tubular lubricant flow receiver and transfer member 149a. The lubricant flow receiver and transfer member 150a is configured for receiving a cool lubricant flow (in a range of between about 1-5 liters per hour), from an external source, and transferring the lubricant flow along the outer surface of the rotor shaft 152, longitudinally inwardly (i.e., proximally or distally, respectively) towards and into the direction of the chemical reaction chamber 115. In exemplary embodiments, the lubricant flow receiver and transfer member 149a is configured with a lubricant flow input aperture 149c that facilitates receiving of the externally supplied lubricant flow. In exemplary embodiments, each of the distal face of the distal rotatable cartridge seal 150, and the proximal face of the proximal rotatable cartridge seal 148, is configured thereupon with a tubular support member 149b. The tubular support member 149b is configured for firmly supporting each distal and proximal rotatable lubricated cartridge seal 150 and 148 upon the rotor shaft 152. Each of the distal and proximal rotatable lubricated cartridge seals 150 and 148, respectively, is also configured with a longitudinally directed rotor shaft passageway (e.g., a circular opening) 228 that facilitates longitudinal passage therethrough of the rotor shaft 152.

Rotatable Rotor Shaft

FIGS. 21A and 21B are schematic perspective and top views, respectively, of an exemplary embodiment of the rotatable rotor shaft 152 (part of the reactor rotary mixing assembly (RRMA) 104). The rotatable rotor shaft 152 is structured and functions as the component (body, member) of the overall chemical reactor 100 that rotates all the other components of the reactor rotary mixing assembly (RRMA) 104 of the chemical reactor 100. For doing such, the rotor shaft 152 is structured and functions for securely supporting and fixing thereupon, at pre-determined selected positions therealong, all the other components of the reactor rotary mixing assembly (RRMA) 104. In exemplary embodiments, the rotor shaft 152 is also structured and functions for being operably connectable (for example, at the distal end portion thereof) to a rotor shaft drive unit (for example, rotor shaft drive unit 300 shown in FIGS. 37 and 38) that is configured for driving (powering) and rotating the rotor shaft 152, which, in turn, translates to driving and rotating the rotor 140, and the other components [i.e., of the reactor rotary mixing assembly (RRMA)] of the chemical reactor 100 that also rotate.

The rotatable rotor shaft 152 is longitudinally supported via the proximal and distal lubricated cartridge seal housings 124 and 126, respectively, and longitudinally passes through the reactor central housing 110 proximal and distal circular open ends 110b and 110c, and through the rotor shaft passageways of the following components: the rotor 152, the proximal and distal reactor input/output manifolds 112 and 114, respectively; the proximal and distal manifold housings 116 and 118, respectively; the proximal and distal rotatable dynamic seals 144 and 146, respectively; the proximal and distal dynamic seal housings 120 and 122, respectively; the proximal and distal rotatable lubricated cartridge seals 148 and 150, respectively; and the proximal and distal lubricated seal housings 124 and 126, respectively.

In exemplary embodiments wherein the reactor stationary assembly (RSA) 102 additionally includes the anti-abrasion shield 128, the rotor shaft 152 also longitudinally passes through the anti-abrasion shield 128 proximal and distal circular open ends 128b and 128c, respectively. In exemplary embodiments wherein the reactor rotary mixing assembly (RRMA) 104 additionally includes the proximal and distal rotatable cartridge bearings 154 and 156, respectively, or/and, additionally includes at least one rotatable paired set 158 of a locknut 160 and a locknut washer 162, the rotor shaft 152 also longitudinally passes through these components.

The rotor shaft 152 is (longitudinally and coaxially) fixedly connected (attached) to the rotor tubular portion 170, so as to facilitate controllable rotation of the rotor 140 inside the chemical reaction chamber 115 during operation of the chemical reactor 100. The rotor shaft 152 includes several reactor rotary mixing assembly (RRMA) component mounting (connecting, attaching) and fixing portions or sections (for example, grooves, slots, slits, recesses, depressions, and the like) located at several places along the longitudinal length of the rotor shaft 152, which are configured (shaped and sized) for mounting (connecting, attaching) and fixing all the components of the reactor rotary mixing assembly (RRMA) 104 that rotate during operation of the chemical reactor 100. For example, in FIGS. 21A and 21B, such reactor rotary mixing assembly (RRMA) component mounting and fixing portions or sections are generally indicated, and encompassed, by the bracket with reference number 240. Thus, the reactor rotary mixing assembly (RRMA) component mounting and fixing portions or sections 240 are configured (shaped and sized) for fixedly mounting (connecting, attaching) upon the rotor shaft 152 all other components of the reactor rotary mixing assembly (RRMA) 104, namely, the rotor 140; the proximal and distal rotatable dynamic seals 144 and 146, respectively; and the proximal and distal rotatable lubricated cartridge seals 148 and 150, respectively. For example, the reactor rotary mixing assembly (RRMA) component mounting and fixing portion or section 240a is configured for fixedly mounting the rotor 140 (via the inner wall surface of the rotor tubular portion 170) upon the rotor shaft 152.

In exemplary embodiments wherein the reactor rotary mixing assembly (RRMA) 104 additionally includes the proximal and distal rotatable cartridge bearings 154 and 156, respectively, or/and, additionally includes at least one rotatable paired set 158 of a locknut 160 and a locknut washer 162, the reactor rotary mixing assembly (RRMA) component mounting and fixing portions or sections 240 are also configured (shaped and sized) for fixedly mounting those additional reactor components upon the rotor shaft 152.

In exemplary embodiments, for example, as shown in FIGS. 21A and 21B, the rotor shaft circumferential outer surface is tapered, with decreasing diameters, at several specific locations along the longitudinal length of the rotor shaft 152. Such tapering starts from the rotor shaft middle portion 152mp and longitudinally outwardly continues towards each of the rotor shaft proximal and distal end portions 152*pep* and 152*dep*, respectively. A main function of such longitudinal tapering of the rotor shaft circumferential outer surface is to facilitate optimum, strong, and stable mounting (connecting, attaching) and fixing of the reactor rotary mixing assembly (RRMA) 104 components upon and to the rotor shaft 152.

As illustratively described below along with reference to FIGS. 37 and 38, in exemplary embodiments, the chemical reactor 100, in general, and the rotor shaft 152, in particular, are operably connectable to a rotor shaft drive unit 300 that is configured for driving (powering) and rotating the rotor shaft 152. Such operable connection is facilitated by the rotor shaft 152 additionally including a rotor shaft drive unit connecting and fixing portion, for example, 250, that is located along the rotor shaft distal end portion 152*dep*, as shown in FIGS. 21A and 21B. For example, in such exemplary embodiments, the rotor shaft drive unit connecting and fixing portion 250 is operably connectable to a shaft-to-shaft coupling device, which, in turn, is operably connectable to a motorized drive shaft of the rotor shaft drive unit 300.

Rotatable Cartridge Bearings

In exemplary embodiments, the rotary mixing assembly (RRMA) 104 is additionally configured with distal and proximal rotatable cartridge bearings 156 and 154, respectively. FIGS. 22A and 22B are schematic perspective and side views, respectively, of an exemplary embodiment of the distal rotatable cartridge bearing 156 (part of the reactor rotary mixing assembly (RRMA) 104). The distal and proximal rotatable cartridge bearings 156 and 154, respectively, are the same components with similar structural and functional features and characteristics, and are located opposite and parallel to each other relative to the reactor central housing 110. The rotatable cartridge bearings 156 and 154 are structured and function to provide support and stability to the rotor shaft 152, in a manner which enables the rotor shaft 152 to rotate about its longitudinal axis with minimal friction.

In exemplary embodiments, the distal rotatable cartridge bearing 156 is configured as a 'locating' type of cartridge bearing, that provides both 'radial' support and (proximal-distal) 'longitudinal' guidance to the rotor shaft 152. In exemplary embodiments, the proximal rotatable cartridge bearing 154 is configured as a 'non-locating' type of cartridge bearing, that provides 'radial' support to the rotor shaft 152. Aside from the distal-most and proximal-most longitudinal ends of the rotor shaft 152, the distal and proximal rotatable cartridge bearings 156 and 154, respectively, are the longitudinally outer most components of the chemical reactor 100. The proximal face of the (locating) distal cartridge bearing 156 is fixedly connected (attached) and sealed to the distal face of the distal lubricated cartridge seal housing 126. The distal face of the (non-locating) proximal cartridge bearing 154 is fixedly connected (attached) and sealed to the proximal face of the proximal lubricated cartridge seal housing 124.

In exemplary embodiments, each of the proximal face of the distal rotatable cartridge bearing 156, and the distal face of the proximal rotatable cartridge bearing 154, is configured thereupon with a tubular cartridge 155*a* that provides stability to the rotor shaft 152. In exemplary embodiments, each of the distal face of the distal rotatable cartridge bearing 156, and the proximal face of the proximal rotatable cartridge bearing 154, is configured thereupon with a tubular support member 155*b* that firmly supports each respective distal and proximal rotatable cartridge bearing 156 and 154 when fixedly mounted on the rotor shaft 152. Each of the distal and proximal rotatable cartridge bearings 156 and 154, respectively, is also configured with a longitudinally directed rotor shaft passageway (e.g., a circular opening) 260 that facilitates longitudinal passage therethrough of the rotor shaft 152.

In exemplary embodiments, the proximal rotatable cartridge bearing 154 is fixedly mounted on the proximal-most longitudinal end of the rotor shaft 152, such that a relatively short length of the proximal-most longitudinal end of the rotor shaft 152 proximally extends beyond the proximal face of the proximal rotatable cartridge bearing 154. In exemplary embodiments, the distal rotatable cartridge bearing 156 is fixedly mounted on the distal-most longitudinal end of the rotor shaft 152, such that a relatively moderate length of the distal-most longitudinal end of the rotor shaft 152 distally extends beyond the distal face of the distal rotatable cartridge bearing 154. In such exemplary embodiments, the relatively moderate length of the rotor shaft 152 distal-most longitudinal end that distally extends beyond the distal face of the distal rotatable cartridge bearing 154, corresponds to the distal end portion 152*dep* of the rotor shaft 152 that is configured with the rotor shaft drive unit connecting and fixing portion 250 (for example, as shown in FIGS. 21A and 21B).

Rotatable Paired Sets of a Locknut and a Locknut Washer

In exemplary embodiments of the chemical reactor 100, the reactor rotary mixing assembly (RRMA) 104 additionally includes at least one rotatable paired set 158 of a locknut 160 and a locknut washer 162. FIG. 23 is a schematic perspective view of an exemplary embodiment of a distal rotatable paired set 158*b* of a locknut 160 and a locknut washer 162 (part of the reactor rotary mixing assembly (RRMA) 104). The distal and proximal rotatable paired sets 158*a*, 158*b*, and 158*c*, of a locknut 160 and a locknut washer 162, for example, as particularly shown in FIGS. 1 and 5, are identically the same components with the same structural and functional features and characteristics. The rotatable paired sets 158*a*, 158*b*, and 158*c*, of the locknut 160 and the locknut washer 162, are structured and function to additionally facilitate securing and fixing the positions of components of the reactor rotary mixing assembly (RRMA) 104 on and along the rotor shaft 152. In turn, that provides additional stability to the rotor shaft 152 having thereupon fixedly mounted components of the reactor rotary mixing assembly (RRMA) 104, during rotation of the rotor shaft 152.

In exemplary embodiments, each of the locknut 160 and the paired locknut washer 162 is configured as a ring or ring-like member, having proximal and distal circular open ends which are in the direction of, and transversely face, the longitudinal axis of the reactor rotary mixing assembly (RRMA) 104, and which facilitate longitudinal passage therethrough of the rotor shaft 152. For each rotatable paired set 158, the locknut 160 and the paired locknut washer 162 are configured for being immediately adjacent and opposite to each other when positioned and fixedly mounted on the rotor shaft 152. Such configuration is indicated, for example, in FIG. 23 by the two-headed dashed line arrow 161, and shown, for example, in FIG. 1 (components 158*a* and 158*b*).

In exemplary embodiments, the reactor rotary mixing assembly (RRMA) 104 additionally includes at least one rotatable paired set 158 of a locknut 160 and a locknut washer 162, located at one or more of the following positions (i), (ii), (iii), or/and (iv) on the rotor shaft 152. (i) Between the distal face of the proximal rotatable lubricated cartridge seal 148 and the proximal face of the proximal rotatable dynamic seal 144. (ii) Between the proximal face of the distal rotatable lubricated cartridge seal 150 and the distal face of the distal rotatable dynamic seal 146. (iii) Between the rotor tubular portion 170 distal open end and the proximal face of the distal rotatable dynamic seal 146. (iv) Between the rotor tubular portion 170 proximal open end and the distal face of the proximal rotatable dynamic seal 144. FIG. 5 shows exploded perspective views of the exemplary embodiments (i), (ii), and (iii), corresponding to one proximal rotatable paired set 158a, and two distal rotatable paired sets 158b and 158c, respectively, of the locknut 160 and the locknut washer 162.

Rotor-Based Performance and Process Control Structural Features

In exemplary embodiments of the chemical reactor 100, in general, and of the rotor 140, in particular, the rotor 140 is configured with at least one rotor-based performance and process control structural feature selected from the group consisting of: openings, protrusions, and depressions. In exemplary embodiments, the openings are in the form of holes or slits that pass entirely through the thickness of one or more portions of the rotor 140; the protrusions are in the form of teeth or spikes, or mounds that outwardly protrude (project, extend) from the surface(s) of one or more portions of the rotor 140; and the depressions are in the form of inverse mounds that inwardly protrude (project, extend) into (but, not entirely through) the surface(s) of one or more portions of the rotor 140.

The one or more portions of the rotor 140 that is/are so configured with the at least one rotor-based performance and process control structural feature (i.e., openings, protrusions, depressions), corresponds to at least one rotor blade 180 of the rotor 140, namely, one rotor blade 180 of the rotor 140, or several (but not all) rotor blades 180 of the rotor 140, or all rotor blades 180 of the rotor 140. Accordingly, in exemplary embodiments, the openings are in the form of holes or slits that pass entirely through the radially curved thickness of one or more portions of the rotor blades 180; the protrusions are in the form of teeth or spikes, or mounds that outwardly protrude (project, extend) from the radially curved surface(s) of one or more portions of the rotor blades 180; and the depressions are in the form of inverse mounds that inwardly protrude (project, extend) into (but, not entirely through) the radially curved thickness of one or more portions of the rotor blades 180.

In exemplary embodiments wherein the rotor 140 includes the rotor central reinforcement disc 190, optionally, alternatively, or additionally, the one or more portions of the rotor 140 that is/are so configured with the one or more rotor-based performance and process control structural features (i.e., openings, protrusions, depressions), corresponds to at least a portion of the rotor central reinforcement disc 190, namely, one (triangular like) sector 190s of the rotor central reinforcement disc 190 of the rotor 140, or several (but not all) (triangular like) sectors 190s of the rotor central reinforcement disc 190 of the rotor 140, or all (triangular like) sectors 190s of the rotor central reinforcement disc 190 of the rotor 140. Accordingly, in exemplary embodiments, the openings are in the form of holes or slits that pass entirely through the thickness of one or more sectors 190s of the rotor central reinforcement disc 190; the protrusions are in the form of teeth or spikes, or mounds that outwardly protrude (project, extend) from the thickness and surface(s) of one or more sectors 190s of the rotor central reinforcement disc 190; and the depressions are in the form of inverse mounds that inwardly protrude (project, extend) into (but, not entirely through) the thickness of one or more sectors 190s of the rotor central reinforcement disc 190.

As illustratively described below, according to such exemplary embodiments, the rotor based performance and process control structural features (i.e., openings, protrusions, depressions) are configured (shaped and sized) so as to facilitate 'fine-tuning' type additional controlling performance of the rotor 140, in particular, and of the chemical reactor 100, in general, which, in turn, translates into providing an additional layer or level of control of the numerous (chemical reaction related) physicochemical processes taking place inside the reactor central housing 110 (i.e., inside the chemical reaction chamber 115) during operation of the chemical reactor 100. In such exemplary embodiments, compared to the rotor 140 configured without the rotor-based performance and process control structural features, the rotor 140 configured with the rotor-based performance and process control structural features facilitates such 'fine-tuning' additional controlling of the performance of the rotor 140, and of the chemical reactor 100, thereby providing the additional layer or level of control of the numerous (chemical reaction related) physicochemical processes taking place inside the reactor central housing 110 (chemical reaction chamber 115) during operation of the chemical reactor 100.

As illustratively described hereinabove, in exemplary embodiments, during operation of the chemical reactor 100 (and inside the chemical reaction chamber 115), the intended direction of rotation of the rotor 140 (when fixedly mounted on (connected, attached to) the rotor shaft 152), and of the other selected components (i.e., of the reactor rotary mixing assembly (RRMA)) of the chemical reactor 100 that also rotate, is 'clockwise', as indicated, for example, in FIGS. 2A, 2B, and 17A, 18A, by the reference letter R alongside the curved arrow pointing in the clockwise direction. According to such exemplary embodiments, the convex faces (surfaces) of the rotor blades 180 are the leading or front faces (surfaces) during the clockwise rotation of the rotor 140, and the concave faces (surfaces) of the rotor blades 180 are the trailing or back faces (surfaces) during the clockwise rotation of the rotor 140. During the clockwise rotation of the rotor 140, the convex leading or front faces (surfaces) 'forcibly' impinge upon, physically (mechanically) engage and interact with, and drive the contents (i.e., the solid/liquid/vapor/gas mixture) inside the reactor central housing 110 (i.e., inside the chemical reaction chamber 115).

The same intended (clockwise) direction of rotation R of the rotor 140 (when fixedly mounted on (connected, attached to) the rotor shaft 152) is applicable to the exemplary embodiments wherein at least one of the rotor blades 180 is configured with at least one rotor-based performance and process control structural feature (i.e., openings, or/and protrusions, or/and depressions). In such exemplary embodiments, the rotor-based performance and process control structural feature of openings (i.e., holes or/and slits) pass entirely through the one or more rotor blades 180, and therefore, pass entirely through the leading or front convex faces (surfaces) and the trailing or back faces (surfaces) of the rotor blades 180. Accordingly, in such exemplary embodiments, the two other rotor-based performance and process control structural features of protrusions or/and depressions are configured only on the leading or front convex faces (surfaces) of the rotor blades 180. Such exemplary embodiments are shown, for example, in FIGS. 24-36.

During the clockwise rotation of the rotor 140, the rotor-based performance and process control structural features (openings, or/and protrusions, or/and depressions) that are configured on or/and through one or more of the rotor blades 180, or/and optionally, configured on or/and through one or more portions of the rotor central reinforcement disc 190, 'forcibly' impinge upon, physically (mechanically) engage and interact with, and drive the contents (i.e., the solid/liquid/vapor/gas mixture) inside the reactor central housing 110 (i.e., inside the chemical reaction chamber 115) of the chemical reactor 100. Such 'forcible' impingement upon, physical (mechanical) engagement and interaction with, and driving of, the contents inside the chemical reaction chamber 115 provide additional mechanisms for the numerous (chemical reaction related) physicochemical processes of mass and heat transfer, mixing, degradation, and catalytic chemical conversion, that take place during operation of the chemical reactor 100. In turn, such additional mechanisms enhance, for example, by expediting (by reducing time requirements) or/and improving energy efficiency (by reducing energy requirements) of the overall catalytic chemical conversion process encompassing initial input conversion of the organic materials and output production of diesel and other liquid fuels.

FIGS. 24 through 36 are different schematic views of exemplary embodiments of the rotor 140 (i.e., rotor blades 180 or/and rotor central reinforcement disc 190) configured with several exemplary rotor-based performance and process control structural features in the forms of (hole or slit) openings, or/and (teeth or spike, or mound) protrusions, or/and (inverse mound) depressions. In FIGS. 24-36, exemplary hole openings are indicated as 'holes 140*ho*', exemplary slit openings are indicated as 'slits 140*sl*', exemplary teeth or spike protrusions are indicated as 'teeth, spikes 140*tsp*', exemplary mound protrusions are indicated as 'mounds 140*mo*', and exemplary inverse mound depressions are indicated as 'inverse mounds imo'. The holes 140*ho* or slits 140*sl* pass entirely through the indicated portions (of a rotor blade 180, or of a sector 190*s* of the rotor central reinforcement disc 190) of the rotor 140; the teeth or spikes 140*tsp*, or mounds 140*mo* outwardly protrude (project, extend) from the surface(s) of the indicated portions (of a rotor blade 180, or of a sector 190*s* of the rotor central reinforcement disc 190) of the rotor 140; and the inverse mounds 140*imo* inwardly protrude (project, extend) into (but, not entirely through) the surface(s) of the indicated portions (of a rotor blade 180, or of a sector 190*s* of the rotor central reinforcement disc 190) of the rotor 140.

FIGS. 24A and 24B are schematic perspective views of an exemplary embodiment of the rotor 140, with rotor-based performance and process control structural features, being hole type openings 140*ho* in one blade 180, and in all blades 180, respectively. FIGS. 25A and 25B are schematic perspective views of an exemplary embodiment of the rotor 140, with rotor-based performance and process control structural features, being slit type openings 140*s*1 in one blade 180, and in all blades 180, respectively.

FIGS. 26A and 26B are schematic perspective views of an exemplary embodiment of the rotor 140, with rotor-based performance and process control structural features, being teeth or spike type protrusions 140*tsp* on the convex face (surface) of one blade 180, and of all blades 180, respectively. FIGS. 27A and 27B are schematic perspective views of an exemplary embodiment of the rotor 140, with rotor-based performance and process control structural features, being mound type protrusions 140*mo* on the convex face (surface) of one blade 180, and of all blades 180, respectively.

FIGS. 28A and 28B are schematic perspective views of an exemplary embodiment of the rotor 140, with rotor-based performance and process control structural features, being inverse mound type depressions 140*imo* in the convex face (surface) of one blade 180, and of all blades 180, respectively.

FIGS. 29A and 29B are schematic perspective views of an exemplary embodiment of the rotor 140, with rotor-based performance and process control structural features, being hole type openings 140*ho* in one sector 190*s*, and in all sectors 190*s*, respectively, of the rotor central reinforcement disc 190. FIGS. 30A and 30B are schematic perspective views of an exemplary embodiment of the rotor 140, with rotor-based performance and process control structural features, being slit type openings 140*s*1 in one sector 190*s*, and in all sectors 190*s*, respectively, of the rotor central reinforcement disc 190.

FIGS. 31A and 31B are schematic perspective views of an exemplary embodiment of the rotor 140, with rotor-based performance and process control structural features, being teeth or spike type protrusions 140*tsp* on the distal face (surface) of one sector 190*s*, and of all sectors 190*s*, respectively, of the rotor central reinforcement disc 190. FIGS. 32A and 32B are schematic perspective views of an exemplary embodiment of the rotor 140, with rotor-based performance and process control structural features, being teeth or spike type protrusions 140*tsp* on the proximal face (surface) of one sector 190*s*, and of all sectors 190*s*, respectively, of the rotor central reinforcement disc 190. FIGS. 33A and 33B are schematic perspective views of an exemplary embodiment of the rotor 140, with rotor-based performance and process control structural features, being mound type protrusions 140*mo* on the distal face (surface) of one sector 190*s*, and of all sectors 190*s*, respectively, of the rotor central reinforcement disc 190. FIGS. 34A and 34B are schematic perspective views of an exemplary embodiment of the rotor 140, with rotor-based performance and process control structural features, being mound type protrusions 140*mo* on the proximal face (surface) of one sector 190*s*, and of all sectors 190*s*, respectively, of the rotor central reinforcement disc 190.

FIGS. 35A and 35B are schematic perspective views of an exemplary embodiment of the rotor 140, with rotor-based performance and process control structural features, being inverse mound type depressions 140*imo* in the distal face (surface) of one sector 190*s*, and of all sectors 190*s*, respectively, of the rotor central reinforcement disc 190. FIGS. 36A and 36B are schematic perspective views of an exemplary embodiment of the rotor 140, with rotor-based performance and process control structural features, being inverse mound type depressions 140*imo* in the proximal face (surface) of one sector 190*s*, and of all sectors 190*s*, respectively, of the rotor central reinforcement disc 190.

In addition to the exemplary embodiments shown in FIGS. 24-36 of the rotor 140 (i.e., rotor blades 180 or/and rotor central reinforcement disc 190) configured with the herein disclosed exemplary rotor-based performance and process control structural features, numerous other exemplary embodiments are possible for implementing the invention. For example, additional exemplary embodiments wherein the rotor 140 is configured with rotor-based performance and process control structural features, being any combination of hole openings 140*ho*, slit openings 140*sl*, teeth or spike protrusions 140*tsp*, mound protrusions 140*mo*, and inverse mount depressions 140*imo*, in one or more rotor blades 180, or/and in one or more sectors 190*s* of the rotor central reinforcement disc 190.

A first specific additional example is wherein the rotor 140 is configured with rotor-based performance and process control structural features, being a combination of hole openings 140*ho* and slit openings 140*sl* in all blades 180 of the rotor 140. A second specific additional example is wherein the rotor 140 is configured with rotor-based performance and process control structural features, being a combination of teeth or spike protrusions 140*tsp* and mound protrusions 140*mo* in all blades 180 of the rotor 140. A third specific additional example is wherein the rotor 140 is configured with rotor-based performance and process control structural features, being a combination of hole openings 140*ho* and slit openings 140*sl* in all sectors 190*s* of the rotor central reinforcement disc 190.

There are different possible ways of making or forming the herein disclosed rotor-based performance and process control structural features of openings, protrusions, and depressions in or/and on the rotor 140 (without or with the optional rotor central reinforcement disc 190). In a first exemplary way, after making the herein disclosed rotor 140 (without or with the optional rotor central reinforcement disc 190), there is using drilling, cutting, welding, carving (engraving) tools or/and devices for forming selected herein disclosed hole openings 140*ho*, slit openings 140*sl*, teeth or spike protrusions 140*tsp*, mound protrusions 140*mo*, or/and inverse mount depressions 140*imo*, in one or more rotor blades 180, or/and in one or more sectors 190*s* of the rotor central reinforcement disc 190, in the rotor 140. In a second exemplary way, there is appropriately modifying a (conventional type, or 3D printing type) casting mold used in a respective (conventional or 3D printing) casting process that produces the herein disclosed rotor 140 (without or with the optional rotor central reinforcement disc 190). Specifically, by incorporating into the design and making of the (conventional type, or 3D printing type) casting mold used for forming the rotor 140, selected herein disclosed hole openings 140*ho*, slit openings 140*sl*, teeth or spike protrusions 140*tsp*, mound protrusions 140*mo*, or/and inverse mount depressions 140*imo*, in one or more rotor blades 180, or/and in one or more sectors 190*s* of the rotor central reinforcement disc 190. Then, there is using such modified casting mold to cast the rotor 140 having the selected openings, protrusions, or/and depressions, via a conventional type or 3D printing type casting process.

Exemplary Applications of the Chemical Reactor

Hereinabove illustratively described exemplary embodiments of the chemical reactor 100 are particularly applied for performing catalytic thermal conversion of organic materials (e.g., coal, plastics, rubber, plant matter, wood shavings, biomass, organic wastes, among various other possible organic materials) into diesel and other liquid fuels (e.g., automobile or/and jet engine fuels). For effecting such application, the chemical reactor 100, in general, and the rotor shaft 152, in particular, need to be operatively connected to appropriate equipment that powers and drives (rotates) the rotor shaft 152 and the rotor 140, which, in turn, drives the numerous (chemical reaction related) physicochemical processes of mass and heat transfer, mixing, degradation, and catalytic chemical conversion, taking place inside the chemical reaction chamber 115 during operation of the chemical reactor 100.

The chemical reactor 100, in general, and the rotor shaft 152, in particular, are operably connectable to a rotor shaft drive unit (for example, rotor shaft drive unit 300 shown in FIGS. 37 and 38) that is configured for driving (powering) and rotating the rotor shaft 152, which, in turn, translates to driving and rotating the rotor 140, and the other components [i.e., of the reactor rotary mixing assembly (RRMA)] of the chemical reactor 100 that also rotate. As illustratively described hereinabove (with reference to FIGS. 21A, 21B), in exemplary embodiments, such operable connection between the rotor shaft 152 and the rotor shaft drive unit 300 is facilitated by the rotor shaft 152 additionally including a rotor shaft drive unit connecting and fixing portion 250 located along the distal end portion 152*dep* of the rotor shaft 152.

FIG. 37 is a schematic diagram of an exemplary application of the chemical reactor 100, highlighting the chemical reactor 100 operatively connected to an exemplary rotor shaft drive unit 300. In FIG. 37, operative connection (at the distal side) of the chemical reactor 100 to the exemplary rotor shaft drive unit 300 is generally indicated as, and referenced by, the dashed lines having reference number 302 and extending between the rotor shaft distal end portion 152*dep* (that includes the rotor shaft drive unit connecting and fixing portion 250) and the rotor shaft drive unit 300. In such exemplary application, for example, the rotor shaft drive unit connecting and fixing portion 250 is operably connected (indicated by the dotted line 310*a*) to a shaft-to-shaft coupling device 310, which, in turn is operably connected (indicated by the dotted line 310*b*) to the motor of the rotor shaft drive unit 300. In exemplary embodiments, the rotor shaft drive unit 300 includes a power supply 304, a motor 306, and a power interface and control assembly 308.

The motor 306 mechanically engages with, and drives, the rotor shaft 152, which then turns and rotates the rotor 140, and all other (rotatable) components of the reactor rotary mixing assembly (RRMA) 104 that are fixedly mounted on the rotor shaft 152 and which also rotate inside the chemical reactor 100. Such mechanical engagement and driving is facilitated, for example, by the motor 306 having a motorized drive shaft operably connected (indicated by dotted line 310*b*) to the shaft-to-shaft coupling device 310, which, in turn, is operably connected (indicated by dotted line 310*a*) to the distal end portion 152*dep* (that includes the rotor shaft drive unit connecting and fixing portion 250) of the rotor shaft 152.

The power interface and control assembly 308 interfaces between the power supply 304 and the motor 306, and controls operation (and operational parameters [e.g., power level, rate of rotation of the motorized drive shaft]) of the motor 306, which, then translates to controlling operation (and operational parameters [e.g., rotor speed, or rate of rotation]) of the rotor 140, during operation of the chemical reactor 100. In exemplary embodiments, the power interface and control assembly 308 includes a variable frequency drive that facilitates such operational control of the motor 306, by controlling power frequency of the motor 306, and of its motorized drive shaft.

In exemplary embodiments, the rotor shaft drive unit 300 additionally includes, or is operatively connected to, a process control and data-information processing unit (e.g., a computerized platform with associated hardware and software), configured for controlling operation of and processing data-information associated with the rotor shaft drive unit 300, during operation of the rotor shaft drive unit 300, and of the chemical reactor 100. In exemplary embodiments, the process control and data-information processing unit includes, or is operatively connected to, a display device that enables an operator to view, and use, the data and information relating to, and generated during, operation of the rotor shaft drive unit 300, and of the chemical reactor 100.

In exemplary embodiments, the chemical reactor 100 is included in, and is operably connectable (e.g., at its proximal side) to, an overall, more encompassing, catalytic thermal conversion system, for example, as illustratively described below with reference to FIG. 38.

FIG. 38 is a schematic diagram of another exemplary application of the chemical reactor 100, highlighting an exemplary catalytic thermal conversion system 400 that includes the chemical reactor 100. As shown in FIG. 38, exemplary catalytic thermal conversion system 400 includes: the chemical reactor 100; a rotor shaft drive unit, for example, the rotor shaft drive unit 300 (as illustratively described above and shown in FIG. 37); and catalytic conversion system process units, for example, catalytic conversion system process units 410. In exemplary embodiments, the catalytic conversion system 400 additionally includes a process control and data-information processing unit, for example, process control and data-information processing unit 430.

The chemical reactor 100 is any of the above illustratively described exemplary embodiments of the herein disclosed chemical reactor with high speed rotary mixing, for catalytic conversion of organic materials into diesel and other liquid fuels.

The rotor shaft drive unit 300 is that illustratively described above with reference to FIG. 37. Accordingly, the chemical reactor 100, at its distal side, is operatively connected (indicated by dashed lines 302) to the rotor shaft drive unit 300. Such operative connection is made between the rotor shaft distal end portion 152*dep* (that includes the rotor shaft drive unit connecting and fixing portion 250) and the rotor shaft drive unit 300. The rotor shaft drive unit 300 is configured for driving (powering) and rotating the rotor shaft 152 (which, in turn, drives and rotates all other components of the reactor rotary mixing assembly (RRMA) 104) of the chemical reactor 100.

The chemical reactor 100 is operatively connected to the exemplary catalytic thermal conversion system process units 410, for example, as generally indicated, and referenced, by the two dashed line, double-headed arrows having reference number 420 and extending between the chemical reactor 100 and the catalytic thermal conversion system process units 410. In exemplary embodiments, the exemplary catalytic thermal conversion system process units 400, in a non-limiting manner, are those among the numerous well established and widely practiced standard chemical engineering operations types of process units. For example, (liquid, solid, gas, vapor) materials input/output transfer and handling types of process units, such as distillation, evaporation, condensation, and decanting, among other kinds of possible materials separations types of process units that may be applicable to performing an overall catalytic thermal conversion process.

As shown in FIG. 38, in exemplary embodiments, the catalytic thermal conversion system 400 additionally includes the process control and data-information processing unit 430, operatively connected to, and, configured for controlling operation of and processing data-information associated with, the other units (and components therein) of the catalytic thermal conversion system 400, namely, the chemical reactor 100, the rotor shaft drive unit 300, and the catalytic thermal conversion system process units 410. Operative connections and configurations between the process control and data-information processing unit 430 and each of the other catalytic thermal conversion system units (and components therein) are schematically represented by the double headed dotted line arrows 435 extending between the process control and data-information processing unit 430 and each of the other catalytic thermal conversion system units (i.e., the chemical reactor 100, the rotor shaft drive unit 300, and the catalytic thermal conversion system process units 410).

In exemplary embodiments, such operative connections and configurations between the process control and data-information processing unit 430, and each of the other system units (and components therein), namely, the chemical reactor 100, the rotor shaft drive unit 300, and the catalytic thermal conversion system process units 410, include (wired or/and wireless) electrical or/and electronic network of input/output data-information control signal communications lines, for example, in FIG. 38, also represented by double headed dotted line arrows 420. In exemplary embodiments, electrical or/and electronic input/output, feedforward and feedback transmission and reception of electrical or/and electronic control data, information, and command, communication signals between system units, components, and assemblies, mechanisms, and, power supply and process control equipment, are provided by (wired or/and wireless) electrical or/and electronic input/output control data, information, and command, communications lines, which may include, for example, cables, bundles, or/and buses of wires. In exemplary embodiments, the catalytic thermal conversion system 400, in general, and, the process control and data-information processing unit 430, in particular, includes automatic electrical or/and electronic operating, controlling, and monitoring (measuring) of the numerous operating parameters and conditions of system units, components, assemblies, mechanisms, and operative connections.

In accordance with the preceding illustratively described exemplary applications of the herein disclosed chemical reactor, another aspect of the invention is of a system for catalytically thermally converting organic materials into diesel and other liquid fuels. The system (for example, the system 400 shown in FIG. 38) for catalytically thermally converting organic materials into diesel and other liquid fuels, in a non-limiting manner, and in some embodiments, includes: a chemical reactor 100 that includes a reactor stationary assembly (RSA) 102, configured with only stationary components that remain stationary during operation of the chemical reactor 100, and a reactor rotary mixing assembly (RRMA) 104, configured with only rotatable components that rotate during operation of the chemical reactor 100. The system 400 further includes a rotor shaft drive unit (for example rotor shaft drive unit 300), operatively connected to the reactor rotary mixing assembly (RRMA) 104, and configured for driving and rotating the reactor rotary mixing assembly (RRMA) 104 relative to the reactor stationary assembly (RSA) 102. The system 400 further includes catalytic conversion system process units (for example, the catalytic conversion system process units 410), operatively connected to the chemical reactor 100. In exemplary embodiments, the catalytic thermal conversion system 400 additionally includes the process control and data-information processing unit 430, operatively connected to, and, configured for controlling operation of and processing data-information associated with, the other units (and components therein) of the catalytic thermal conversion system 400, namely, the chemical reactor 100, the rotor shaft drive unit 300, and the catalytic thermal conversion system process units 410.

Additionally, in accordance with the preceding illustratively described exemplary applications of the herein disclosed chemical reactor, another aspect of the invention is of a method for catalytically thermally converting organic materials into diesel and other liquid fuels. The method for catalytically thermally converting organic materials into diesel and other liquid fuels, in a non-limiting manner, and in some embodiments, includes: providing a chemical reactor (for example, the chemical reactor 100) that includes a reactor stationary assembly (RSA) 102, configured with only stationary components that remain stationary during operation of the chemical reactor 100, and a reactor rotary mixing assembly (RRMA) 104, configured with only rotatable components that rotate during operation of the chemical reactor 100. The method further includes operatively connecting the reactor rotary mixing assembly (RRMA) 104 to a rotor shaft drive unit (for example, the rotor shaft drive unit 300), so as to drive and rotate the reactor rotary mixing assembly (RRMA) 104 relative to the reactor stationary assembly (RSA) 102. The method further includes operatively connecting the chemical reactor to catalytic conversion system process units (for example, catalytic conversion system process units 410), and operating the chemical reactor 100 and the catalytic conversion system process units 410, so as to thermally convert organic materials into diesel and other liquid fuels. In exemplary embodiments, the method further includes controlling operation of and processing data-information associated with, the chemical reactor 100, the rotor shaft drive unit 300, and the catalytic thermal conversion system process units 410.

Exemplary Materials of Construction and Ranges of Size Dimensions of Components, Elements, and Structural Features, of the Herein Disclosed Chemical Reactor The following, in a non-limiting manner, is presentation of exemplary materials of construction and ranges of size dimensions of components, elements, and structural features, of the herein disclosed chemical reactor. Implementation and practice of embodiments of the herein disclosed invention are not limited to the below presented exemplary materials and ranges of size dimensions. Alternative or additional materials of construction and size dimensions may be used for implementing and practicing embodiments of the herein disclosed invention.

Hereinbelow, regarding exemplary materials of construction, the internationally known and used terms ASTM, UNS, DIN, and SAE are abbreviations for: American Society for Testing and Materials, Unified Numbering System, German Institute for Standardization, and Society of Automotive Engineers, respectively. Regarding exemplary ranges of size dimensions, the dimensional unit of millimeter(s) [mm] is used throughout.

Reactor Stationary Assembly (RSA) 102
Reactor Central Housing 110
Cast iron (e.g., per ASTM: A536-84; UNS: F33800; DIN: EN-JS 1060/EN-GJS-600-3).
Middle portion: (proximal to distal) longitudinal length (width): 180 mm-800 mm; outer diameter: 200 mm-1200 mm; inner diameter: 250 mm-1030 mm; wall thickness: 20-80 mm. Proximal and distal (flanged) open ends wall thickness: 12 mm-50 mm. Anti-abrasion shield fixing point characteristic size dimension (diameter, length, or width): 10 mm-100 mm. Supporting and fixing elements characteristic size dimension (length or width): 150 mm-400 mm.
Reactor Input/Output Manifolds 112, 114
Abrasion resistant cast iron (e.g., per ASTM: A532, class III-24Cr). Circular base: diameter: 250 mm-1100 mm; thickness: 10 mm-40 mm. Input (suction) port: diameter: 75 mm-300 mm; length: 200 mm-800 mm. Input aperture: width: 5 mm-60 mm; length: 75 mm-300 mm. Output (discharge) port: diameter: 60 mm-250 mm; length: 200 mm-800 mm. Output aperture: width: 5 mm-20 mm; length: 30 mm-150 mm. Drain port: diameter: 35 mm-150 mm; length: 150 mm-800 mm. Drain aperture diameter: 35 mm-150 mm. Rotor shaft passageway (circular opening) diameter: 40 mm-200 mm.

Reactor Input/Output Manifold Housings 116, 118
Cast iron (e.g., per ASTM: A536-84; UNS: F33800; DIN: EN-JS 1060/EN-GJS-600-3).
Circular base: diameter: 300 mm-1300 mm; thickness: 100 mm-400 mm. Input (suction) port channel diameter: 70 mm-280 mm. Output (discharge) port channel diameter: 60 mm-240 mm. Drain port channel diameter: 40 mm-160 mm. Rotor shaft passageway (circular opening) diameter: 40 mm-200 mm.
Dynamic Seal Housings 120, 122
Cast iron (e.g., per ASTM: A536-84; UNS: F33800; DIN: EN-JS 1060/EN-GJS-600-3).
Circular base: diameter: 300 mm-1300 mm; thickness: 7 mm-30 mm. Tubular member: diameter: 100 mm-400 mm; length: 30 mm-130 mm; wall thickness: 10 mm-40 mm. Rotor shaft passageway (circular opening) diameter: 40 mm-200 mm.
Lubricated Cartridge Seal Housings 124, 126
Cast iron (e.g., per ASTM: A536-84; UNS: F33800; DIN: EN-JS 1060/EN-GJS-600-3).
Circular base: diameter: 300 mm-1300 mm; thickness: 10 mm-50 mm. Seal supporting and holding member: diameter: 150 mm-700 mm; length: 100 mm-450 mm; wall thickness: 50 mm-200 mm. Support arm height: 100 mm-450 mm. Rotor shaft passageway (circular opening) diameter: 40 mm-200 mm.
Anti-Abrasion Shield 128
Abrasion resistant cast iron (e.g., per ASTM: A532, class III-24Cr).
Body: (proximal to distal) longitudinal length (width): 170 mm-750 mm; outer diameter: 180 mm-1100 mm; inner diameter: 200 mm-900 mm; wall thickness: 20-80 mm. Fixing elements characteristic size dimension (length or width): 150 mm-400 mm.
Reactor Rotary Mixing Assembly (RRMA) 104
Rotor 140
Abrasion resistant cast iron (e.g., per ASTM: A532, class III-24Cr).
  rotor tubular portion inner diameter: 40 mm-200 mm.
  rotor blades: number of rotor blades: 4-30; rotor blade longitudinal length LL: 180 mm-700 mm; rotor blade curved radial length CL: 75 mm-300 mm; rotor blade thickness TK: 7 mm-30 mm; rotor blade angle of curvature a: 3 degrees-80 degrees.
  rotor central reinforcement disc: (radially directed) disc diameter: 200 mm-800 mm; (longitudinally directed) disc thickness: 10 mm-40 mm.
Rotatable Dynamic Seals 144, 146
Cast iron (e.g., per ASTM: A536-84; UNS: F33800; DIN: EN-JS 1060/EN-GJS-600-3).
Circular base: diameter: 200 mm-900 mm; thickness: 12 mm-50 mm. Star fish like member: number of curved arms: 2-24; each arm: curved width: 7 mm-30 mm; curved length: 150 mm-600 mm; height: 2 mm-8 mm. Rotor shaft passageway (circular opening) diameter: 40 mm-200 mm.
Rotatable Lubricated Cartridge Seals 148, 150
  Type: single cartridge.
  Stainless steel (e.g., per SAE grade 316; UNS: S31600).
  Lubricant flow receiver and transfer member: diameter: 50 mm-250 mm; length: 15 mm-80 mm. Support member: diameter: 45 mm-220 mm. Rotor shaft passageway (circular opening) diameter: 40 mm-200 mm.
Rotatable Rotor Shaft 152
Chromium molybdenum steel (e.g., per ASTM: 4140; UNS: 1.7225/42CrMo4; DIN: G41400).
  Shaft: longitudinal length: 800 mm-3,000 mm; tapered diameters: 35 mm-195 mm.

Reactor rotary mixing assembly (RRMA) component mounting and fixing portion or section: area: 350 mm2-3500 mm2 (for an ellipse, circle, rectangle, or square).

Rotor shaft drive unit connecting and fixing portion: area: 350 mm2-3500 mm2 (for an ellipse, circle, rectangle, or square).

Proximal extension of the proximal-most longitudinal end of the rotor shaft beyond the fixed position of the proximal rotatable cartridge bearing: 2 mm-20 mm.

Distal extension of the distal-most longitudinal end of the rotor shaft beyond the fixed position of the distal rotatable cartridge bearing: 50 mm-200 mm.

Rotatable Cartridge Bearings 154, 156
  Type: piloted flange bearing.
  Stainless steel (e.g., per SAE grade 440A, B, or C; UNS: S44002, 3, or 4).
  Cartridge: diameter: 50 mm-250 mm; length: 10 mm-50 mm. Support member:
    diameter: 45 mm-220 mm. Rotor shaft passageway (circular opening) diameter: 40 mm-200 mm.

Rotatable Paired Sets 158 of a Locknut 160 and a Locknut Washer 162
  Stainless steel (e.g., per SAE grade 316; UNS: S31600).
  Locknut, locknut washer: diameter: 50 mm-250 mm; length (width): 5 mm-20 mm.

Latitudinal or Radial (Transverse) Offset λ of Reactor Components
  10 mm-60 mm.

Rotor-Based Performance and Process Control Structural Features
  hole openings 140*ho* (FIGS. 24A, 24B, 29A, 29B): diameter: 3 mm-10 mm.
  slit openings 140*s*1 (FIGS. 25A, 25B, 30A, 30B): length: 3 mm-10 mm; width: 3 mm-10 mm.
  teeth or spike protrusions 140*tsp* (FIGS. 26A, 26B, 31A, 31B, 32A, 32B): base diameter: 3 mm-10 mm; height: 3 mm-10 mm.
  mound protrusions 140*mo* (FIGS. 27A, 27B, 33A, 33B, 34A, 34B): length: 3 mm-10 mm; width: 3 mm-10 mm; height: 3 mm-10 mm.
  inverse mound depressions 140*imo* (FIGS. 28A, 28B, 35A, 35B, 36A, 36B): length: 3 mm-10 mm; width: 3 mm-10 mm; depth: 3 mm-10 mm.

Exemplary Operating Conditions and Parameters in Applications of the Chemical Reactor The following, in a non-limiting manner, is presentation of exemplary operating conditions and parameters in applications of the herein disclosed chemical reactor. Implementation and practice of embodiments of the herein disclosed invention are not limited to the below presented exemplary operating conditions and parameters. Alternative or additional operating conditions and parameters may be used for implementing and practicing embodiments of the herein disclosed invention.

Rotor Shaft Drive Unit 300
  Power supply: 440/220 volts, 50/60 Hz (Hertz); city power grid (regular AC power for industrial use); or electrical AC power generator (powered by diesel or gas fuel); or renewable energy source (solar or/and wind AC power).
  Motor: power generation: 100-1,000 Kw (kilowatts)/134-1,340 hp (horsepower); drive shaft rate of rotation 400-5,000 rpm (rounds per minute).
  Variable frequency drive: 10 Hz-50/60 Hz.

Chemical Reactor 100
  Input (feed) materials to be catalytically converted:
    organic (hydrocarbon-containing) materials, singly, or in combination; coal, plastics, rubber, plant matter, wood shavings, biomass, organic wastes.
  Material mass flow rate (entering, exiting the chemical reactor) [at 160° C.]:
    200-500 GPM (gallons per minute)/750-1890 L/min (liters per minute).
  Reaction temperature (inside the chemical reaction chamber): 150° C.-380° C.
  Reaction pressure (inside the chemical reaction chamber): 0.5-5 bar/0.49-4.9 atm/375-3,750 mm Hg/50-500 kPa (kilopascal).
  Rotational Speed (of rotor shaft 152, with other components of the RRMA 104):
    400-5,000 rpm.
  Main output (product) materials: aliphatic hydrocarbons (C5-C44); diesel fuel (C10-C22), kerosene, gasoline, jet fuel.

Each of the following terms written in singular grammatical form: 'a', 'an', and 'the', as used herein, means 'at least one', or 'one or more'. Use of the phrase 'one or more' herein does not alter this intended meaning of 'a', 'an', or 'the'. Accordingly, the terms 'a', 'an', and 'the', as used herein, may also refer to, and encompass, a plurality of the stated entity or object, unless otherwise specifically defined or stated herein, or, unless the context clearly dictates otherwise. For example, the phrases: 'a unit', 'a device', 'an assembly', 'a mechanism', 'a component', 'an element', and 'a step or procedure', as used herein, may also refer to, and encompass, a plurality of units, a plurality of devices, a plurality of assemblies, a plurality of mechanisms, a plurality of components, a plurality of elements, and, a plurality of steps or procedures, respectively.

Each of the following terms: 'includes', 'including', 'has', 'having', 'comprises', and 'comprising', and, their linguistic/grammatical variants, derivatives, or/and conjugates, as used herein, means 'including, but not limited to', and is to be taken as specifying the stated component(s), feature(s), characteristic(s), parameter(s), integer(s), or step(s), and does not preclude addition of one or more additional component(s), feature(s), characteristic(s), parameter(s), integer(s), step(s), or groups thereof. Each of these terms is considered equivalent in meaning to the phrase 'consisting essentially of'.

Each of the phrases 'consisting of' and 'consists of', as used herein, means 'including and limited to'.

The phrase 'consisting essentially of', as used herein, means that the stated entity or item (system, system unit, system sub-unit, device, assembly, sub-assembly, mechanism, structure, component, element, or, peripheral equipment, utility, accessory, or material, method or process, step or procedure, sub-step or sub-procedure), which is an entirety or part of an exemplary embodiment of the disclosed invention, or/and which is used for implementing an exemplary embodiment of the disclosed invention, may include at least one additional 'feature or characteristic' being a system unit, system sub-unit, device, assembly, sub-assembly, mechanism, structure, component, or element, or, peripheral equipment, utility, accessory, or material, step or procedure, sub-step or sub-procedure), but only if each such additional 'feature or characteristic' does not materially alter the basic novel and inventive characteristics or special technical features, of the claimed entity or item.

The term 'method', as used herein, refers to a single step, procedure, manner, means, or/and technique, or a sequence, set, or group of two or more steps, procedures, manners, means, or/and techniques, for accomplishing or achieving a given task or action. Any such herein disclosed method, in a non-limiting manner, may include one or more steps, procedures, manners, means, or/and techniques, that are known or readily developed from one or more steps, procedures, manners, means, or/and techniques, previously taught about by practitioners in the relevant field(s) and art(s) of the herein disclosed invention. In any such herein disclosed method, in a non-limiting manner, the stated or presented sequential order of one or more steps, procedures, manners, means, or/and techniques, is not limited to that specifically stated or presented sequential order, for accomplishing or achieving a given task or action, unless otherwise specifically defined or stated herein, or, unless the context clearly dictates otherwise. Accordingly, in any such herein disclosed method, in a non-limiting manner, there may exist one or more alternative sequential orders of the same steps, procedures, manners, means, or/and techniques, for accomplishing or achieving a same given task or action, while maintaining same or similar meaning and scope of the herein disclosed invention.

Throughout this disclosure, a numerical value of a parameter, feature, characteristic, object, or dimension, may be stated or described in terms of a numerical range format. Such a numerical range format, as used herein, illustrates implementation of some exemplary embodiments of the invention, and does not inflexibly limit the scope of the exemplary embodiments of the invention. Accordingly, a stated or described numerical range also refers to, and encompasses, all possible sub-ranges and individual numerical values (where a numerical value may be expressed as a whole, integral, or fractional number) within that stated or described numerical range. For example, a stated or described numerical range 'from 1 to 6' also refers to, and encompasses, all possible sub-ranges, such as 'from 1 to 3', 'from 1 to 4', 'from 1 to 5', 'from 2 to 4', 'from 2 to 6', 'from 3 to 6', etc., and individual numerical values, such as '1', '1.3', '2', '2.8', '3', '3.5', '4', '4.6', '5', '5.2', and '6', within the stated or described numerical range of 'from 1 to 6'. This applies regardless of the numerical breadth, extent, or size, of the stated or described numerical range.

Moreover, for stating or describing a numerical range, the phrase 'in a range of between about a first numerical value and about a second numerical value', is considered equivalent to, and meaning the same as, the phrase 'in a range of from about a first numerical value to about a second numerical value', and, thus, the two equivalently meaning phrases may be used interchangeably. For example, for stating or describing the numerical range of room temperature, the phrase 'room temperature refers to a temperature in a range of between about 20° C. and about 25° C.', is considered equivalent to, and meaning the same as, the phrase 'room temperature refers to a temperature in a range of from about 20° C. to about 25° C.'.

The term 'about', as used herein, refers to ±10% of the stated numerical value.

The phrase 'operatively connected', as used herein, equivalently refers to the corresponding synonymous phrases 'operatively joined', and 'operatively attached'. These phrases, as used herein, mean that the described or/and shown entities are configured 'connected' to each other, in an 'operative' (ready-for-operation/ready-for-use) manner. Such operative connection, operative joint, or operative attachment, between or among the entities is according to one type, or a plurality of types, of a mechanical (physical, structural), or/and an electrical, or/and an electronic, or/and an electro-mechanical, connection or connections, involving one or more corresponding type(s) or kind(s) of mechanical (physical, structural), or/and electrical, or/and electronic, or/and electro-mechanical, equipment and components. Optionally, such operative connection, operative joint, or operative attachment, between or among the entities, may include, or may involve, one or more type(s) or kind(s) of computerized hardware or/and software equipment and components.

The phrase 'operably connectable', as used herein, equivalently refers to the corresponding synonymous phrases 'operably joinable to', and 'operably attachable to'. These phrases, as used herein, mean that the described or/and shown entities are configured 'connectable' to each other (i.e., capable of being connected to each other, having ability to be connected to each other, or having potential to be connected to each other), for subsequently forming an 'operative connection', an 'operative joint', or an 'operative attachment', between or among the entities. Such operable connectability, operable joinability, or operable attachability, between or among the entities is according to one type, or a plurality of types, of a mechanical (physical, structural), or/and an electrical, or/and an electronic, or/and an electro-mechanical, connection or connections, involving one or more corresponding type(s) or kind(s) of mechanical (physical, structural), or/and electrical, or/and electronic, or/and electro-mechanical, equipment and components. Optionally, such operable connectability, operable joinability, or operable attachability, between or among the entities, may include, or may involve, one or more type(s) or kind(s) of computerized hardware or/and software equipment and components.

It is to be fully understood that certain aspects, characteristics, and features, of the invention, which are, for clarity, illustratively described and presented in the context or format of a plurality of separate embodiments, may also be illustratively described and presented in any suitable combination or sub-combination in the context or format of a single embodiment. Conversely, various aspects, characteristics, and features, of the invention which are illustratively described and presented in combination or sub-combination in the context or format of a single embodiment, may also be illustratively described and presented in the context or format of a plurality of separate embodiments.

Although the invention has been illustratively described and presented by way of specific exemplary embodiments, and examples thereof, it is evident that many alternatives, modifications, or/and variations, thereof, will be apparent to those skilled in the art. Accordingly, it is intended that all such alternatives, modifications, or/and variations, are encompassed by the broad scope of the appended claims.

All publications, patents, and or/and patent applications, cited or referred to in this disclosure are herein incorporated in their entirety by reference into the specification, to the same extent as if each individual publication, patent, or/and patent application, was specifically and individually indicated to be incorporated herein by reference. In addition, citation or identification of any reference in this specification shall not be construed or understood as an admission that such reference represents or corresponds to prior art of the present invention. To the extent that section headings are used, they should not be construed as necessarily limiting.

What is claimed is:

1. A chemical reactor with high speed rotary mixing, for catalytic thermal conversion of organic materials into diesel and other liquid fuels, the chemical reactor comprising:
   a reactor stationary assembly (RSA), configured with only stationary components that remain stationary during operation of the chemical reactor, and comprising:

a reactor central housing, configured as a tubular member longitudinally extending proximally and distally, having proximal and distal open ends;

proximal and distal reactor input/output manifolds, each of said manifolds is configured with a longitudinally directed rotor shaft passageway, and has a respective distal or proximal face that covers, and is sealed to, said reactor central housing proximal or distal open end, and each of said manifolds is housed in a respective proximal or distal manifold housing having proximal and distal faces and configured with a longitudinally directed rotor shaft passageway;

said proximal and distal manifold housings, with said respective proximal and distal manifolds housed therein, are oppositely located and parallel to each other with said reactor central housing longitudinally extending therebetween;

proximal and distal dynamic seal housings, each of said dynamic seal housings is configured with a longitudinally directed rotor shaft passageway, and has a respective distal or proximal face that is sealed to said proximal or distal face of said proximal or distal manifold housing, respectively, said proximal and distal dynamic seal housings are located opposite and parallel to each other relative to said reactor central housing; and proximal and distal lubricated cartridge seal housings, each of said cartridge seal housings is configured with a longitudinally directed rotor shaft passageway, and has a respective distal or proximal face that is sealed to said proximal or distal face of said proximal or distal dynamic seal housing, respectively, said proximal and distal cartridge seal housings are located opposite and parallel to each other relative to said reactor central housing;

and a reactor rotary mixing assembly (RRMA), configured with only rotatable components that rotate during operation of the chemical reactor, and comprising:

a rotor, housed inside of said reactor central housing, and configured with a rotor tubular portion longitudinally extending proximally and distally with proximal and distal open ends, said rotor includes a plurality of equally sized radially curved rotor blades that extend radially from, and longitudinally along, the outer circumferential periphery of said rotor tubular portion;

proximal and distal rotatable dynamic seals, each of said dynamic seals is configured with a longitudinally directed rotor shaft passageway, and is housed inside of said proximal or distal dynamic seal housing, respectively;

proximal and distal rotatable lubricated cartridge seals, each of said cartridge seals is configured with a longitudinally directed rotor shaft passageway, and is housed inside of said proximal or distal lubricated cartridge seal housing, respectively; and a rotatable rotor shaft, longitudinally supported via said proximal and distal lubricated cartridge seal housings, and longitudinally passing through said proximal and distal open ends of said rotor and of said reactor central housing, and through said rotor shaft passageways of said proximal and distal reactor input/output manifolds and said housings thereof, of said proximal and distal dynamic seals and said housings thereof, and of said proximal and distal lubricated cartridge seals and said housings thereof, said rotor shaft is fixedly connected to said rotor tubular portion so as to facilitate controllable rotation of said rotor during operation of the chemical reactor.

2. The chemical reactor of claim 1, wherein said reactor stationary assembly additionally includes an anti-abrasion shield that shields the tubular inner surface of said reactor central housing from abrasion during operation of the chemical reactor, said abrasion shield is configured as a tubular member longitudinally extending proximally and distally inside of said reactor central housing, having a proximal circular open end covered by, and sealed to, said distal circular face of said proximal reactor input/output manifold, and having a distal circular open end covered by, and sealed to, said proximal circular face of said distal reactor input/output manifold.

3. The chemical reactor of claim 1, wherein at least one of said rotor blades is configured with at least one rotor-based performance and process control structural feature selected from the group consisting of: openings, protrusions, and depressions, whereby said rotor-based performance and process control structural features facilitate controlling performance of said rotor, so as to provide an additional layer or level of control of chemical reaction related physico-chemical processes of mass and heat transfer, mixing, degradation, and catalytic chemical conversion, taking place inside of said reactor central housing during operation of the chemical reactor.

4. The chemical reactor of claim 3, wherein said openings are in a form of holes or slits passing entirely through the radially curved thickness of said at least one of said rotor blades.

5. The chemical reactor of claim 3, wherein said protrusions are in a form of teeth or spikes, or mounds protruding or projecting out from the radially curved thickness of said at least one of said rotor blades.

6. The chemical reactor of claim 3, wherein said protrusions are configured only on the leading or front convex face of said at least one of said rotor blades, and face toward, and in, the direction of rotation of said rotor.

7. The chemical reactor of claim 3, wherein said depressions are in a form of inverse mounds protruding or projecting partly into, not entirely through, the radially curved thickness of said at least one of said rotor blades.

8. The chemical reactor of claim 3, wherein said depressions are configured only in the leading or front convex faces of said rotor blades, and face toward, and in, the direction of rotation of said rotor.

9. The chemical reactor of claim 1, wherein said rotor includes a rotor central reinforcement disc, having proximal and distal circular faces, and a central opening concentric with the circumferential periphery of said rotor tubular portion, thereby facilitating longitudinal passage therethrough of said rotor shaft, said rotor central reinforcement disc transversely bisects the longitudinal lengths of said rotor blades, and the outer circumferential periphery of said rotor central reinforcement disc is transverse to, and coincides with, the radial outer ends of said rotor blades.

10. The chemical reactor of claim 9, wherein said rotor central reinforcement disc is configured with at least one rotor-based performance and process control structural feature selected from the group consisting of: openings, protrusions, and depressions, whereby said rotor-based performance and process control structural features facilitate controlling performance of said rotor, so as to provide additional control of chemical reaction related physico-chemical processes of mass and heat transfer, mixing, degradation, and catalytic chemical conversion, taking place inside of said reactor central housing during operation of the chemical reactor.

11. The chemical reactor of claim 10, wherein said openings are in a form of holes or slits passing entirely through the thickness of said rotor central reinforcement disc.

12. The chemical reactor of claim 10, wherein said protrusions are in a form of teeth or spikes, or mounds protruding or projecting out from the thickness of said rotor central reinforcement disc.

13. The chemical reactor of claim 10, wherein said protrusions are configured in said rotor central reinforcement disc proximal circular face or/and in said distal circular face.

14. The chemical reactor of claim 10, wherein said depressions are in a form of inverse mounds protruding or projecting partly into, not entirely through, the thickness of said rotor central reinforcement disc.

15. The chemical reactor of claim 10, wherein said depressions are configured in said rotor central reinforcement disc proximal circular face or/and in said distal circular face.

16. The chemical reactor of claim 1, wherein said rotor shaft is operably connectable to a rotor shaft drive unit that drives and rotates said rotor shaft.

17. A reactor rotary mixing assembly, for use in a chemical reactor with high speed rotary mixing, for catalytic thermal conversion of organic materials into diesel and other liquid fuels, the reactor rotary mixing assembly comprising:
  a rotor, configured with a rotor tubular portion longitudinally extending proximally and distally with proximal and distal open ends, said rotor includes a plurality of equally sized radially curved rotor blades, that extend radially from, and longitudinally along, the outer circumferential periphery of said rotor tubular portion;
  proximal and distal rotatable dynamic seals, configured with respective longitudinally directed rotor shaft passageways, and located opposite and parallel to each other with said rotor tubular member longitudinally positioned therebetween;
  proximal and distal rotatable lubricated cartridge seals, configured with respective longitudinally directed rotor shaft passageways, and located opposite and parallel to each other with said proximal and distal dynamic seals longitudinally positioned therebetween; and
  a rotatable rotor shaft, longitudinally passing through said rotor proximal and distal open ends, and through said rotor shaft passageways of said proximal and distal dynamic seals, and of said proximal and distal lubricated cartridge seals, said rotor shaft is fixedly connected to said rotor tubular portion so as to facilitate controllable rotation of said rotor during operation of the chemical reactor;
  wherein said rotor includes a rotor central reinforcement disc, having proximal and distal circular faces, and a central opening concentric with the circumferential periphery of said rotor tubular portion, thereby facilitating longitudinal passage therethrough of said rotor shaft, said rotor central reinforcement disc transversely bisects the longitudinal lengths of said rotor blades, and the outer circumferential periphery of said rotor central reinforcement disc is transverse to, and coincides with, the radial outer ends of said rotor blades.

18. The reactor rotary mixing assembly of claim 17, wherein at least one of said rotor blades is configured with at least one rotor-based performance and process control structural feature selected from the group consisting of: openings, protrusions, and depressions, whereby said rotor-based performance and process control structural features facilitate controlling performance of said rotor, so as to provide an additional layer or level of control of chemical reaction related physicochemical processes of mass and heat transfer, mixing, degradation, and catalytic chemical conversion, taking place during operation of the chemical reactor.

19. The reactor rotary mixing assembly of claim 18, wherein said openings are in a form of holes or slits passing entirely through the radially curved thickness of said at least one of said rotor blades.

20. The reactor rotary mixing assembly of claim 18, wherein said protrusions are in a form of teeth or spikes, or mounds protruding or projecting out from the radially curved thickness of said at least one of said rotor blades.

21. The reactor rotary mixing assembly of claim 18, wherein said protrusions are configured only on the leading or front convex faces of said rotor blades, and face toward, and in, the direction of rotation of said rotor.

22. The reactor rotary mixing assembly of claim 18, wherein said depressions are in a form of inverse mounds protruding or projecting partly into, not entirely through, the radially curved thickness of said at least one of said rotor blades.

23. The reactor rotary mixing assembly of claim 18, wherein said depressions are configured only in the leading or front convex faces of said rotor blades, and face toward, and in, the direction of rotation of said rotor.

24. The reactor rotary mixing assembly of claim 17, wherein said rotor central reinforcement disc is configured with at least one rotor-based performance and process control structural feature selected from the group consisting of: openings, protrusions, and depressions, whereby said rotor-based performance and process control structural features facilitate controlling performance of said rotor, so as to provide additional control of chemical reaction related physicochemical processes of mass and heat transfer, mixing, degradation, and catalytic chemical conversion, taking place during operation of the chemical reactor.

25. The reactor rotary mixing assembly of claim 24, wherein said openings are in a form of holes or slits passing entirely through the thickness of said rotor central reinforcement disc.

26. The reactor rotary mixing assembly of claim 24, wherein said protrusions are in a form of teeth or spikes, or mounds protruding or projecting out from the thickness of said rotor central reinforcement disc.

27. The reactor rotary mixing assembly of claim 24, wherein said protrusions are configured in said rotor central reinforcement disc proximal circular face or/and in said distal circular face.

28. The reactor rotary mixing assembly of claim 24, wherein said depressions are in a form of inverse mounds protruding or projecting partly into, not entirely through, the thickness of said rotor central reinforcement disc.

29. The reactor rotary mixing assembly of claim 24, wherein said depressions are configured in said rotor central reinforcement disc proximal circular face or/and in said distal circular face.

30. A reactor rotary mixing assembly, for use in a chemical reactor with high speed rotary mixing, for catalytic thermal conversion of organic materials into diesel and other liquid fuels, the reactor rotary mixing assembly comprising:
  a rotor, configured with a rotor tubular portion longitudinally extending proximally and distally with proximal and distal open ends, said rotor includes a plurality of equally sized radially curved rotor blades, that extend radially from, and longitudinally along, the outer circumferential periphery of said rotor tubular portion;

proximal and distal rotatable dynamic seals, configured with respective longitudinally directed rotor shaft passageways, and located opposite and parallel to each other with said rotor tubular member longitudinally positioned therebetween;

proximal and distal rotatable lubricated cartridge seals, configured with respective longitudinally directed rotor shaft passageways, and located opposite and parallel to each other with said proximal and distal dynamic seals longitudinally positioned therebetween; and a rotatable rotor shaft, longitudinally passing through said rotor proximal and distal open ends, and through said rotor shaft passageways of said proximal and distal dynamic seals, and of said proximal and distal lubricated cartridge seals, said rotor shaft is fixedly connected to said rotor tubular portion so as to facilitate controllable rotation of said rotor during operation of the chemical reactor;

wherein at least one of said rotor blades is configured with at least one rotor-based performance and process control structural feature selected from the group consisting of: openings, protrusions, and depressions, whereby said rotor-based performance and process control structural features facilitate controlling performance of said rotor, so as to provide an additional layer or level of control of chemical reaction related physicochemical processes of mass and heat transfer, mixing, degradation, and catalytic chemical conversion, taking place during operation of the chemical reactor.

31. The reactor rotary mixing assembly of claim 30, wherein said openings are in a form of holes or slits passing entirely through the radially curved thickness of said at least one of said rotor blades.

32. The reactor rotary mixing assembly of claim 30, wherein said protrusions are in a form of teeth or spikes, or mounds protruding or projecting out from the radially curved thickness of said at least one of said rotor blades.

33. The reactor rotary mixing assembly of claim 30, wherein said protrusions are configured only on the leading or front convex faces of said rotor blades, and face toward, and in, the direction of rotation of said rotor.

34. The reactor rotary mixing assembly of claim 30, wherein said depressions are in a form of inverse mounds protruding or projecting partly into, not entirely through, the radially curved thickness of said at least one of said rotor blades.

35. The reactor rotary mixing assembly of claim 30, wherein said depressions are configured only in the leading or front convex faces of said rotor blades, and face toward, and in, the direction of rotation of said rotor.

36. The reactor rotary mixing assembly of claim 30, wherein said rotor includes a rotor central reinforcement disc, having proximal and distal circular faces, and a central opening concentric with the circumferential periphery of said rotor tubular portion, thereby facilitating longitudinal passage therethrough of said rotor shaft, said rotor central reinforcement disc transversely bisects the longitudinal lengths of said rotor blades, and the outer circumferential periphery of said rotor central reinforcement disc is transverse to, and coincides with, the radial outer ends of said rotor blades.

37. The reactor rotary mixing assembly of claim 36, wherein said rotor central reinforcement disc is configured with at least one rotor-based performance and process control structural feature selected from the group consisting of: openings, protrusions, and depressions, whereby said rotor-based performance and process control structural features facilitate controlling performance of said rotor, so as to provide additional control of chemical reaction related physicochemical processes of mass and heat transfer, mixing, degradation, and catalytic chemical conversion, taking place during operation of the chemical reactor.

38. The reactor rotary mixing assembly of claim 37, wherein said openings are in a form of holes or slits passing entirely through the thickness of said rotor central reinforcement disc.

39. The reactor rotary mixing assembly of claim 37, wherein said protrusions are in a form of teeth or spikes, or mounds protruding or projecting out from the thickness of said rotor central reinforcement disc.

40. The reactor rotary mixing assembly of claim 37, wherein said protrusions are configured in said rotor central reinforcement disc proximal circular face or/and in said distal circular face.

41. The reactor rotary mixing assembly of claim 37, wherein said depressions are in a form of inverse mounds protruding or projecting partly into, not entirely through, the thickness of said rotor central reinforcement disc.

42. The reactor rotary mixing assembly of claim 37, wherein said depressions are configured in said rotor central reinforcement disc proximal circular face or/and in said distal circular face.

\* \* \* \* \*